(12) United States Patent
Cho

(10) Patent No.: US 12,546,767 B2
(45) Date of Patent: Feb. 10, 2026

(54) METHOD FOR DETECTION OF UNSTABLE CELL-FREE DNA AND DEVICE USING SAME

(71) Applicant: GENOPSY CO., LTD., Seoul (KR)

(72) Inventor: Youngnam Cho, Seoul (KR)

(73) Assignee: GENOPSY CO., LTD., Seoul (KR)

( * ) Notice: Subject to any disclaimer, the term of this patent is extended or adjusted under 35 U.S.C. 154(b) by 662 days.

(21) Appl. No.: 17/058,267

(22) PCT Filed: May 30, 2019

(86) PCT No.: PCT/KR2019/006514
§ 371 (c)(1),
(2) Date: Nov. 24, 2020

(87) PCT Pub. No.: WO2019/231259
PCT Pub. Date: Dec. 5, 2019

(65) Prior Publication Data
US 2021/0215681 A1    Jul. 15, 2021

(30) Foreign Application Priority Data

Jun. 1, 2018   (KR) .................. 10-2018-0063258

(51) Int. Cl.
G01N 33/53   (2006.01)

(52) U.S. Cl.
CPC ................. *G01N 33/5308* (2013.01)

(58) Field of Classification Search
CPC .............. G01N 33/5308; C12Q 1/6883; C12Q 1/6806; C12Q 1/6837; C12Q 2527/101; C12Q 2563/125; C12Q 2563/131; C12Q 2563/155; C12Q 2527/125; C12Q 2563/173; C12N 15/1003
See application file for complete search history.

(56) References Cited

U.S. PATENT DOCUMENTS

| | | | |
|---|---|---|---|
| 2011/0171643 A1 | 7/2011 | Li et al. | |
| 2017/0051275 A1* | 2/2017 | Cho | ..................... C08L 101/12 |

FOREIGN PATENT DOCUMENTS

| | | | |
|---|---|---|---|
| CN | 107980061 A | 5/2018 | |
| EP | 1 524 321 B2 | 7/2014 | |
| EP | 3 315 607 A1 | 5/2018 | |
| JP | 2005-69778 A | 3/2005 | |
| KR | 10-2011-0122320 A | 11/2011 | |
| KR | 10-2017-009604 A | 1/2017 | |
| KR | 10-1701618 B1 | 2/2017 | |
| KR | 10-1751962 B1 | 6/2017 | |
| KR | 10-2018-0027525 A | 3/2018 | |
| KR | 10-2018-0074123 A | 7/2018 | |
| RU | 2 627 673 C2 | 9/2017 | |
| WO | WO-2016210158 A1 * | 12/2016 | ............... C12Q 1/68 |

OTHER PUBLICATIONS

Leary et al. "Digital karyotyping", Nature Protocols, 2007, vol. 2(8):1973-1986 (Year: 2007).*
Gorgannezhad et al. "Circulating tumor DNA and liquid biopsy: opportunities, challenges, and recent advances in detection technologies", Lab Chip. 2018. vol. 18: 1174-1196 (Year: 2018).*
Jeon "Efficient Capture and Isolation of Tumor-Related Circulating Cell-Free DNA from Cancer Patients Using Electroactive Conducting Polymer Nanowire Platforms" Theranostics (2016) 6(6): 828-836. (Year: 2016).*
Office Action, dated Mar. 10, 2022, for Russian Patent Application No. 2020142821. (19 pages) (with English Translation).
Vendrell et al., "Circulating Cell Free Tumor DNA Detection as a Routine Tool for Lung Cancer Patient Management," Int. J. Mol. Sci 18: 264, 2017 (19 pages).
Extended European Search Report and Supplementary European Search Report, dated Feb. 1, 2022, for European Application No. 19 81 0280. (9 pages).
Office Action, dated Jan. 20, 2022, for Japanese Patent Application No. 2021-517173. (English translation) (7 pages).
Takahashi, "Applied Technology of DNA probe Popular version," *Applied technology of DNA probe Popular version* (CMC books), p. 324-326, Jan. 30, 2000. (English abstract) (13 pages).

\* cited by examiner

*Primary Examiner* — Nancy J Leith
(74) *Attorney, Agent, or Firm* — Seed Intellectual Property Group LLP

(57) ABSTRACT

In an embodiment, the present invention relates to a technique in which small-sized cfDNA is detected, with ultra-high sensitivity, from a liquid sample such as urine, cerebrospinal fluid, plasma, blood, pleural fluid, or body fluid, is concentrated and isolated, and then is analyzed for gene mutations without PCR. In particular, in a case where a positively charged nanostructure is used, capture and detection rates for cfDNA can be increased. A detection method according to an embodiment of the present invention does not require a PCR amplification reaction, which greatly shortens the time taken to obtain a result. In addition, since direct on-site analysis is possible without the need for specific equipment, it is expected that the present invention can be used as a point-of-care testing (POCT) capable of simultaneously searching multiple genes in a short period of time.

19 Claims, 51 Drawing Sheets

Specification includes a Sequence Listing.

|  | Total [N = 151], n (%) |
|---|---|
| Age, years: | |
| Mean | 61 |
| Range | 38 - 84 |
| Sex: | |
| Male | 67 (44.4) |
| Female | 84 (55.6) |
| Clinical stage: | |
| IIA - IIIA | 6 (4) |
| IIIB - IV | 145 (96) |
| EGFR mutant type: | |
| Wild-type | 10 (6.6) |
| Exon 19 Del | 92 (60.9) |
| Exon 21 L858R | 49 (32.5) |

FIG. 42

EGFR Exon 20 T790M

ACG (WT, T)
ATG (T790M, M)

ccagatgcaccaggaggagggccctccccactgcatctgtcacttcacag
ccctgcgtaaacgtccctgtgtaggtcttttgcaggcacagtttcct
ccatgagtacgtatttgaaaccaagatgcattcatgcgtcttcacct
ggaagggtcatgtgccctcttcctgccaccacgtgcgaagccacactg
acgtgcctctccctcccag
GAAGCCTAGCGTGATGGCCAGCGTGGACAACCCCCAGTGTGCCGCTGCT
GGGCATCTGCCTCACCTCCACCGTCACCGTCATCAGCTCATGCCCTT
CGGCTGCCTCCTGGACTATGTCCGGGAACACAAAGACAATATTGGCTCC
CAGTACTGCTCAACTGGTGTGTGCAGATCAGTGCAAAG
gtaatcaggaaggagatacgggaggggagtaaggagcaggatcct
cacatgcggtctcgtcctggatacgcaagagtttgccatgggatatg
tgtgtcgtgcatgcagcacaacacaacattccttatttgattcaatca
agttgatcttcttgtgcacaaatcagtgcctgccatcgcatgtggaa
actctcatcaatcagctaccttttgaagaattttcttattgagtgctc CP1: 5'-Biotin-CCATGAGTACGTATTTTGAAACTC-3'
DP: 5'-cat atc ccc atg gca aac tct tgc-Biotin-3'

CP2: 5'-Biotin-CCACCGTGCAGCTCATCATGCA-3'
DP: 5'-cat atc ccc atg gca aac tct tgc-Biotin-3'

CP3: 5'-Biotin-GAAGCCTAGCGTGATGGCCAGCGT-3'
DP: 5'-cat atc ccc atg gca aac tct tgc-Biotin-3'

→ Probes being used

FIG. 51

Patient's tissue biopsy : EGFR exon20 T790M / 21 L861Q

Result for plasma cfDNA : EGFR exon20 T790M / 21 L861Q

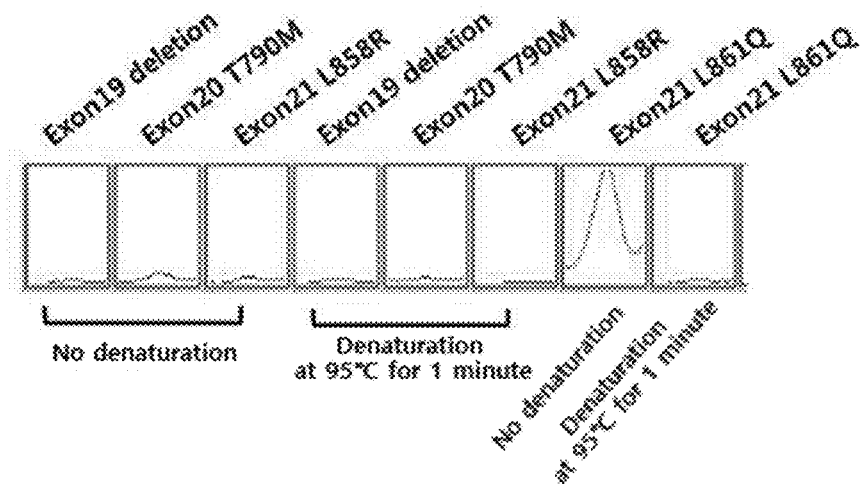

| EGFR Mutation | Δ OD (650 nm – 500nm) |
|---|---|
| Exon19 deletion, no denaturation | 0.0115 |
| Exon20 T790M, no denaturation | 0.0191 |
| Exon21 L858R, no denaturation | 0.0145 |
| Exon19 deletion, denaturation at 95°C for 1 minute | 0.0111 |
| Exon20 T790M, denaturation at 95°C for 1 minute | 0.0081 |
| Exon21 L858R, denaturation at 95°C for 1 minute | 0.0046 |
| Exon21 L861Q, no denaturation | 0.2189 |
| Exon21 L861Q, denaturation at 95°C for 1 minute | 0.0102 |

FIG. 54

FIG. 55
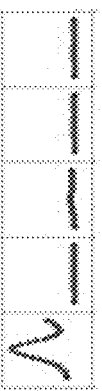
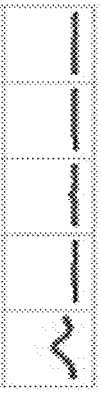

FIG. 56

METHOD FOR DETECTION OF UNSTABLE CELL-FREE DNA AND DEVICE USING SAME

STATEMENT REGARDING SEQUENCE LISTING

The Sequence Listing associated with this application is provided in text format in lieu of a paper copy, and is hereby incorporated by reference into the specification. The name of the text file containing the Sequence Listing is 390123_401USPC_SEQUENCE_LISTING.txt. The text file is 9.1 KB was created on Nov. 20, 2020 and is being submitted electronically via EFS-Web.

TECHNICAL FIELD

The present invention relates to a method and a device for detecting cell-free DNA having an unstable double-helix structure without a gene amplification process.

BACKGROUND ART

Recently, the importance of early diagnosis of cancer diseases has been growing in prominence all over the world. Therefore, studies on methods for early diagnosis of cancer are increasing. However, up to now, methods for diagnosis of cancer have been carried out with invasive methods such as collection of a tissue sample and endoscopy. In particular, histological examination is carried out in such a manner that a portion at a suspected disease site is extracted and observed under a microscope. Therefore, due to the fact that incision of the human body has to be made in order to collect a tissue sample using a needle, a punch, an endoscope, or a laparoscope, not only do patients feel considerable discomfort, but also the scar remains and it takes a long time for recovery thereof.

A molecular diagnostic method using liquid biopsy has attracted attention as an alternative to invasive diagnosis and examination methods. Since liquid biopsy uses a non-invasive method, it is possible to quickly identify results thereof. Moreover, unlike a tissue sample that enables analysis on only a part of a disease, liquid biopsy enables multilateral analysis on the disease. In particular, liquid biopsy is expected to exert excellent efficacy in the diagnosis of cancer. In particular, it is predicted that only examination of body fluid such as blood and urine makes it possible to analyze cancer cell-derived DNAs for respective body parts, which are present in the blood, so that detailed observation on cancer development and metastasis, and the like can be made.

The molecular diagnostic method is a representative technique of ex vivo diagnosis which detects and diagnoses, through numerical values or images, changes in DNA or RNA from a sample containing genetic information such as blood and urine. Due to its advantages of high accuracy and no need for histological examination, attempts have been made to apply the molecular diagnostic method to cancer diagnosis techniques based on the cost-saving advantage thereof along with rapid development of genome analysis techniques.

On the other hand, cell-free DNA (hereinafter referred to as cfDNA) refers to DNA which is present in the plasma and is derived from cells. The cfDNA usually has a double-helix structure. In addition, there are many cases where the cfDNA has a coiled-coil structure. The cfDNA may be derived from tumor cells. In addition, cfDNA derived from tumor cells can be found in biological samples, such as blood, plasma, or urine, obtained from cancer patients.

cfDNA found in cancer patients may be derived from necrotic cells, normal cells, and/or cancer cells. Such cfDNA is released into urine, blood, or the like through various processes. Thus, development of techniques for isolating and detecting cfDNA in a biological sample such as blood, plasma, or urine allows liquid biopsy to be a more effective and reliable tool for monitoring patients at risk for cancer. In particular, since urine, plasma, blood, or body fluid is a readily available sample, it is possible to collect a large number of specimens in a non-invasive manner.

However, given the current level of technology, there are many difficulties in methods for early diagnosis of cancer including analyzing cfDNA in liquid samples such as blood and urine and finding out mutations present in genes. Therefore, there are needs for development of a method for easily detecting cfDNA as well as techniques for improvement of detection sensitivity and for accurate early-diagnosis of cancer.

Meanwhile, Korean Patent No. 10-1751962 discloses a technique capable of quantifying cfDNA by performing a polymerase chain reaction (PCR) using primers so that cfDNA is detected. However, there is still a problem that separate polymerase and experimental equipment are needed to perform the polymerase chain reaction; and there are problems that accurate primer production is required for amplification and on-site diagnosis is not easily done.

In addition, Korean Patent No. 10-1701618 discloses a nanostructure, of which surface properties can change through changes in electric field, in order to effectively isolate cfDNA. The nanostructure can bind or dissociate cfDNA through changes in electric field, and thus can easily isolate cfDNA from a sample. However, there is still a limitation that a polymerase chain reaction should be used to identify which cfDNA is present.

In order to amplify cfDNA by performing a polymerase chain reaction, various types of primer sets are required, and it also takes a lot of time to perform complicated steps. Therefore, studies have been steadily conducted to overcome the limitation of having to perform PCR, and to develop a method for analyzing cfDNA with high accuracy.

DISCLOSURE OF INVENTION

Technical Problem

Conventionally, in order to detect cfDNA, it was essential to perform a process in which the cfDNA is denatured and amplified using primers complementary to the cfDNA. However, the present inventors have identified the presence of unstable cfDNA in the blood. In addition, the present inventors have identified that unlike stable cfDNA, the unstable cfDNA shows an unusual reaction with a single-stranded probe. In particular, the present inventors have identified that such unstable cfDNA is derived from cells of an individual having cancer or an infectious disease. Based on these findings, the present inventors have completed the present invention.

Accordingly, an object of the present invention is to provide a method for identifying the presence or absence of unstable cfDNA, and to provide a method for providing information for the diagnosis of cancer or various diseases by identifying such unstable cfDNA.

Solution to Problem

In order to achieve the above object, there is provided a method for detecting unstable cfDNA from a sample without amplification. In addition, there is provided a method for providing information for the diagnosis or prediction of cancer and an infectious disease by detecting unstable cfDNA from a sample without amplification. In addition, there is provided a device for detecting unstable cfDNA from a sample without amplification.

Advantageous Effects of Invention

When a method for detecting unstable cfDNA in accordance with an embodiment is used, not only a process of amplifying the unstable cfDNA is unnecessary, but also it is possible to shorten the time for analyzing the cfDNA. In particular, it is possible to effectively detect unstable double-stranded cfDNA containing a gene-mutated portion, thereby effectively diagnosing or predicting cancer or a disease associated with a gene mutation. In addition, when a method according to an embodiment of the present invention is used, it is possible to identify, in a quick and accurate manner, the presence or absence of cfDNA having an unstable double-helix structure from a small amount of biological sample such as urine, cerebrospinal fluid, pleural fluid, ascites, plasma, blood, or body fluid. In addition, since it has been confirmed that the thus detected unstable cfDNA is associated with various cancers or diseases, a method according to an embodiment of the present invention can be usefully used for the diagnosis of cancer or for the identification of prognosis after treatment.

BRIEF DESCRIPTION OF DRAWINGS

FIG. 42 illustrates sequences of CPs and DPs for EGFR exon 20 T790M. In this study, cfDNA gene mutations in lung cancer patients were analyzed using CP2 and DP.

FIG. 51 illustrates results obtained by mixing cfDNAs obtained from the plasma of lung cancer patients with EGFR exon 20 T790M and EGFR exon 21 L861Q gene mutations, all at once, with probes specific for EGFR exon 19 deletion (19 Del), EGFR exon 20 T790M, EGFR exon 21 L858R, and EGFR exon L861Q, and HRP/st-tagged NPs, for detection of gene mutations in the cfDNAs, and as a result, identifying, with UV absorbance, that gene mutations are observed only in EGFR exon 20 T790M and EGFR exon 21 L861Q as in the cancer tissue.

FIG. 54 illustrates results obtained by subjecting samples collected from the blood of normal subjects to denaturation under various temperature conditions, and then detecting unstable cfDNAs for respective treatment conditions.

FIG. 55 illustrates results obtained by subjecting samples collected from the blood of patients to denaturation under various temperature conditions, and then detecting unstable cfDNAs for respective treatment conditions.

FIG. 56 illustrates results obtained by subjecting fDNAs obtained from mutant cell lines to denaturation under various temperature conditions, and then detecting unstable cfDNAs for respective treatment conditions.

BEST MODE FOR CARRYING OUT THE INVENTION

Definition of Terms

Figure 1:
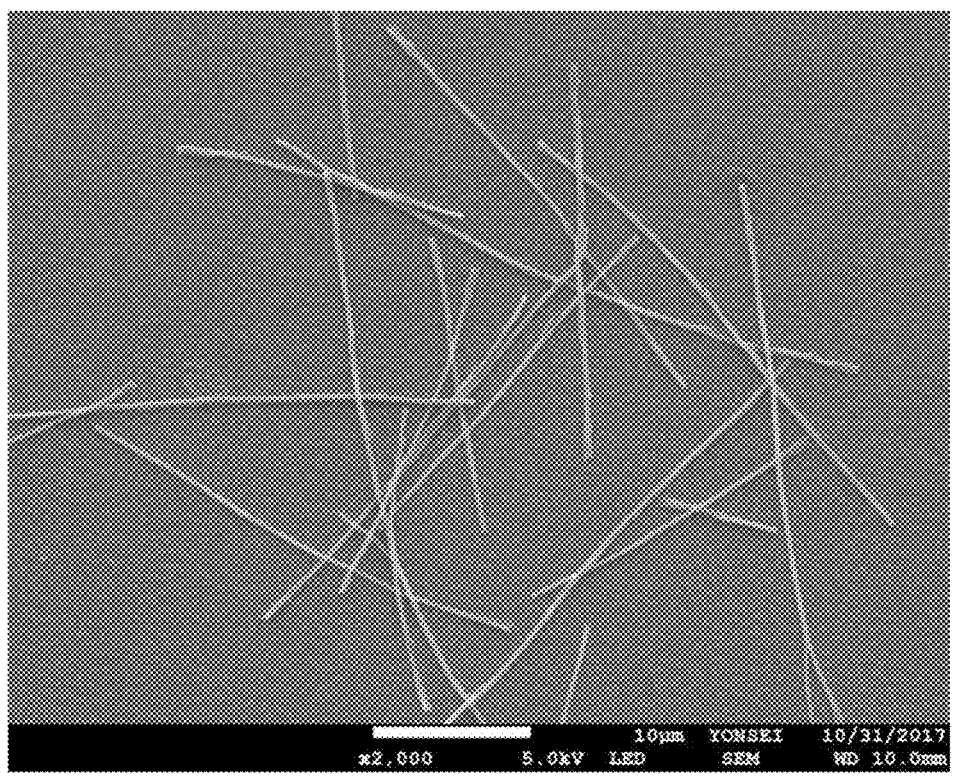
FIG. 1 illustrates a scanning electron microscope (SEM) image of positively charged nanowires (PEI/Ppy NWs).
Figure 2:
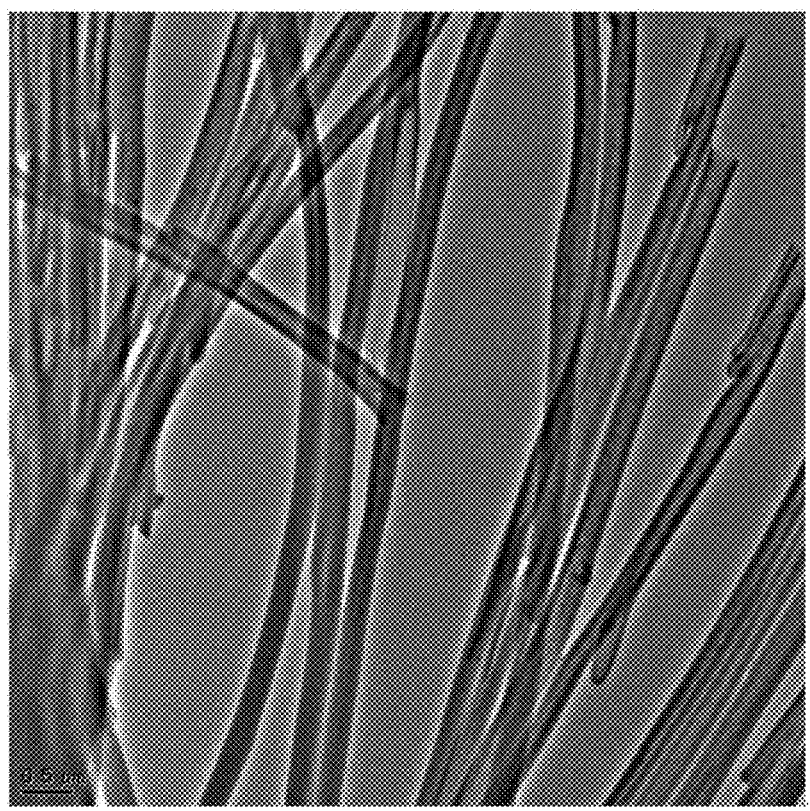
FIG. 2 illustrates a transmission electron microscope (TEM) image of positively charged nanowires (PEI/Ppy NWs).
Figure 3:
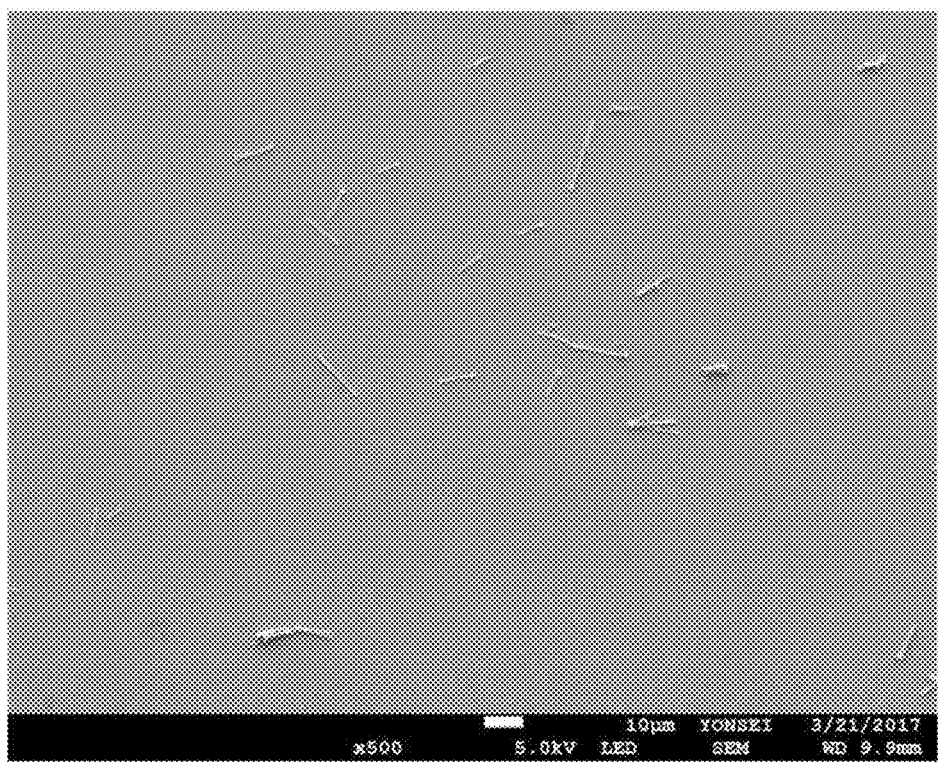
FIG. 3 illustrates surfaces of nanostructures (PLL/Ppy NWs), onto which polylysine (PLL) as a cationic polymer is bound, represented by a scanning electron microscope image.

As used herein, the term "cell-free DNA" is also referred to as cfDNA. In addition, cfDNA may also be circulating tumor DNA (ctDNA) which is cancer cell-derived DNA that can be found in a biological sample such as urine, cerebrospinal fluid, plasma, blood, or body fluid derived from cancer patients. In addition, cfDNA may be present in a biological sample such as urine, cerebrospinal fluid, pleural fluid, ascites, plasma, blood, saliva, sputum, or body fluid. Here, cfDNA may have a size of 80 bp to 10 kbp, 100 bp to 1 kbp, or 120 bp to 500 bp. In addition, cfDNA may have a size of 150 bp to 200 bp, and may usually have a size of 165 bp to 170 bp.

As used herein, the term "unstable cfDNA" refers to cfDNA which is thermodynamically unstable as compared with "stable cfDNA". In other words, unstable cfDNA may be denatured under conditions less severe than those where stable cfDNA is denatured. The reason why the unstable cfDNA is produced is that the unstable cfDNA has an unstable double-helix structure.

As used herein, the term "cfDNA having an unstable double-helix structure" is characterized by having a lower Tm value than cfDNA having a stable double-helix structure, or being denatured under a condition where cfDNA having a stable double-helix structure is not denatured. Tm refers to a melting temperature at which 50% of double-stranded DNA is converted into a single-stranded DNA. The Tm value is proportional to a length of DNA and may vary with the nucleotide sequences. As a large number of nucleotides are hydrogen-bonded to each other in genomic DNA, genomic DNA has to be heated at 92° C. to 95° C. for 5 minutes or longer, or at 98° C. for 2 minutes or longer. In addition, genomic DNA does not readily undergo denaturation a temperature lower than 90° C. As cfDNA having a stable double-helix structure has an average of 170 bp nucleotides, and thus can have a Tm value similar to genomic DNA.

However, the "cfDNA having an unstable double-helix structure" has a lower Tm value than the cfDNA having a stable double-helix structure. Therefore, when the cfDNA having a stable double-helix structure is subjected to denaturation under any one condition selected from the group consisting of i) a condition of being allowed to stand for 1 to 120 minutes at room temperature; ii) a condition of being heated at 90° C. to 95° C. for 1 second to 3 minutes; iii) a condition of being heated at 75° C. to 90° C. for 1 second to 5 minutes; iv) a condition of being heated at 60° C. to 75° C. for 30 seconds to 60 minutes; v) a condition of being heated at 25° C. to 40° C. for 10 to 120 minutes; vi) a condition of being treated with a protease for 10 seconds to 30 minutes; and vii) a condition of being treated with a DNase for 10 seconds to 30 minutes, and then subjected to binding reaction with a 15-mer to 30-mer probe, the cfDNA having a stable double-helix structure does not bind to the probe. Here, the "room temperature" refers to ambient temperature and may be 18° C. to 25° C. Further, in addition to the above conditions, a condition of being heated at 40° C. to 65° C. for 5 to 80 minutes may be further included.

However, it has been confirmed that when a cfDNA having an unstable double-helix structure is subjected to treatment under any one condition of the above-mentioned i) to vii), and then subjected to binding reaction with a 15-mer to 30-mer probe, the cfDNA having an unstable double-helix structure binds to the probe. Here, the probe may be 15-mer to 30-mer, or 20-mer to 25-mer, and may be a 21-mer, 22-mer, 23-mer, or 24-mer probe.

Here, a cfDNA having an unstable double-helix structure may be circulating tumor DNA (hereinafter referred to as ctDNA). In addition, the cfDNA having an unstable double-helix structure may be cfDNA derived from a damaged nucleic acid sequence that is not present in normal cells. Here, the damaged nucleic acid sequence that is not present in normal cells may contain a structural abnormality caused by deletion, duplication, inversion, or translocation of a part of a gene. In addition, the damaged nucleic acid sequence may contain a structural abnormality caused by mismatch of a part of nucleic acid, and may be a single nucleotide variation (SNV) caused by mutation of a partial sequence of nucleic acid. The damaged nucleic acid sequence may have a mutated sequence of at least one gene selected from the group consisting of EGFR, KRAS, BRAF, TP53, PIK3CA, ROS1, RET, c-Met, PTEN, RB1, AR, BRCA, KIT, FGFR, IDH, ESR1, HER2, ALK-EML4, and TMPRSS2-ERG.

Specifically, the damaged nucleic acid sequence that is not present in normal cells may be caused by any one of 1) cleavage of single strand, 2) cleavage of double strand, 3) stalled replication fork, 4) mismatched nucleic acid, 5) chromosomal aberration, 6) intra-strand crosslink, 7) inter-strand crosslink, 8) insertion of a foreign gene, 9) deletion of a part of a gene, 10) substitution of a part of nucleic acid, 11) inversion of nucleic acid, 12) thymidine dimer formation, 13) deamination, 14) gene duplication, 15) chromosome translocation, or 16) base deficiency (AP site). In particular, in tumor cells, double-stranded DNA (dsDNA) is often damaged, and the damaged dsDNA may contain a specific structure found in tumor cells. In particular, the damaged nucleic acid sequence may have a wobble base pair due to mismatch of nucleic acid.

As used herein, the term "probe" refers to DNA or RNA for detecting target cfDNA. The probe may have a sequence designed to be capable of complementarily binding to unstable cfDNA. As used herein, the term "probe having a sequence complementary to cfDNA" refers to a probe having a nucleic acid sequence capable of specifically binding to cfDNA to be detected which has a target double-helix structure and is present in the plasma.

Here, the probe may be produced in two ways. One is a first probe (hereinafter referred to as CP) designed to be capable of binding to a portion of a gene where damage has occurred, and the other is a second probe (hereinafter referred to as DP) designed to be capable of binding to peripheries of the damaged portion. DP may be designed to specifically bind to a sequence at a position 10 bp to 100 bp, or 20 bp to 50 bp away from a target DNA sequence or a region where damage has occurred.

In the present specification, it has been identified that damaged cfDNA can be effectively detected not only when the first probe and the second probe are used at the same time, but also when the first probe or the second probe is individually used. In addition, the probe may be in a form to which a substance such as biotin is bound, so as to bind a marker. Alternatively, the probe may be directly or via a linker bound to a marker. Here, the marker may be a nanoparticle, a fluorescent dye, a fluorescent protein, or an enzyme. In addition, the probe and the marker may be added at the same time, or may be added in a sequential manner.

In an embodiment of the present invention, a probe capable of complementarily binding to target cfDNA may specifically bind to a region containing a sequence specific for each type of the following cancer cells. For example, a sequence specific for ovarian cancer or breast cancer may be an SNP present in BRCA1 exon 7, BRCA1 exon 10, BRCA1 exon 11, or BRCA1 exon 15. In addition, a sequence specific for gastric cancer may be an SNP present in TP53, and a sequence specific for colorectal cancer may be an SNP present in MSH2. A sequence specific for lung cancer may be an SNP present in EGFR. In addition, a sequence specific for liver cancer may be selected from SNPs present in FGFR3.

TABLE 1

| Gene | Type of cancer | Normal cell | Cancer cell |
|---|---|---|---|
| BRCA1 Exon 7 | Ovarian cancer/ breast cancer | 608: CAAAGTATGGGCTACAGAAACCG TGCCAAAAG (SEQ ID NO: 33) | 608: CAAAGTATGGGCTTCAGAAACCG TGCCAAAAG (SEQ ID NO: 34) |
| BRCA1 Exon 10 | | 1615: TGGGAAAACCTATCGGAAGAAG GCAAGCCTCC (SEQ ID NO: 35) | 1615: TGGGAAAACCTATCGGTAGAAG GCAAGCCTCC (SEQ ID NO: 36) |
| BRCA1 Exon 11 | | 3845: GGGGCCAAGAAA- TTAGAGTCCTCAGAAGAG (SEQ ID NO: 37) | 3845: GGGGCCAAGAAATTAGAGTCC TCAGAAGAG (SEQ ID NO: 38) |

TABLE 1-continued

| Gene | Type of cancer | Normal cell | Cancer cell |
|---|---|---|---|
| BRCA1 Exon 15 | | 7466: ATATACAGGATATGCGAATTAAGA AGAAACAAA (SEQ ID NO: 39) | 7466: ATATACAGGATATGTGAATTAAGA AGAAACAAA (SEQ ID NO: 40) |
| TP53 | Gastric cancer | 125: TAGGAGGCCGAGCTCTGTTGCTTC GAACTCCA (SEQ ID NO: 41) | 125: TAGGAGGCCGAGCTCT-TTGCTTCGAACTCCA (SEQ ID NO: 42) |
| MSH2 | Colorectal cancer | 126: TGAGGAGGTTTCGACATGGCGGT GCAGCCGA (SEQ ID NO: 43) | 126: TGAGGAGGTTTCGACCTGGCGGT GCAGCCGA (SEQ ID NO: 44) |
| EGFR | Lung cancer | 2137: AAAAAGATCAAAGTGCTGGGCT CCGGTGCGTT (SEQ ID NO: 45) | 2137: AAAAAGATCAAAGTGCTGAGCT CCGGTGCGTT (SEQ ID NO: 46) |
| FGFR3 | Liver cancer | 1771 :ATCCTCTCTCTGAAATCACTGAG CAGGAGAAAG (SEQ ID NO: 47) | 1771: ATCCTCTCTCTGAAATCACTGCG CAGGAGAAAG (SEQ ID NO: 48) |

As used herein, the term "isolated biological sample" refers to a sample of urine, saliva, cerebrospinal fluid, pleural fluid, ascites, plasma, blood, sputum, or body fluid which has been isolated from the human body. The isolated biological sample may be a liquid sample isolated from the human body. Here, the plasma may be obtained from the blood.

As used herein, the term "positively charged substance" refers to a substance which may be used in the form of nanoparticle, nanowire, net structure, or filter. However, the shape of the positively charged substance is not limited thereto. An embodiment of the "positively charged substance" may be a positively charged nanowire or a positively charged membrane. The nanowire may be produced using a conductive polymer. The conductive polymer may be any one selected from the group consisting of poly(acetylene), poly(pyrrole), poly(thiophene), poly(para-phenylene), poly (3,4-ethylenedioxythiophene), poly(phenylene sulfide), poly (para-phenylene vinylene), and polyaniline. Depending on production methods, length and diameter of the nanowire may be properly adjusted. In an embodiment, the nanowire may have a diameter of 200 nm and a length of 18 μm. In addition, the nanowire may be made to contain biotin during production.

The surface of the nanowire may be modified with a cationic polymer. The type of the cationic polymer is not limited. An embodiment of the cationic polymer may be polyethyleneimine (PEI) or polylysine (PLL). In addition, the cationic polymer may be cationic branched polymer polyethyleneimine. A nanowire modified with such a cationic polymer may have a positively charged surface.

In an embodiment, a positively charged nanowire can successfully and effectively capture cfDNA even at a low concentration. In particular, the positively charged nanowire can effectively capture cfDNA due to its characteristics such as large surface area for binding to a target molecule including DNA, and improved mobility for promoting interaction with DNA.

As used herein, the term "marker" refers to a substance for effectively detecting cfDNA having an unstable double-helix structure, and may specifically include a quantum dot, a substance that degrades a certain substrate and causes a color development reaction, and a substance that cause luminescence when irradiated with a light of a specific wavelength. Specifically, the marker is a fluorescent protein, and may be green fluorescent protein (GFP), yellow fluorescent protein (YFP), red fluorescent protein (RFP), or cyan fluorescent protein (CFP). Alternatively, the marker may be a substance, such as horseradish peroxidase (HRP), capable of converting any one substrate selected from the group consisting of ABTS, OPD, AmplexRed, DAB, AEC, TMB, homovanillic acid, and luminol into a coloring substance.

The marker may further contain a substance capable of binding to the probe. Specifically, when biotin is bound to the probe, the marker may further contain any one selected from the group consisting of avidin, streptavidin, or a combination thereof. In an embodiment, such a marker may be used in the form of nanoparticles to which streptavidin and HRP are bound, the nanoparticles composed of a conductive polymer and hyaluronic acid. Here, the conductive polymer is as described above, and may preferably be polypyrrole. In another embodiment, the marker may be used in the form of nanoparticles to which streptavidin and a fluorescent protein are bound, the nanoparticles composed of a conductive polymer and hyaluronic acid.

<Method for Detecting Unstable cfDNA>

In an aspect of the present invention, there is provided a method for detecting unstable cell-free DNA from a sample without amplification, comprising a step of mixing unstable cfDNA with a probe to which a marker is bound.

Such unstable cfDNA may be circulating tumor DNA (ctDNA) derived from a tumor. Here, the ctDNA may have a damaged gene sequence as described above. In addition, the ctDNA may be isolated from a gene whose expression is highly active. Here, the sample may be a biological sample, and may be a sample isolated from the human body. Specifically, the sample may be urine, cerebrospinal fluid, plasma, blood, pleural fluid, ascites, saliva, sputum, or body fluid.

Therefore, the unstable cfDNA can be differentiated from stable cfDNA in terms of reactivity with the probe through a step of subjecting the sample to treatment under any of the following conditions. Specifically, the treatment may be performed under any one condition selected from i) a condition of being allowed to stand for 1 to 120 minutes at room temperature; ii) a condition of being heated at 90° C. to 95° C. for 1 second to 3 minutes; iii) a condition of being heated at 75° C. to 90° C. for 1 second to 5 minutes; iv) a condition of being heated at 60° C. to 75° C. for 30 seconds to 30 minutes; v) a condition of being heated at 25° C. to 40° C. for 10 minutes to 120 minutes; vi) a condition of being treated with a protease for 1 to 30 minutes; and vii) a condition of being treated with a DNase for 1 to 30 minutes. The probe may contain 15-mer to 30-mer nucleotides, or 20-mer to 25-mer nucleotides. Here, the probe may be designed to be capable of complementarily binding to a gene sequence of unstable cfDNA.

When stable cfDNA is subjected to treatment under any of the above conditions, the stable cfDNA does not undergo denaturation and does not complementarily bind to the probe due to a strong double strand formed therein. However, unstable cfDNA may bind to the probe in a case of being subjected to treatment under any of the above conditions. Such instability is due to the fact that some nucleotides in the cfDNA fail to form a complementary binding, and thus the cfDNA has a changed double-helix structure.

In another aspect of the present invention, there is provided a method for detecting cfDNA having an unstable double-helix structure from a sample without amplification. Here, the method comprises a) a step of mixing a sample containing cfDNA with a positively charged substance; b) a step of isolating the positively charged substance to which the cfDNA is bound; c) a step of mixing the mixture with a probe and a marker; d) removing the probe and the marker which are not bound to the cfDNA; and e) detecting the marker.

Specifically, the method may comprise the step of mixing a sample containing cfDNA with a positively charged substance.

The sample may be a biological sample as described above. An embodiment thereof may be plasma or urine. In plasma or urine, cfDNA having a normal double-helix structure and cfDNA having an unstable double-helix structure may be present together. In addition, the positively charged substance may specifically be a positively charged nanowire. The positively charged nanowire is as described above.

The above steps may specifically be carried out in the following order and under the following conditions. First, immediately upon receipt of a patient's plasma, urine, saliva, sputum, or the like, centrifugation is performed at 4° C. for 10 minutes at 3,000×g. Thereafter, the patient's plasma, urine, saliva, sputum, or the like is diluted in DPBS at a certain ratio. Then, in case of plasma, 30 µl of plasma is mixed with 120 µl of distilled water (DW) and placed in a spin column (Type G or Type Q). Polypyrrole (PEI/Ppy) nanowires (20 µl) whose surface is modified with polyethyleneimine are added thereto, and mixing is performed using a thermomixer at room temperature for 20 minutes at a speed of 1,200 rpm.

Next, the method may comprise a step of isolating the positively charged substance to which the cfDNA is bound.

The method of isolating the positively charged substance may be carried out by centrifugation or application of negative pressure such as vacuum. cfDNA binds to a positively charged substance. Thus, when the sample mixed with the positively charged substance is placed in a spin column or a vacuum column and centrifugation is performed or negative pressure is applied, the positively charged substance such as the nanowire does not pass through a filter in the column, whereas other ingredients in the biological sample pass through the filter. Therefore, the positively charged substance to which the cfDNA is bound can be isolated through a method such as centrifugation or vacuum. In addition, in order to remove impurities from the thus isolated nanowires, a washing step may be additionally performed one to three times. For washing, a conventional method may be appropriately used.

The above step may specifically be carried out in the following order and under the following conditions. The spin column is mounted on a device for applying vacuum, and then suction is performed at 550 mBar. For washing, 400 µl of 1×DPBS is added thereto and suction is performed again. The same process may be repeated one more time.

In an embodiment, when a temperature treatment is performed, the spin column for which suction has been completed may be placed in a heat block preheated to 95° C., incubated at 95° C. for 1 minute, and then immediately taken out therefrom. Samples under conditions that do not require a temperature denaturation step may not go through this process.

Next, the method may comprise a step of mixing the mixture with a probe and a marker.

A probe may be composed of 15-mer to 30-mer nucleotides, or 20-mer to 25-mer nucleotides, as described above. The sequence of a probe may be designed to be capable of complementarily binding to cfDNA to be detected which has an unstable double-helix structure. In particular, the cfDNA having an unstable double-helix structure may be tumor-derived ctDNA. In addition, the cfDNA having an unstable double-helix structure may be designed to be capable of complementarily binding to a gene known as a cancer biomarker.

In addition, the marker may be a substance, such as a fluorescent protein or HRP, which can be detected under specific conditions. Here, the marker may contain a substance capable of binding to the probe. Specifically, when biotin is bound to the marker, avidin or streptavidin may be bound to the marker. In an embodiment, in order to increase sensitivity of detection, the marker may have a nanoparticle form in which several HRP molecules and several streptavidin molecules are aggregated.

The above step may specifically be carried out in the following order and under the following conditions. A probe (200 µl) and a solution (200 µl) of HRP/STR nanoparticles suitable for each experiment are respectively placed in a spin column. Mixing was performed at room temperature for 30 minutes at a speed of 850 rpm to 1,000 rpm.

Next, the method may comprise a step of removing the probe and the marker which are not bound to the cfDNA.

This is a step of removing a probe which is not bound to cfDNA. A 15-mer to 30-mer probe is also negatively charged and may be bound to a positively charged nanowire. Therefore, after completion of the mixing reaction, residual probe and marker should be removed from the reaction solution. Here, the probe and the marker may be removed by centrifugation or using negative pressure. Here, cfDNA is strongly bound to a positively charged substance, specifically a positively charged nanowire, as compared with a short-stranded probe. In the step of removing a probe and a marker, cfDNA is bound to the positively charged substance, and thus is not removed.

An embodiment of the above step may specifically be performed in the following order. After performing the above step, negative pressure is applied to the spin column, and suction is performed. Then, 400 µl of 1×DPBS is added thereto, and suction is performed again. The same process may be repeated one more time.

Finally, the method may comprise a step of detecting the marker.

A method of detecting the marker may be performed differently depending on the marker used. Detection of the marker may be measured by color change, UV absorbance change, fluorescence response change, or electrochemical change. For example, when HRP is used as a marker, the marker may be detected by observing a color development reaction. In addition, when the marker is a fluorescent protein such as GFP, the presence or absence of the marker may be detected by irradiating the marker with a light of a specific wavelength, and then observing the detected light.

An embodiment of the above step may specifically be performed in the following order. To the spin column are sequentially added 200 µl of sodium acetate buffer (0.2 M, pH 7.0), 50 µl of TMB (10 mM), and 50 µl of H2O2 (0.1 M). Then, incubation is performed for 3 minutes. Thereafter, centrifugation is performed for 30 seconds at a speed of 3,500 rpm to 5,000 rpm. The solution collected in a collection tube is transferred to 96 wells at 200 µl per well, and then the absorbance at a wavelength range of 500 nm to 850 nm is measured using a UV/VIS spectrophotometer.

Further, the method may additionally comprise an additional treatment process in order to increase difference in reactivity, with the probe, of cfDNA having a normal double-helix structure and cfDNA having an unstable double-helix structure. The additional treatment process may be performed after obtaining the sample or after isolating the cfDNA.

Additionally, prior to the step c), the method may further comprise a step of subjecting the sample or the cfDNA bound to the positively charged substance to denaturation under any one condition selected from the group consisting of i) a condition of being allowed to stand at room temperature for 1 to 10 minutes; ii) a condition of being heated at 90° C. to 95° C. for 1 second to 1 minute; iii) a condition of being heated at 75° C. to 90° C. for 10 seconds to 3 minutes; iv) a condition of being heated at 60° C. to 75° C. for 1 to 30 minutes; v) a condition of being heated at 25° C. to 40° C. for 5 to 60 minutes; vi) a condition of being treated with a protease for 1 to 10 minutes; and vii) a condition of being treated with DNase I for 1 to 10 minutes. Such a denaturation process does not cause stable cfDNA to undergo denaturation, and causes unstable cfDNA to be more unstably denatured so that the unstable cfDNA can more easily bind to the probe. The denaturation under the above condition may be performed after obtaining the sample. In addition, the denaturation may be performed after obtaining the cfDNA bound to the positively charged substance. In addition, the temperature, the protease, and the time for treatment with DNase may be appropriately adjusted as long as the stable cfDNA is not denatured.

Figure 31:
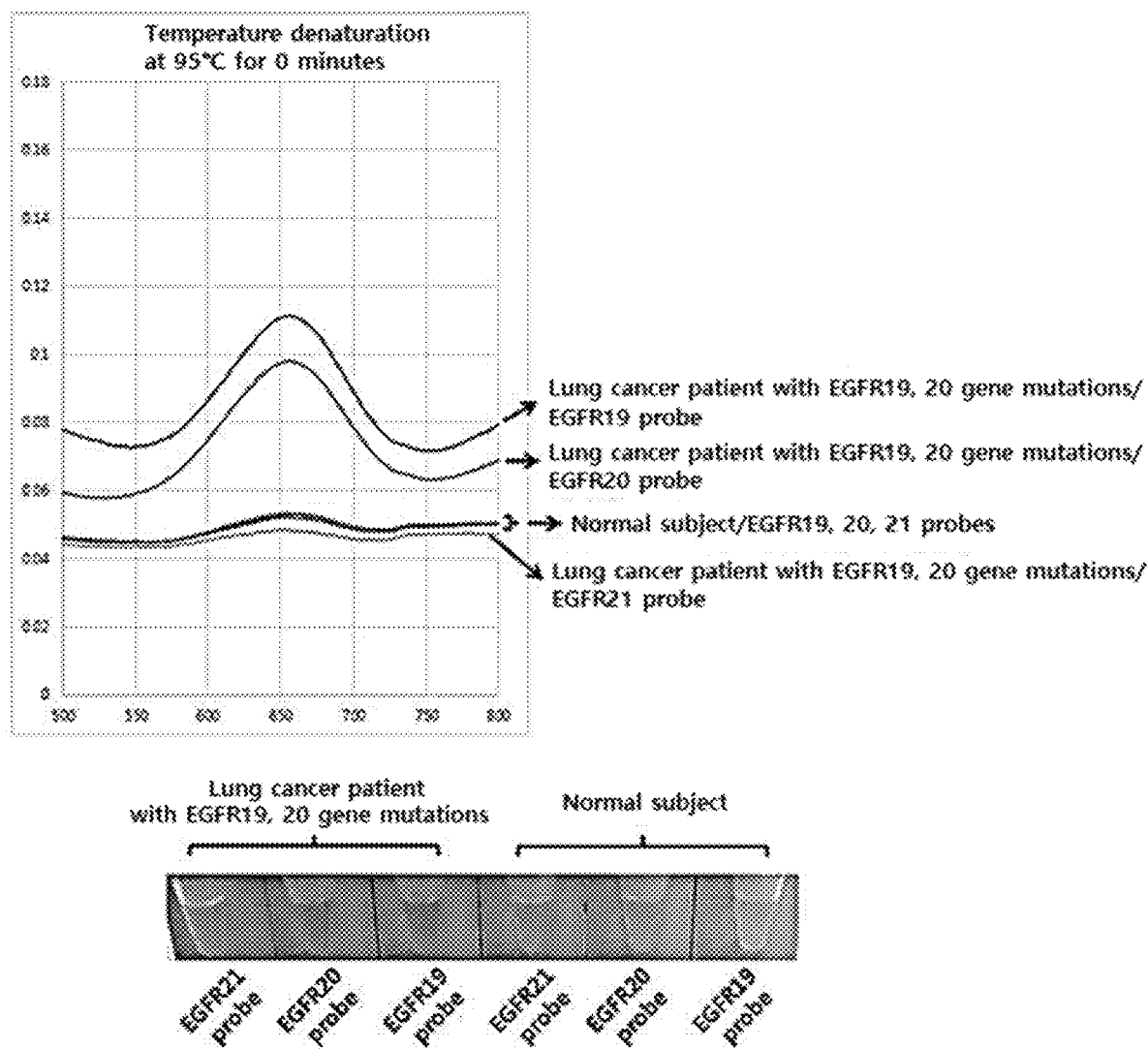
FIGS. 31, 32, and 33 illustrate results obtained by capturing, through nanowires, cfDNAs from the plasma of lung cancer patients with EGFR exon 19 deletion and EGFR exon 20 T790M gene mutations and normal subjects, subjecting the cfDNA to denaturation at 95° C. for 0 minutes (FIG. 31), 1 minute (FIG. 32), and 10 minutes (FIG. 33), respectively, and then identifying reaction thereof with a probe for EGFR 19 deletion, 20 T790M, or 21 L858R.
Figure 32:
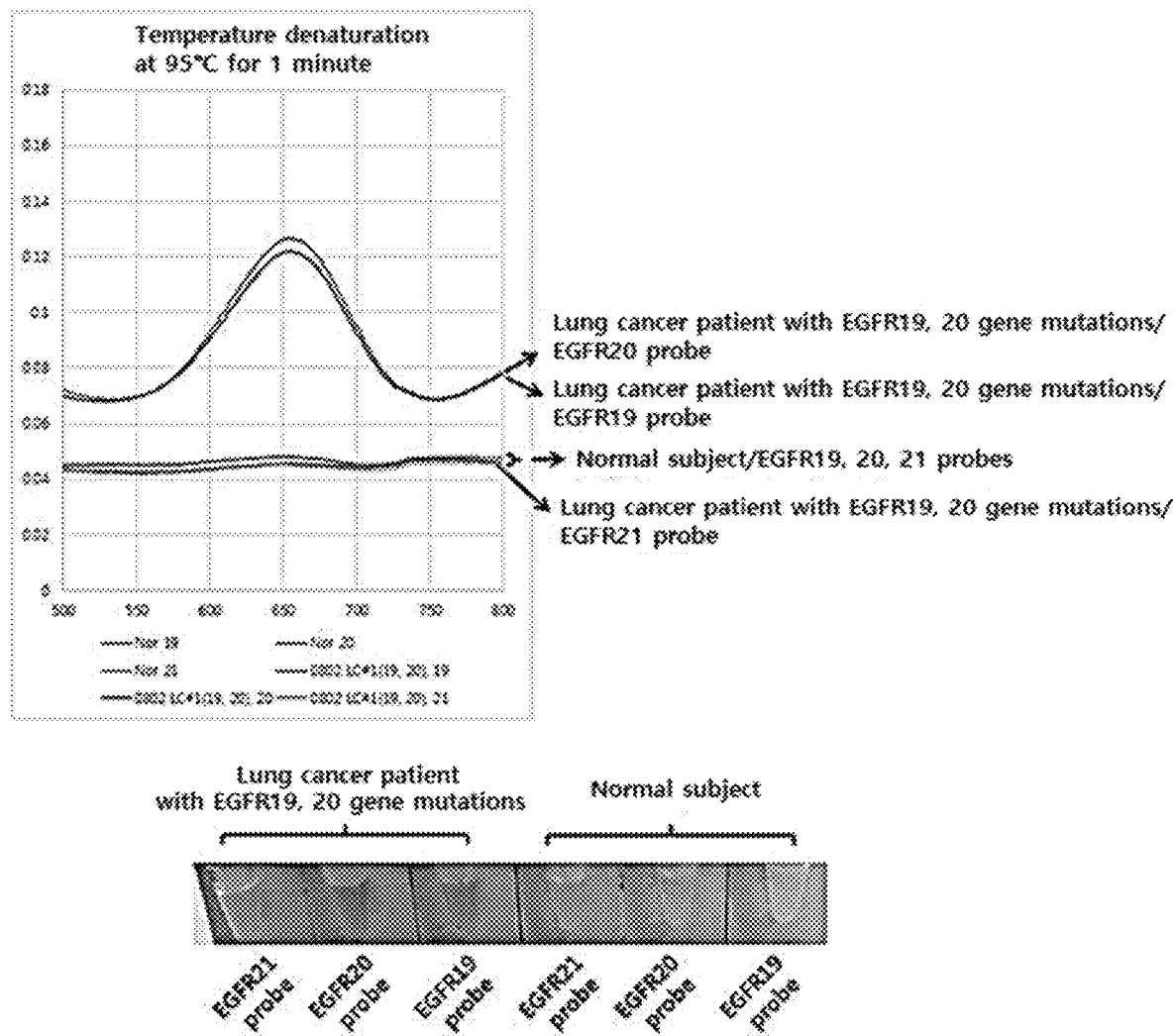
Figure 33:
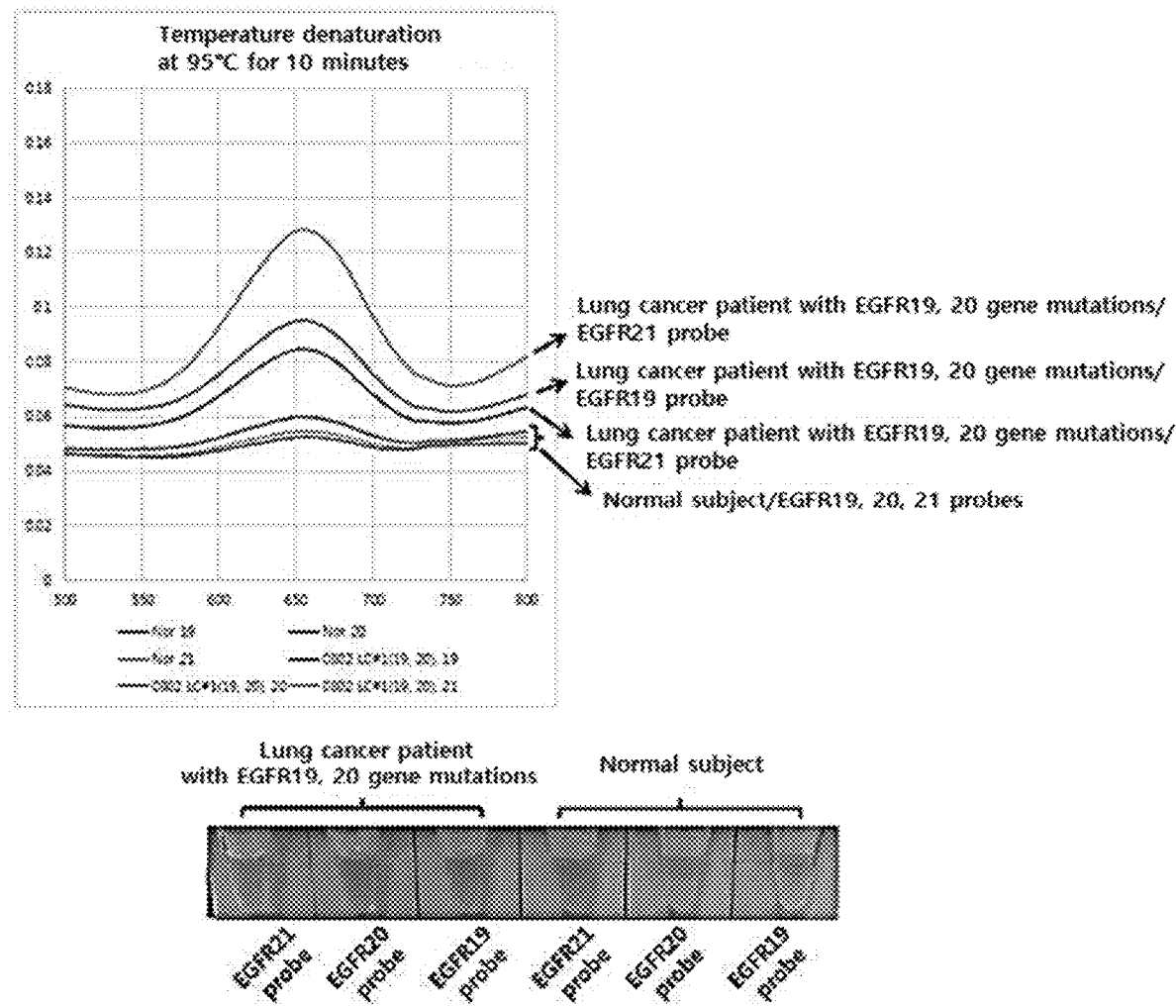

In an embodiment of the present invention, it has been identified that the cfDNA having an unstable double-helix structure to be detected can be detected using a target probe without a separate denaturation step (FIG. 31). Further, it has been identified that the cfDNA having a stable double-helix structure and the cfDNA having an unstable double-helix structure still show different binding reactions to the same probe even when such cfDNAs are subjected to a temperature treatment process (FIGS. 32 and 33).

<Method for Providing Information for Diagnosis Through Detection of Unstable cfDNA>

In yet another aspect of the present invention, there is provided a method for providing information for the diagnosis or prediction of cancer and an infectious disease by detecting cfDNA having an unstable double-helix structure from a sample without amplification. Here, the method comprises a) mixing a sample containing cfDNA with a positively charged substance; b) isolating the positively charged substance to which the cfDNA is bound; c) mixing the mixture with a probe and a marker; d) removing the probe and the marker which are not bound to the cfDNA; e) detecting the marker; and f) a step of determining that there is cancer or an infectious disease associated with a gene corresponding to the cfDNA having an unstable double-helix structure, when the marker is detected. Specifically, the method for detecting unstable cfDNA is as described above.

An embodiment of the cancer used in the present specification may be any one selected from the group consisting of bladder cancer, bone cancer, blood cancer, breast cancer, melanoma, thyroid cancer, parathyroid cancer, bone marrow cancer, rectal cancer, throat cancer, laryngeal cancer, lung cancer, esophageal cancer, pancreatic cancer, colorectal cancer, gastric cancer, tongue cancer, skin cancer, brain tumor, uterine cancer, head or neck cancer, gallbladder cancer, oral cancer, colon cancer, perianal cancer, central nervous system tumor, liver cancer, and colorectal cancer. In particular, the cancer may be gastric cancer, colorectal cancer, liver cancer, lung cancer, or breast cancer.

In an embodiment, the sequence specifically present in the above cancer cells may be an SNP present in the cancer cells. In case of gastric cancer, an embodiment of the sequence specifically present in the cancer may be mutations in p53 and PTEN, which are known as tumor suppressor genes. In addition, in case of colorectal cancer, an embodiment thereof may be mutations in APC and MSH2 genes. In addition, in case of liver cancer, since a major cause thereof is infection with hepatitis B virus (HBV) or hepatitis C virus (HCV), HBV or HCV nucleic acid may be a target. In addition, in case of lung cancer, a mutation in epidermal growth factor receptor (EGFR) gene may be a target; and in case of breast cancer, a mutation in BRCA1/2 gene may be a major target. In addition, in case of cervical cancer, cfDNA derived from human papillomavirus DNA (HPV DNA) may be a target.

Another embodiment of the unstable dsDNA may be at least one gene mutation selected from the group consisting of EGFR, KRAS, BRAF, TP53, PIK3CA, ROS1, RET, c-Met, PTEN, RB1, AR, BRCA, KIT, FGFR, IDH, ESR1, HER2, ALK-EML4, and TMPRSS2-ERG.

<Device for Detecting Unstable cfDNA>

In still yet another aspect of the present invention, there is provided a device for detecting cfDNA having a double-helix structure that is unstable at room temperature, comprising a) a mixing section for mixing a sample containing cfDNA with a positively charged nanowire; b) an obtainment section for removing the sample excluding the nanowire to which the cfDNA is bound; c) a reaction section for adding, to the nanowire to which the cfDNA is bound, a probe to which biotin capable of complementarily binding to the cfDNA is bound, and a nanoparticle comprising streptavidin and a marker; d) a detection section for detecting the marker; and e) an information processing section for determining that the sample contains cfDNA which has a sequence complementary to the detection probe and has a double-helix structure that is unstable at room temperature in accordance with detection of the marker.

<Diagnostic Device Using Detection of Unstable cfDNA>

In still yet another aspect of the present invention, there is provided a device for providing information for the diagnosis or prediction of cancer or an infectious disease by detecting cell-free DNA having an unstable double-helix structure from a sample without amplification. Here, the device comprises a) a mixing section for mixing a sample containing cfDNA with a positively charged nanowire; b) an obtainment section for removing the sample excluding the nanowire to which the cfDNA is bound; c) a reaction section for adding, to the nanowire to which the cfDNA is bound, a probe to which biotin capable of complementarily binding to the cfDNA is bound, and a nanoparticle comprising streptavidin and a marker; d) a detection section for detecting the marker; and e) an information processing section for determining that the sample contains cfDNA which has a sequence complementary to the detection probe and has a double-helix structure that is unstable at room temperature in accordance with detection of the marker.

The present invention is based on difference in reactivity, with a probe, of stable cfDNA and unstable cfDNA due to difference in thermodynamic stability thereof. Here, the positively charged nanowire may bind to genomic DNA and cfDNA. However, the genomic DNA is separated from the positively charged nanowire upon washing, due to its difference in binding force and size. In addition, in an embodiment, the nanowire may be made to contain biotin when it is modified. However, in the process of modifying the surface of the nanowire with polyethyleneimine which is a cationic polymer, biotin contained in the nanowire and exposed on the surface of the nanowire binds to the cationic polymer. In addition, the nanowire is coated with the cationic polymer, and thus a marker containing streptavidin does not bind to the nanowire. In addition, as the probe is also negatively charged, it may be bind to the nanowire which is positively charged. However, it has been found that the probe is removed during a washing process due to a weaker binding force than the cfDNA.

In addition, stable cfDNA and unstable cfDNA were treated with a probe (CP) capable of specifically binding to a region containing a damaged DNA sequence and a probe (DP) capable of specifically binding to a peripheral region not containing a damaged DNA sequence. As a result, it was possible to identify a different binding reaction to the probe between the cfDNA having an unstable double-helix structure and the cfDNA having a stable double-helix structure. From these results, it has been found that a cfDNA having an unstable double-helix structure can bind not only to a probe specific for the damaged DNA sequence but also to a probe capable of specifically binding to a peripheral DNA sequence thereof. In addition, it has been confirmed that the unstable cfDNA can be detected with only one of the probes.

Hereinafter, the present invention will be described in more detail by way of the following examples. However, the following examples are intended to only illustrate the present invention, and the scope of the present invention is not limited only thereto.

I. Experimental Methods, and Production of Nanowires, Markers, and Probes

Experimental Method 1. Method for Detecting Unstable cfDNA

Step 1: Preparation of Sample and Addition of Nanowires

Immediately upon receipt of the patient's plasma, urine, saliva, sputum, or the like, centrifugation was performed at 4° C. for 10 minutes at 3,000×g. The patient's plasma, urine, saliva, sputum, or the like was diluted in DPBS at a certain ratio. In case of plasma, 30 μl of plasma was mixed with 120 μl of DW and placed in a spin column (Type G or Type Q). PEI/Ppy nanowires (20 μl) were added thereto, and mixing was performed using a thermomixer at room temperature for 20 minutes at a speed of 1,200 rpm.

Step 2: Vacuum/Washing/Temperature Denaturation

The spin column was mounted on a vacuum suction device, and then suction was performed at 550 mBar. 400 μl of 1×DPBS was added thereto, and suction was performed again. The same process was repeated one more time. Only the nanowire-DNA complexes acquired through the 2-step process were trapped in the spin column. If a temperature denaturation is required, the spin column for which suction had been completed was placed in a heating block preheated to 95° C., incubated at 95° C. for 1 minute, and then immediately taken out therefrom. Samples that do not require a temperature denaturation step did not go through this process.

Step 3: Addition of Probes and HRP/STR NPs

A probe (200 μl) and a solution (200 μl) of HRP/STR NPs suitable for each experiment were respectively placed in spin columns. Mixing was performed using a thermomixer at room temperature for 30 minutes at a speed of 850 rpm to 1,000 rpm. The spin column was mounted on a vacuum device, and then suction was performed. 400 μl of 1×DPBS was added thereto and suction was performed again. The same process was repeated one more time.

Step 4: TMB Response for Detecting Gene Mutation

After replacing the collection tube with a new one, 200 μl of sodium acetate buffer (0.2 M, pH 7.0) and 50 μl of H2O2 (0.1 M) were sequentially added to the spin column using a syringe pump. Then, incubation was performed for 3 minutes. At the end of the incubation, the spin column was centrifuged for 30 seconds at a speed of 3,500 rpm to 5,000 rpm. The solution collected in the collection tube was transferred to 96 wells at 200 μl per well, and then the absorbance at a wavelength range of 500 nm to 850 nm was measured using a UV/VIS spectrophotometer.

Production Example 1. Production of Positively Charged Nanowires

As illustrated in FIG. 1, nanowires having a surface onto which polyethyleneimine (PEI) as a cationic polymer is conjugated were produced. One side of anodic aluminum oxide (AAO) was coated with a gold (Au) layer (having a thickness of about 150 nm) at $5 \times 10^{-3}$ mbar and 50 mA for 600 seconds, using the Q150T modular coating system (Quorum Technologies, UK). In all electrochemical experiments, measurement was performed with a gold (Au)-coated AAO template using a potentiostat/galvanostat (BioLogic SP-150) equipped with a platinum wire counter electrode and an Ag/AgCl (3.0 M NaCl type) reference electrode.

For the production of nanowires (PEI/Ppy NWs) whose surface is treated with a cationic polymer, electrochemical deposition was performed by applying, to pores of the AAO template, chronoamperometry for 7 minutes at 1.0 V (vs. Ag/AgCl) together with a 0.01 M pyrrole solution containing 0.01 M poly(4-styrene sulfonic acid) and 1 mg/ml of biotin.

The resulting AAO template was washed several times with distilled water, immersed in 2 M sodium hydroxide (NaOH) solution for 3 hours, and then placed in Bioruptor UCD-200 (Diagenode) for sonication, so that free-standing Ppy NWs doped with biotin molecules were obtained. Then, to the resulting nanowires were added 30 mM N-(3-dimethylaminopropyl)-N-ethylcarbodiimide hydrochloride (EDC) and 6 mM N-hydroxysuccinimide (NHS), so that carboxylic acid (—COOH) groups were activated. Subsequently, after the addition of a PEI solution, reaction was allowed to occur at room temperature for 1 hour and washing with water was performed. The nanostructures (PEI/Ppy NWs) having a surface onto which polyethyleneimine is conjugated were dispersed in deionized water and kept at room temperature until use.

With this production method, after selective dissolution of the AAO template, each polypyrrole (Ppy) nanowire was released from the AAO template, and cationic branched polyethylenimine (PEI) (25 kDa) was additionally conjugated to the nanowire through a biotin-streptavidin interaction.

Production Example 2. Production of Nanoparticles (PEI/Ppy NPs) Whose Surface is Treated with Cationic Polymer In order to produce nanoparticles (PEI/Ppy NPs) having a surface onto which polyethyleneimine is conjugated, 0.2 g of polyvinylpyrrolidone (PVP) was added to 12.5 ml of triple-distilled water and stirred for 30 minutes. Then, 65 µl of pyrrole was added thereto, and then the resultant was further stirred for 10 minutes. Then, 0.5 ml of FeCl₃ solution at a concentration of 0.75 g/ml was added thereto, and reaction was allowed to occur for 10 minutes. Thereafter, 20 ml of aqueous hyaluronic acid solution (400 mg/20 ml) was added thereto and the resultant was stirred for 3 hours.

Dialysis was performed against triple-distilled water for 2 days using a membrane having 50,000 MWCO pore size. Centrifugation was performed at 1,200 rpm for 3 minutes to remove large-sized particle aggregates, and then the resultant was lyophilized. 200 µg of Ppy-HA-NPs were added to 1 ml of triple-distilled water. Then, 100 mM EDC/50 mM NHS solution was added thereto, and reaction was allowed to occur for 45 minutes so that the carboxyl groups of hyaluronic acid were activated. Centrifugation was performed at 15,000 rpm for 10 minutes to remove the supernatant, during which washing was performed twice.

Subsequently, 100 mg/ml of PEI solution (solvent: 0.2 M sodium bicarbonate) was added thereto and reaction was allowed to occur overnight at 4° C. Then, centrifugation was performed at 15,000 rpm for 10 minutes to remove the supernatant, and then the resultant was kept in triple-distilled water. The shape of the nanoparticles (PEI/Ppy NPs) having a surface onto which polyethyleneimine is conjugated was observed using a scanning electron microscope. As illustrated in FIG. 6A, the shape of the nanoparticles (NPs) having an average of 50 nm to which PEI is conjugated was checked with a scanning electron microscope image (200 µm of scale bar).

Production Example 3. Production of Polypyrrole Nanoparticles Labeled with HRP and Streptavidin For the production of nanoparticles containing HRP and streptavidin, 0.5 g of polyvinylpyrrolidone (PVP) was added to 12.5 ml of triple-distilled water and stirred for 30 minutes. Then, 65 µl of pyrrole was added thereto, and the resultant was further stirred for 10 minutes. Thereafter, 0.5 ml of FeCl₃ solution at a concentration of 0.75 g/ml was added thereto, and reaction was allowed to occur for 3 hours. Then, 20 ml of aqueous hyaluronic acid solution (400 mg/20 ml) was added thereto and the resultant was stirred for 3 hours.

Figure 4:
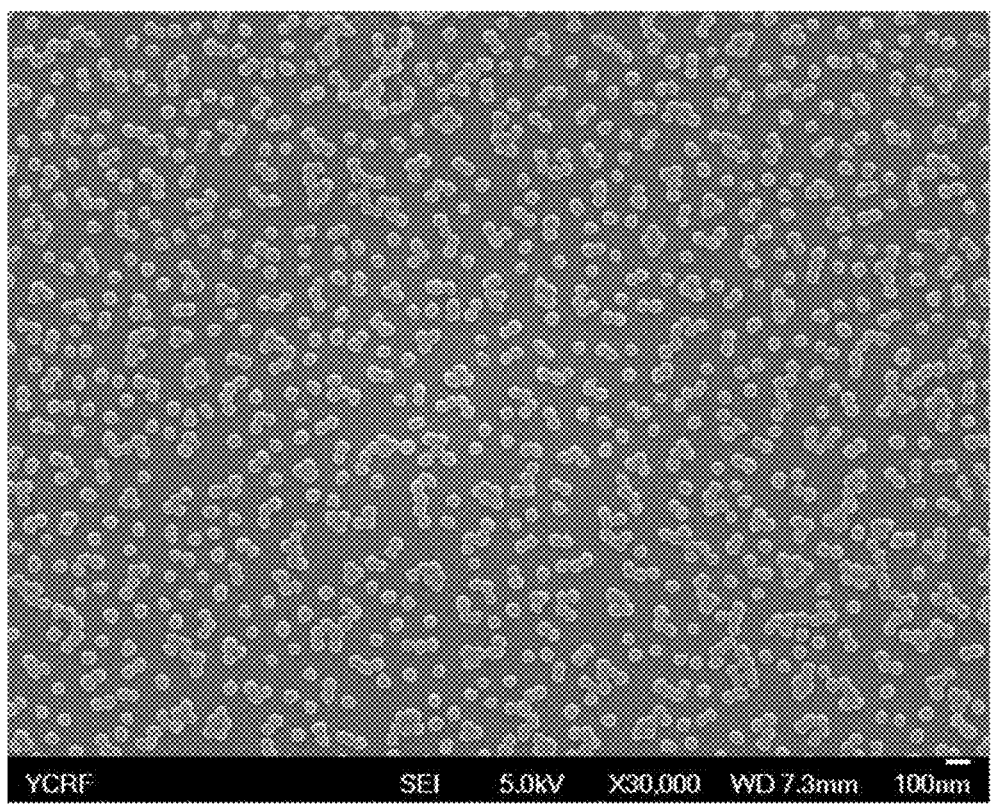
FIG. 4 illustrates a scanning electron microscope image of HRP/streptavidin-bound nanoparticles.
Figure 5:
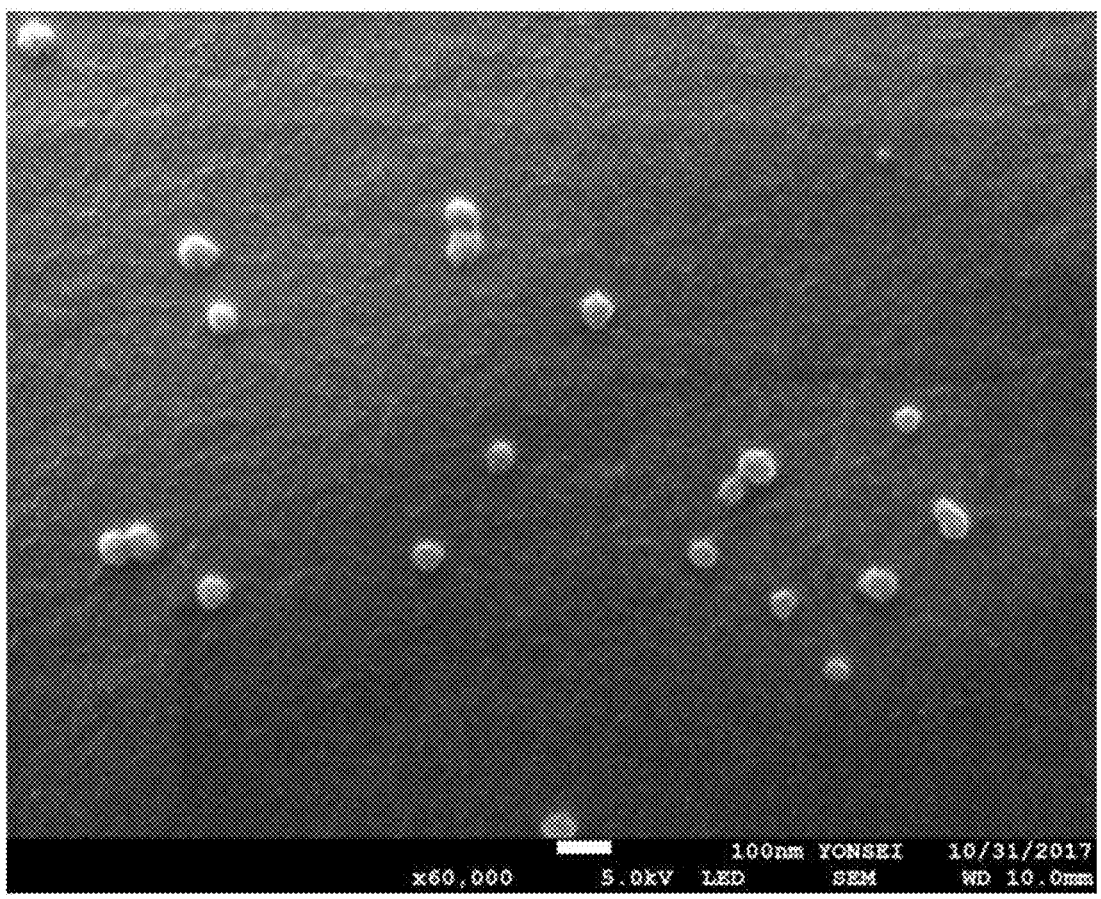
FIG. 5 illustrates a scanning electron microscope (SEM) image of PEI-bound nanoparticles (PEI/Ppy NPs) having a diameter of 50 nm.

Dialysis was performed against triple-distilled water for 2 days using a membrane having 50,000 MWCO pore size. Centrifugation was performed at 1,200 rpm for 3 minutes to remove large-sized particle aggregates, and then the resultant was lyophilized. 200 µg of Ppy-HA-NPs containing polypyrrole and hyaluronic acid were added to 1 ml of triple-distilled water. Then, a 100 mM EDC/50 mM NHS solution was added thereto, and reaction was allowed to occur for 45 minutes so that the carboxyl groups of hyaluronic acid were activated. Centrifugation was performed at 15,000 rpm for 10 minutes to remove the supernatant, during which washing was performed twice. 1 mg of HRP and 1 mg of streptavidin were added to Ppy-HA-NPs and mixed at a temperature of 4° C. Subsequently, centrifugation was performed at 15,000 rpm for 10 minutes to remove the supernatant, and then the resultant was kept in triple-distilled water. The shape of nanoparticles (HRP/st-tagged NPs) having a surface onto which HRP and streptavidin are conjugated was observed using a scanning electron microscope (FIG. 4).

Production Example 4. Production of Probes

Probes were produced to detect cfDNA having an unstable double-helix structure. The probes were produced differently depending on cfDNAs to be detected. Here, the probes were produced in the form in which biotin is bound thereto. The probes were produced as two types, that is, a first probe (hereinafter referred to as CP) complementarily binding to a region containing damaged DNA that causes an unstable double-helix structure, and a second probe (hereinafter referred to as DP) complementarily binding to a peripheral region of the damaged DNA.

II. Detection of cfDNA Using Two Probes

Example 1. Analysis of HPV-Derived cfDNA Present in Urine

In order to isolate cell-free HPV DNA from a urine sample, 10 µg/ml of the nanowires (PEI/Ppy NWs) whose surface is treated with a cationic polymer, produced in Example 1, was added to 200 µl of urine from an HPV-positive patient, and mixing was performed at room temperature for 30 minutes. The isolated cfDNA was denatured at 95° C. for 1 minute. Then, the first probe (CP) and the second probe (DP) which have biotin bound to ends thereof were added at 1 pM thereto, and reaction was allowed to occur at 37° C. for 1 hour. Then, polypyrrole nanoparticles (hereinafter referred to as HRP/st-tagged NPs) tagged with horseradish peroxidase (HRP) and streptavidin were added to the sample and incubation was performed at 37° C. for 30 minutes.

Subsequently, to the HPV-derived cfDNA were added 25 µl of 10 mM 3,3',5,5'-tetramethylbenzidine (TMB), 25 µl of 0.1 M H2O2, and 200 µl of 0.2 M sodium acetate trihydrate buffer (pH 5.0). Reaction was allowed to occur, together with the DNA sample, at room temperature for 3 minutes in the dark. In order to identify correlation between the HPV DNA concentration and the absorbance, UV-Vis detection was performed at a wavelength of 652 nm using DU 730 UV-Vis spectrophotometer (Beckman Coulter, USA).

As a result, it was possible to identify results obtained by amplifying colorimetric signals in such a degree that the colorimetric signals can be visually observed. Probe sequences for detecting HPV are shown in Table 2 below.

TABLE 2

| Probe label | Sequences | SEQ ID NO |
|---|---|---|
| HPV 16CP | 5'-biotin-GAG GAG GAG GAT GAA ATA GAT GGT-3' | SEQ ID NO: 1 |
| HPV 16DP | 5'-TTG GAA GAC CTG TTA ATG GGC-biotin-3' | SEQ ID NO: 2 |
| HPV 18CP | 5'-biotin-CAC ATT GTG GCA CAA TCT TTT A-3' | SEQ ID NO: 3 |
| HPV 18DP | 5'-GCC ATA TCG CTT TCA TCT GT-biotin-3' | SEQ ID NO: 4 |
| EGFR 19 deletion CP | 5'-GGAATTAAGAGAAGCAACATCTCC-3' | SEQ ID NO: 5 |

TABLE 2-continued

| Probe label | Sequences | SEQ ID NO |
|---|---|---|
| EGFR 19 deletion DP | 5'-AACCTCAGGCCCACCTTTT-3' | SEQ ID NO: 6 |
| EGFR 21 L858R CP | 5'-CCAGGAACGTACTGGTGAAAA-3' | SEQ ID NO: 7 |
| EGFR 21 L858R DP | 5'-GGAAGAGAAAGAATACCATGCA-3' | SEQ ID NO: 8 |

Figure 12:
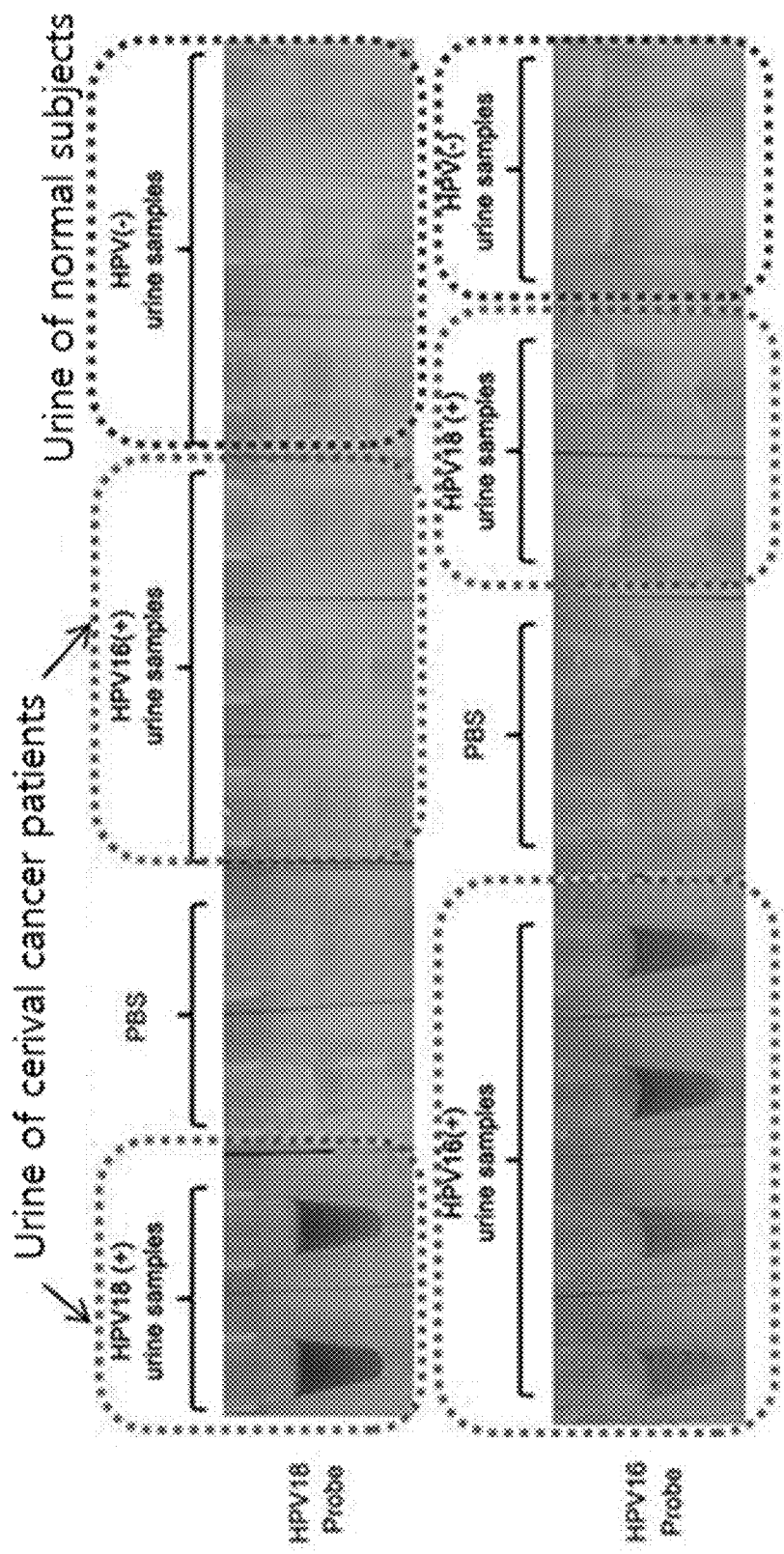
FIG. 12 illustrates results obtained by obtaining cfDNAs from urine samples of cervical cancer patients and urine samples of normal subjects, and then detecting the presence or absence of gene mutations in the cfDNAs using an HPV 18 or HPV 16 probe.

In addition, a PCR-free colorimetric assay was performed to evaluate urine samples of HPV positive cervical cancer patients (HPV16 (+) and HPV18 (+)) and an HPV negative healthy control (HPV−). As a negative control, PBS was used. As a result, as illustrated in FIG. 12, the target HPV DNA isolated using nanowires was mixed with CP and DP, and HRP/st-tagged NPs were added thereto. Then, color change was observed. Denaturation was performed at 95° C. for 1 minute for analysis of the isolated cfDNA.

Figure 13:
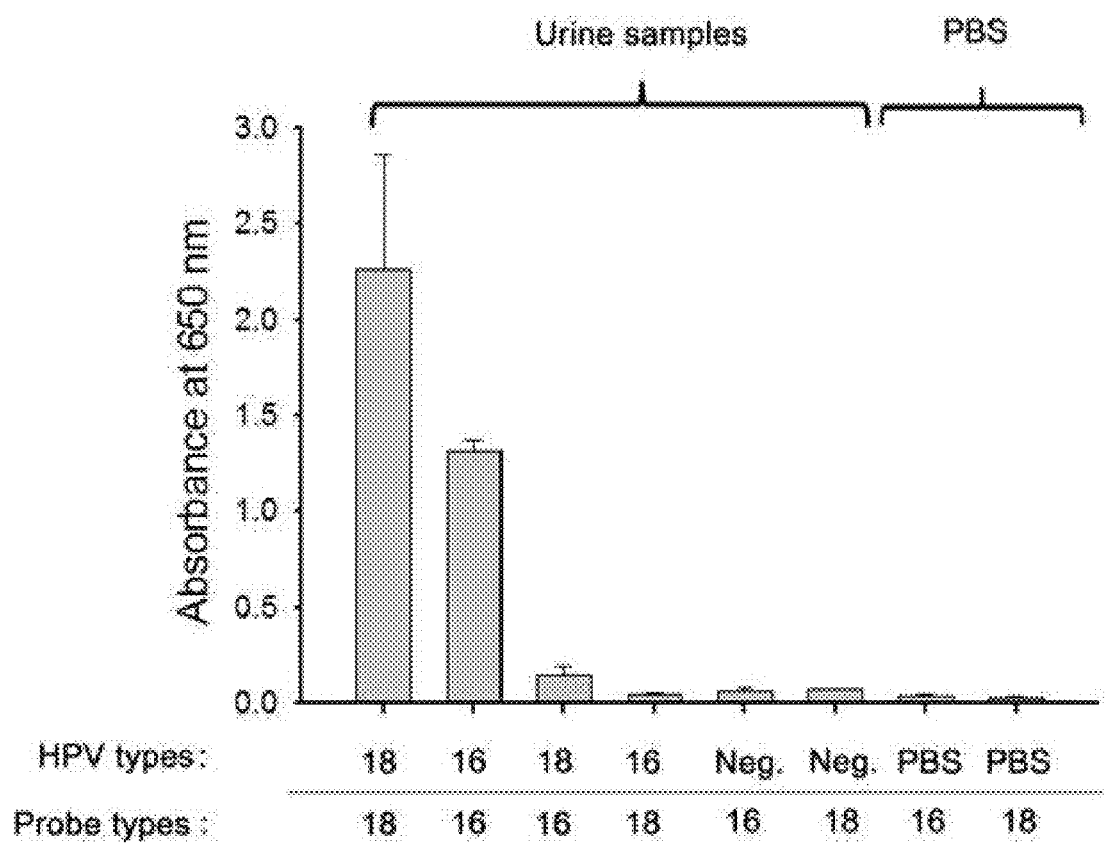
FIG. 13 illustrates a result obtained by identifying, through absorbance, binding between cfDNAs present in the urine of HPV-positive cervical cancer patients (HPV16 (+) and HPV18 (+)) and an HPV-negative healthy control (HPV−), and a probe specific for HPV 18 or HPV 16.

A total of 24 HPV positive and HPV negative urine samples were collected and tested. As a result, it was identified that cfDNAs isolated from the urine of HPV positive cervical cancer patients (HPV16 (+) and HPV18 (+)), and HPV negative healthy control (HPV−) different absorbance values (FIG. 13). Here, probes specifically binding to HPV16 or HPV18 were used, and denaturation was performed at 95° C. for 1 minute for analysis of the isolated cfDNA.

Figure 14:
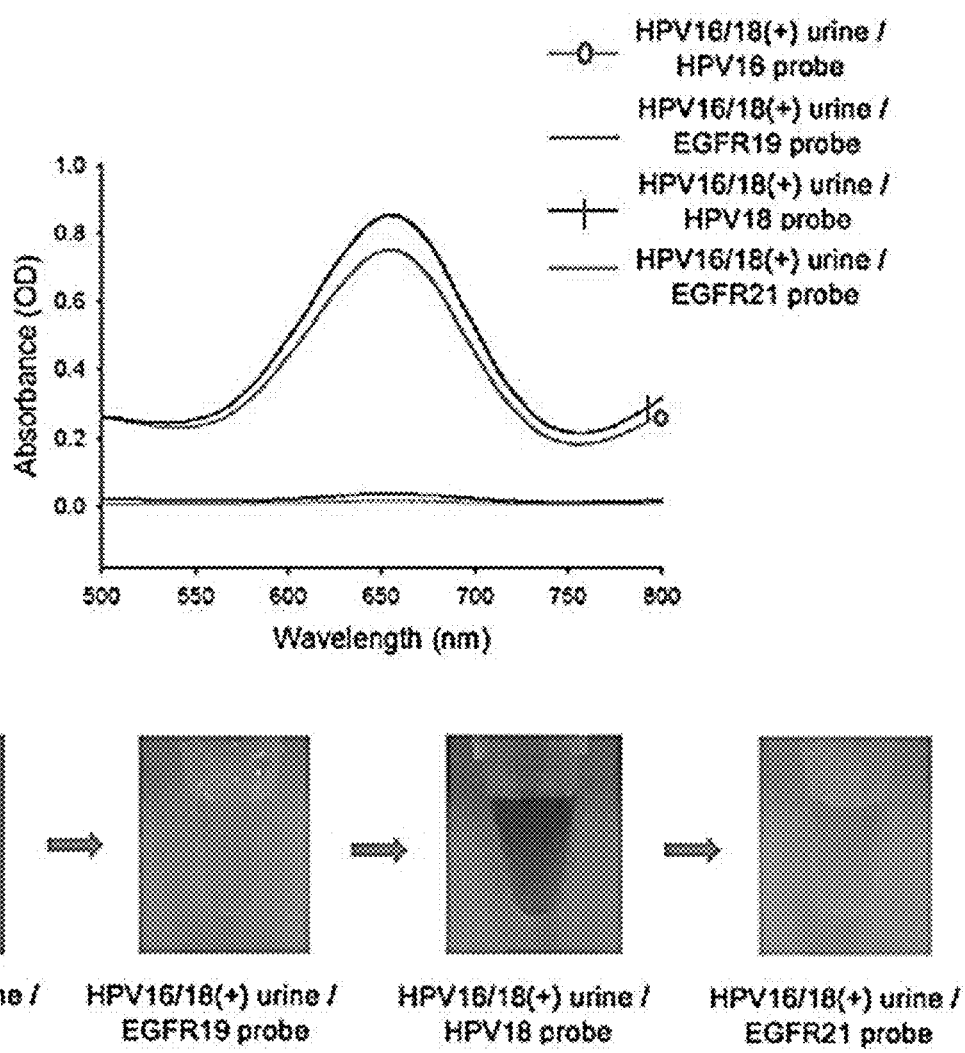
FIG. 14 illustrates results obtained by subjecting cfDNAs isolated from the urine of cervical cancer patients to sequential reactions with probes specific for HPV 16, EGFR19 deletion, HPV 18, and EGFR 21 L858R, and then identifying binding between the cfDNAs and each probe.

In addition, no reaction was observed when non-HPV probes such as EGFR 19 and EGFR 21 were used; and it was found that color change and UV absorbance change occurred as a result of type-specific binding between the target HPV and its complementary probe (FIG. 14). Here, denaturation was performed at 95° C. for 1 minute for analysis of the isolated cfDNA.

Example 2. Identification of Mutation of EGFR Gene Through DNA Analysis of Lung Cancer Cell Line

Figure 15:
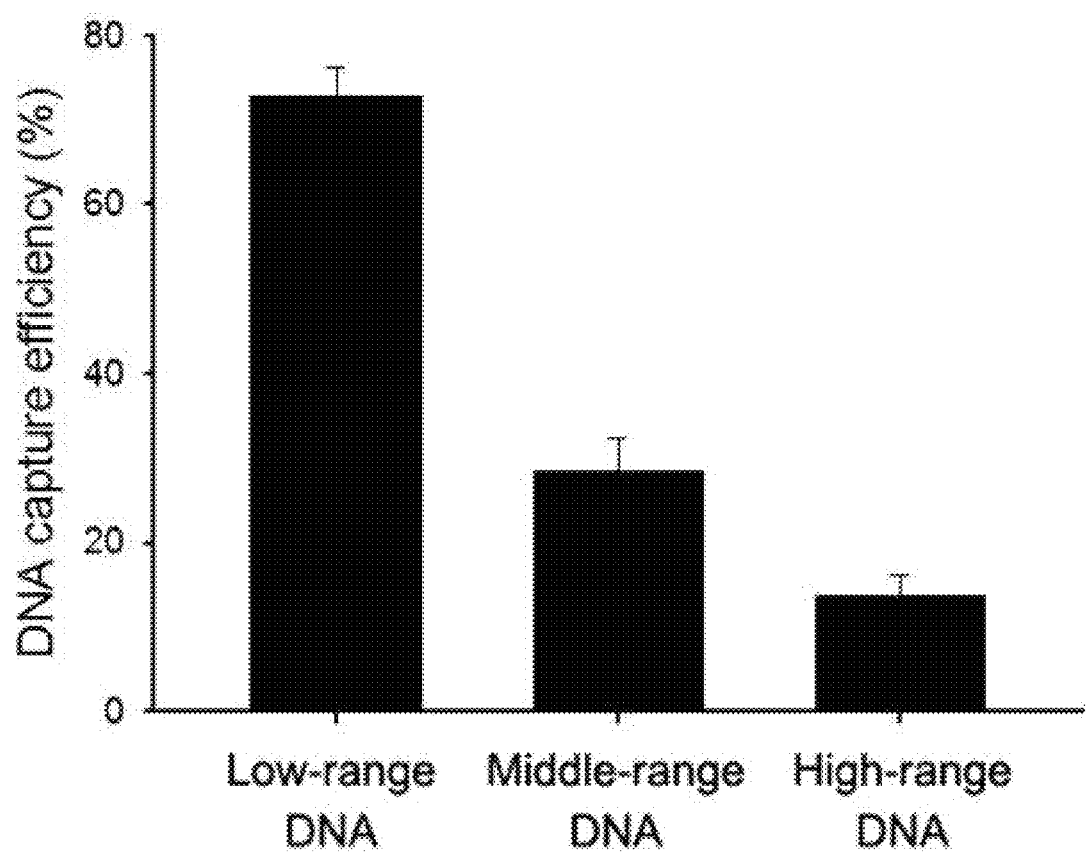
FIG. 15 illustrates a result obtained by adding, to the plasma of normal subjects, low range (10 bp to 100 bp), middle range (100 bp to 2 kb), and high range (3.5 kb to 21 kb) DNA ladders, and then evaluating capture efficiency in a case of capturing the DNA ladders using PEI/Ppy NWs.

Example 2.1. Identification of Size of cfDNA that can be Obtained Through Nanowires Low range (10 bp to 100 bp), middle range (100 bp to 2 kb), and high range (3.5 kb to 21 kb) DNA ladders were added to the plasma of normal subjects, and then capture efficiency was checked using nanowires (PEI/Ppy NWs). It was identified that nanostructures are efficient in capturing small-sized DNA (FIG. 15).

Figure 16:
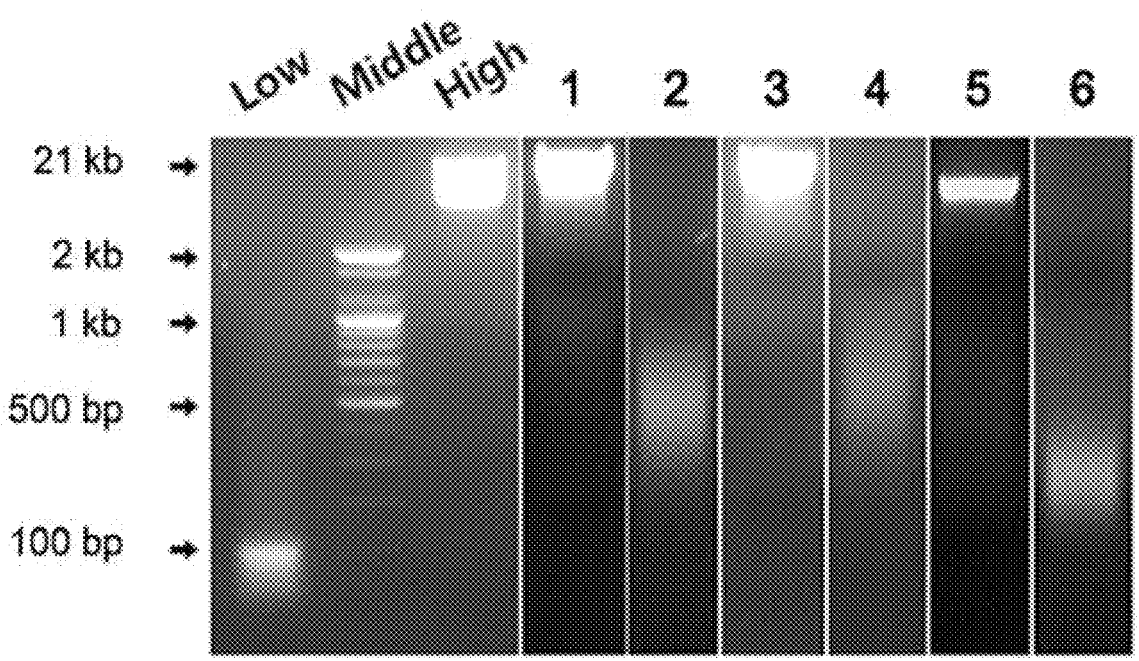
FIG. 16 illustrates a result obtained by identifying sizes of cell line genomic DNA (hereinafter referred to as gDNA) obtained by degrading A549 cell line (lanes 1 and 2), HCC2279 cell line (lanes 3 and 4), and H1975 cell line (lanes 5 and 6) without sonication, and fragmented DNA (hereinafter referred to as fDNA) obtained by sonicating the gDNA of each cell line.
Figure 17:
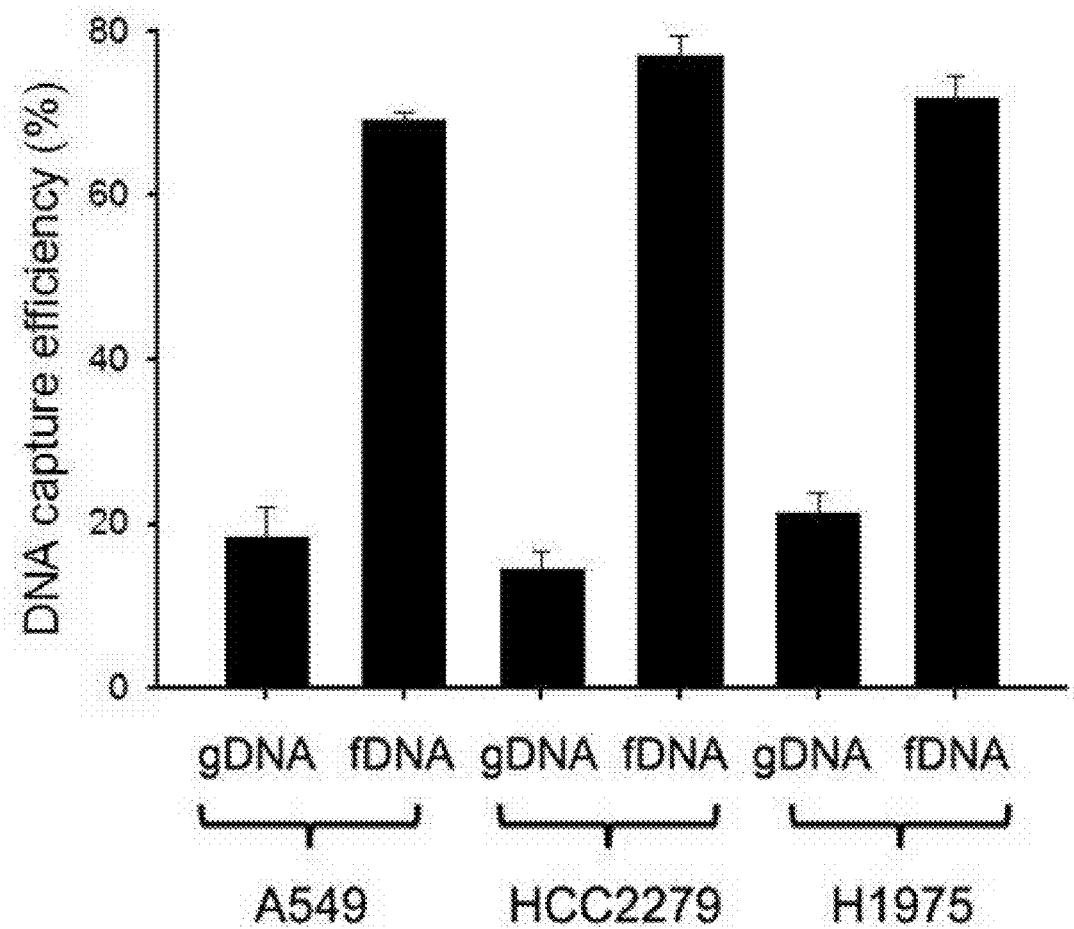
FIG. 17 illustrates a result obtained by capturing, using PEI/Ppy NWs, gDNAs obtained from A549 cell line, HCC2279 cell line, and H1975 cell line without sonication, and fDNAs obtained by sonicating the respective cell lines, and then evaluating capture efficiency.

Using the nanowires, genes were obtained from H1975 (cell line with EGFR exon 20 T790M, 21 L858R gene mutations), HCC2279 (cell line with EGFR exon 19 deletion gene mutation), and A549 cell line (cell line without EGFR exon gene mutation). Then, genomic DNAs (gDNAs) which had not been subjected to sonication and fragmented DNAs (fDNAs) which had been subjected to sonication were used to compare efficiency captured by the nanostructures. As a result, it was identified that when the nanostructures are used, higher capture efficiency was observed for fDNA than gDNA (FIGS. 16 and 17).

Example 2.2. Detection of EGFR Mutation Through Analysis of Unstable cfDNA

Figure 18:
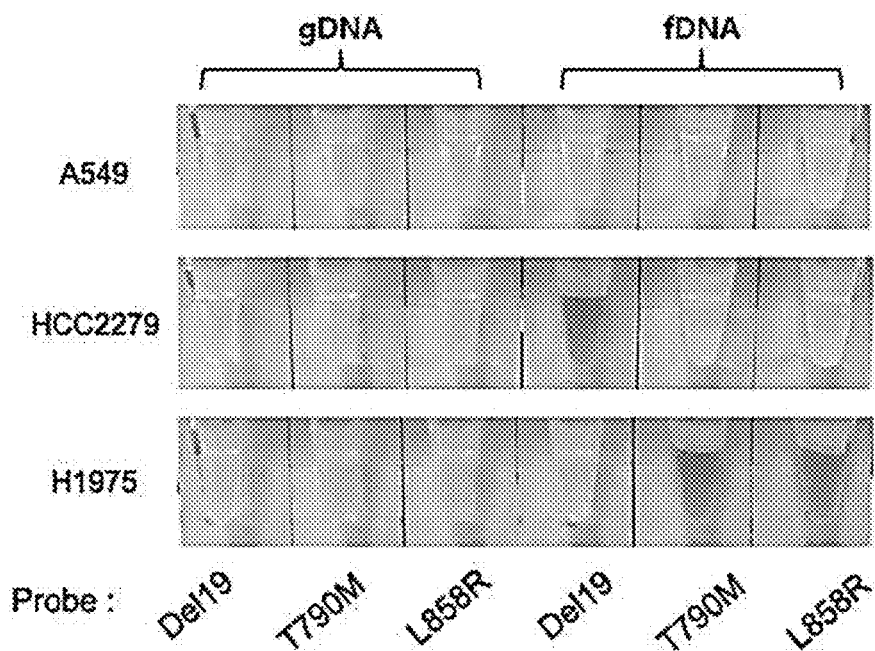
FIGS. 18 and 19 illustrate results obtained by capturing, using PEI/Ppy NWs, gDNAs obtained from A549 cell line, HCC2279 cell line, and H1975 cell line without sonication, and fDNAs obtained by sonicating the respective cell lines, and then identifying color change and UV-Vis spectral change by the addition of probes specific for EGFR 19 (19Del), EGFR 20 (T790M), and EGFR 21 (L858R). It has been identified that only the fDNAs selectively bind to the target probes.
Figure 19:
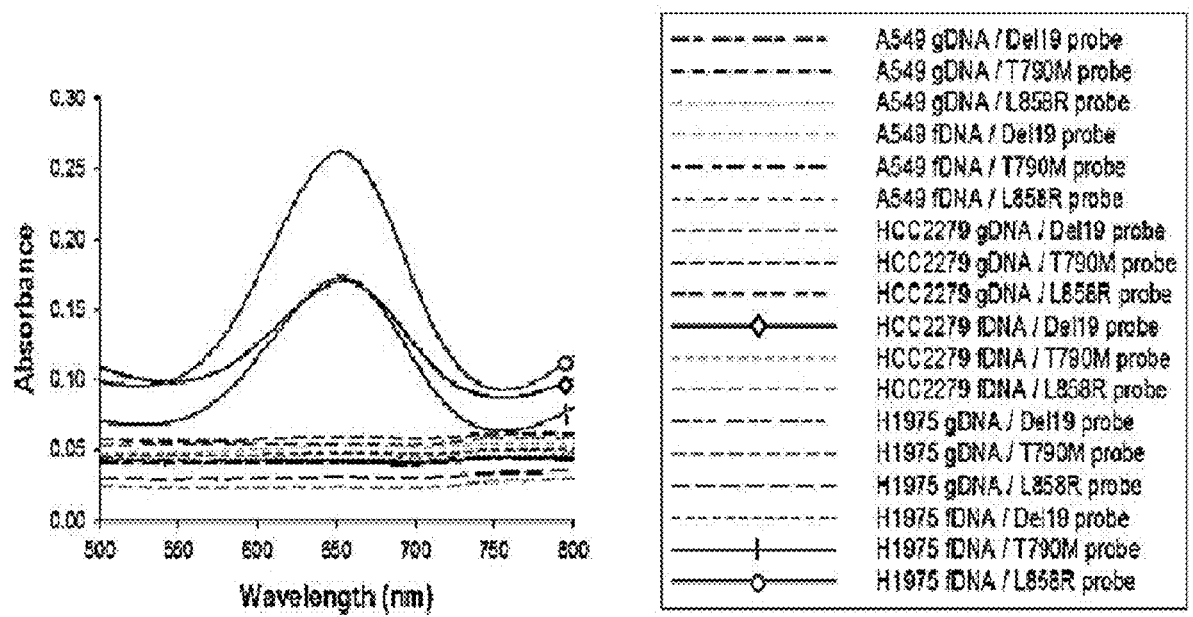

A PCR-free colorimetric assay was performed to isolate gDNAs and fDNAs, using nanostructures, from EGFR exon 20, 21 positive H1975 cell line, EGFR exon 19 positive HCC2279 cell line, and A549 cell line with no EGFR gene mutation. Thereafter, probes for EGFR exon 19, 20, and 21 were added thereto and mixing was performed. Then, HRP/st-tagged NPs were added thereto, and color changes were observed. As a result, it was possible to identify that the nanostructures were much more effective in capturing small-sized DNA, that is, fDNA, and that there were clear color change and UV-Vis spectral change as compared with gDNA (FIGS. 18 and 19).

Example 2.3. Detection of cfFNA Using Fluorescent Dyes

In order to identify whether gene mutations can be detected from plasma samples of lung cancer patients using target probes, such possibility was examined by using a fluorescent dye. H1975 (cell line with EGFR exon 20 T790M, 21 L858R gene mutations), HCC2279 (cell line with EGFR exon 19 deletion gene mutation), and A549 cell line (cell line with no EGFR exon gene mutation) were subjected to sonication, and then the acquired DNAs (fDNAs) were captured through nanowires. Then, the fDNAs were denatured at 95° C. for 1 minute, and then mixed with probes specific for EGFR19, 20, and 21. Gene mutations for the cell lines were checked using a fluorescent dye (Alexa488) bound to the probes.

Figure 20:
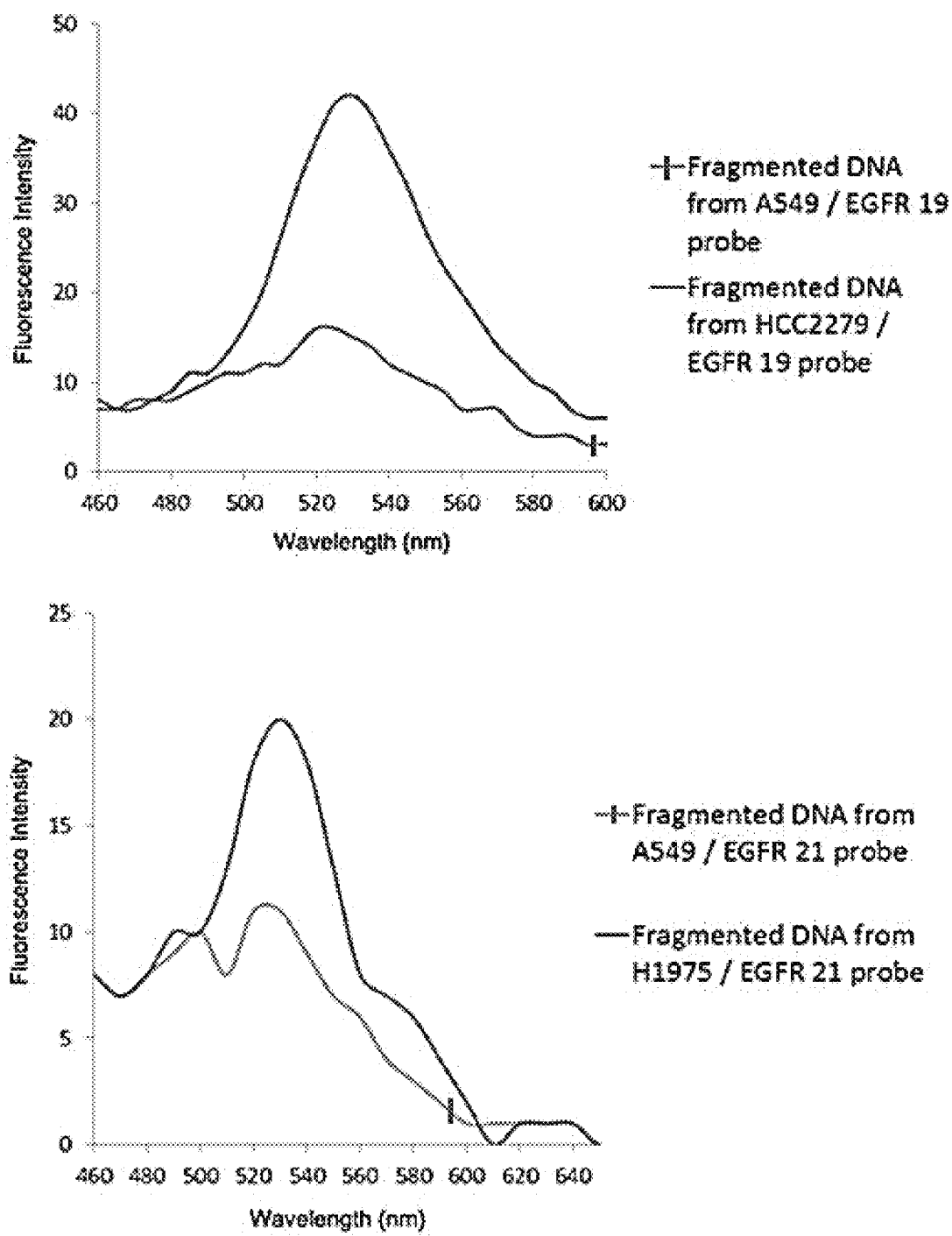
FIG. 20 illustrates results obtained by obtaining, using PEI/Ppy NWs, fDNAs of H1975 cell line, HCC2279 cell line, and A549 cell line, and then analyzing gene mutations using DNA probes to which a fluorescent dye is bound.

As a result, in the A549 cell line, fluorescence was not detected when reacted with the probes for EGFR 19 and 21. However, it was possible to detect fluorescence with regard to the probes for EGFR 19 and 20 in H1975 and HCC2279 (FIG. 20).

Figure 21:
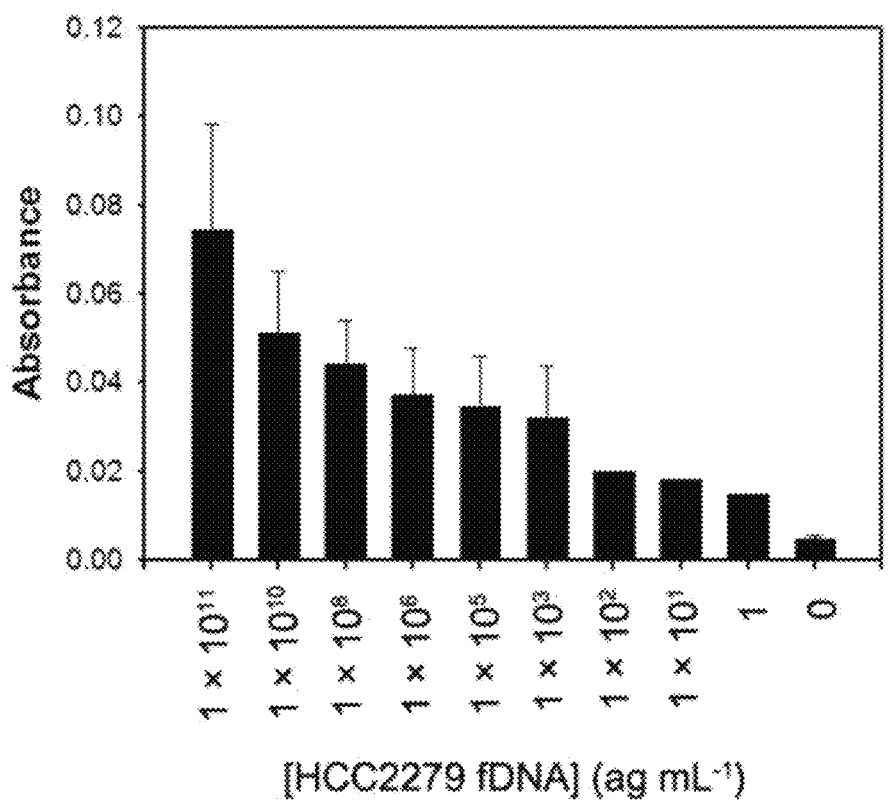
FIG. 21 illustrates a result obtained by making use of fDNA of HCC2279 (EGFR exon 19 deletion gene mutation) cells and a probe specific for EGFR exon 19 deletion, and analyzing, using UV absorbance, binding of the fDNA to the probe depending on concentrations of the fDNA. Through this, detectable concentrations of cfDNA have been identified.
Figure 22:
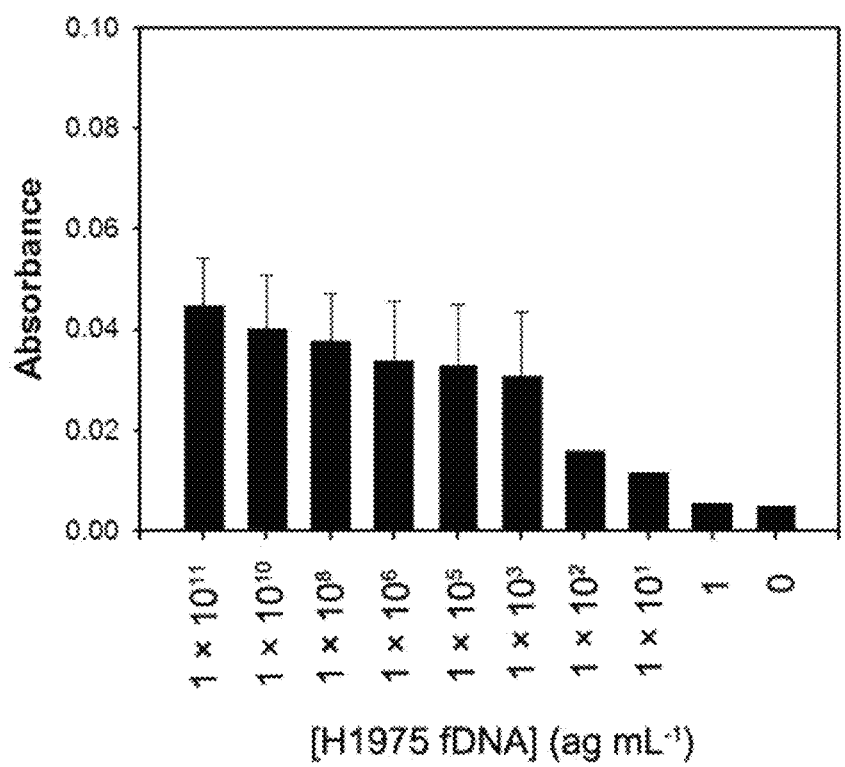
FIG. 22 illustrates a result obtained by making use of fDNA of H1975 (EGFR exon 20 T790M and exon 21 L858R gene mutations) and a probe specific for EGFR exon 20 T790M, and analyzing, using UV absorbance, binding of the fDNA to the probe depending on concentrations of the fDNA. Through this, detectable concentrations of the cfDNA have been identified.

Example 2.4. Identification of Limit of Detection (LOD) for EGFR Gene Mutation Through Analysis of cfDNA In Vitro H1975 (cell line with EGFR exon 20 T790M, 21 L858R gene mutations) and HCC2279 (cell line with EGFR exon 19 deletion gene mutation) were subjected to sonication, and then the acquired fragmented DNAs at various concentrations (fDNAs; 1 ag ml-1 to 100 ng ml-1) were added to the plasma (200 µl) of healthy humans. Then, the fDNAs were captured through nanowires. Thereafter, denaturation was performed at 95° C. for 1 minute, and then the limit of detection (LOD) was checked using probes specific for EGFR exon 19 Del and EGFR exon 20 T790M, and HRP/st-tagged NPs. As a result, it was identified that when a signal to noise ratio of 3 times is applied, the fDNA of HCC2279 cell line was detectable up to 10 ag ml-1, and the fDNA of H1975 cell line was detectable up to 100 ag ml-1 (FIGS. 21 and 22).

Example 3. Identification of Mutations in EGFR, KRAS, and ALK-EML4 Genes Through Analysis of cfDNA Present in Plasma or Cerebrospinal Fluid Samples: Lung Cancer Patients

Figure 6:
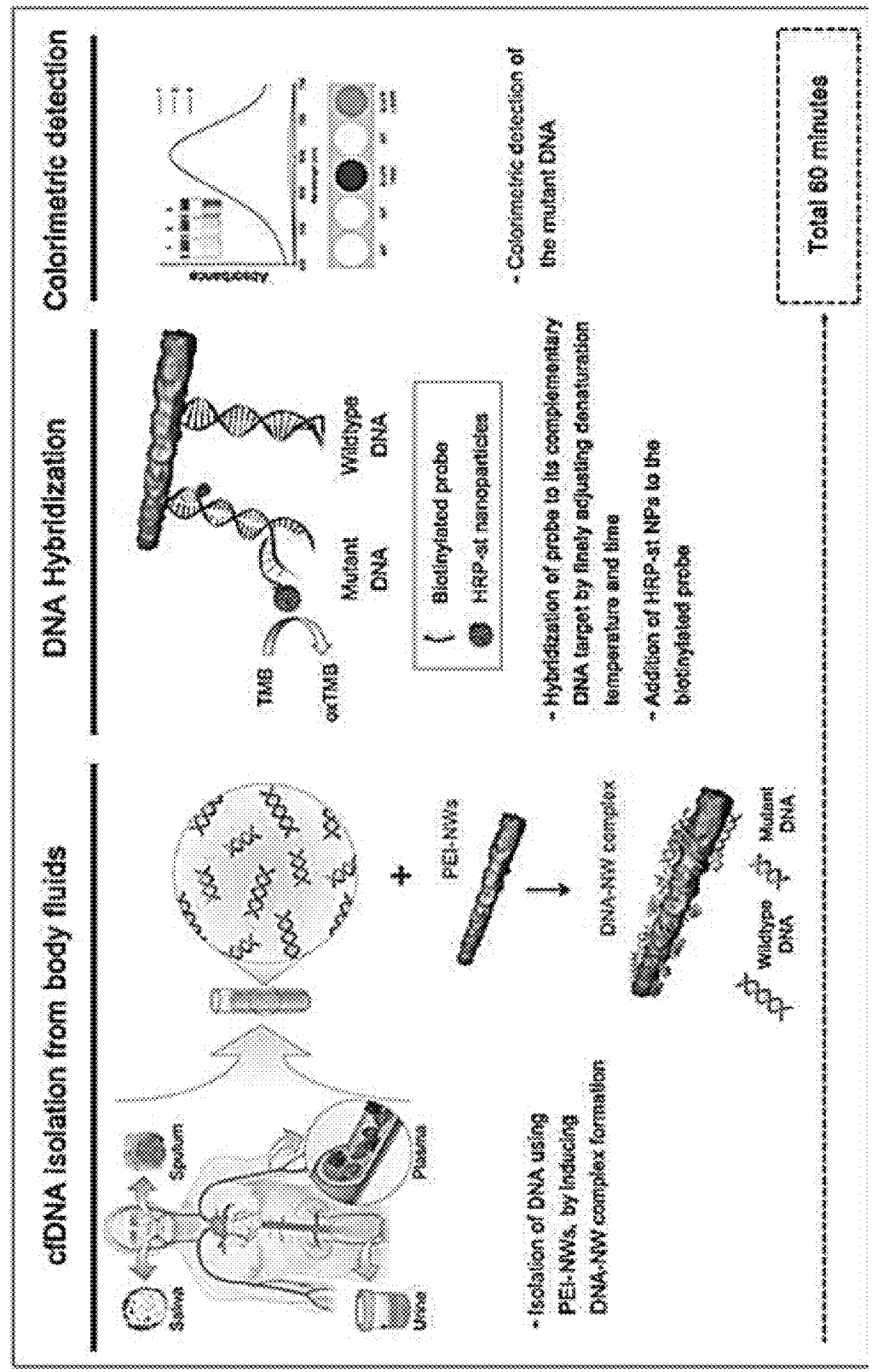
FIG. 6 illustrates a schematic diagram for a method in which cfDNA is obtained from the body fluid of a patient using nanowires (PEI/Ppy NWs) that have a surface onto which polyethyleneimine (PEI) is bound, and then gene mutations are analyzed within 60 minutes through reaction with probes and HRP/streptavidin-tagged nanoparticles (HRP/st-tagged NPs).
Figure 7:
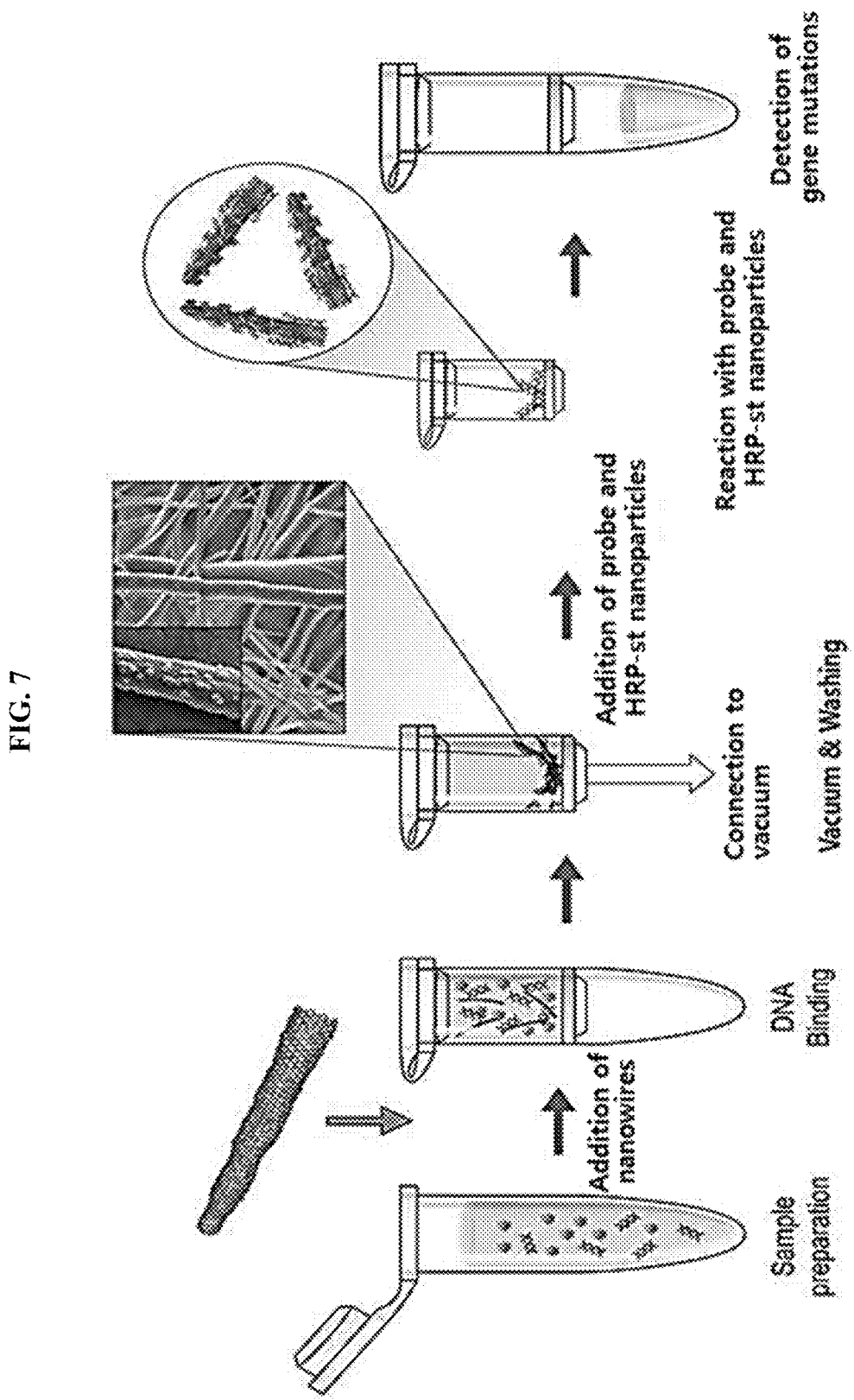
FIG. 7 schematically illustrates a method for detecting unstable cfDNA using nanowires, probes, and HRP/streptavidin-tagged nanoparticles.

Example 3.1. Identification of Mutations in EGFR Gene Through Analysis of Unstable cfDNA In an embodiment, a total of 60 minutes were required to isolate cfDNA from a cancer patient's body fluid sample using nanostructures, and to detect gene mutations through hybridization to probes and subsequent binding to HRP/st-tagged nanoparticles (FIG. 6).

Figure 23:
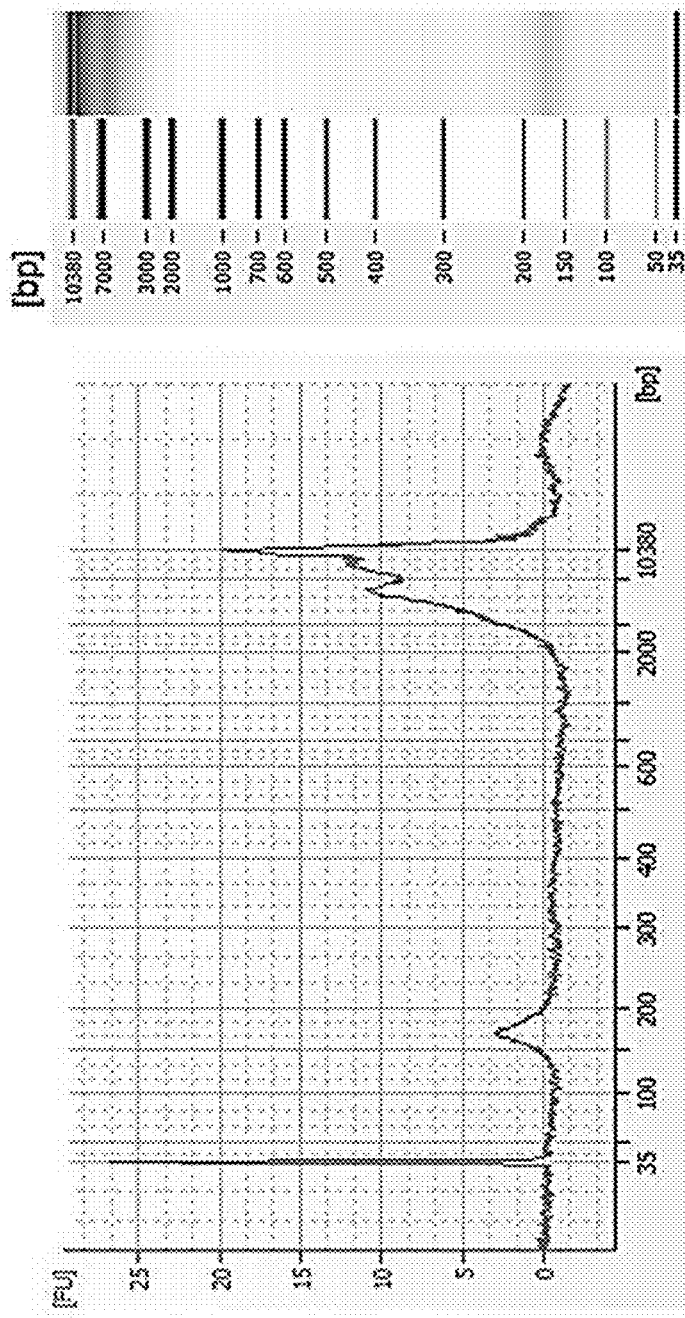
FIG. 23 illustrates results obtained by analyzing, with Bioanalyzer, cfDNA obtained from 200 µL of plasma of lung cancer patients using PEI/Ppy NWs. According to the literature, cancer-associated cfDNA is known to have an average size of 166 bp. As demonstrated in the Bioanalyzer data, it has been identified that the cfDNA obtained from the plasma of the lung cancer patients using the PEI/Ppy NWs shows a peak at 169 bp.

In order to isolate cfDNA from a plasma or cerebrospinal fluid sample, 200 μl of plasma of an EGFR positive patient and 5 μg/ml of PEI/Ppy NWs were mixed at room temperature for 30 minutes to extract cfDNA from the patient's plasma. The size of the cfDNA extracted, using the PEI/Ppy NWs, from 200 μl of the lung cancer patient's plasma was analyzed by Bioanalyzer (FIG. 23). In general, similar to the fact that cancer-associated cfDNA is known to have an average size of 166 bp, it was identified that as a result of extraction of cfDNA from the lung cancer patient's plasma using PEI/Ppy NWs in the present Bioanalyzer experiment, a peak was observed at 169 bp.

Subsequently, the DNA captured in the nanostructure was denatured at 95° C. for 1 minute, biotin-bound CP and biotin-bound DP were added at 1 pM thereto, and reaction was allowed to occur at 37° C. for 1 hour. Then, polypyrrole nanoparticles (HRP/st-tagged NPs) tagged with HRP and streptavidin were added to the sample, and reaction was allowed to occur at 37° C. for 30 minutes.

Thereafter, to the reaction solution were added 25 μl of 10 mM TMB, 25 μl of 0.1 M H2O2, and 200 μl of 0.2 M sodium acetate trihydrate buffer (pH 5.0). Then, light was blocked and reaction was allowed to occur at room temperature for 3 minutes. Thereafter, UV-Vis detection was performed at a wavelength of 652 nm using DU 730 UV-Vis spectrophotometer (Beckman Coulter, USA).

Difference in color caused by oxidation reaction of TMB was visually observed. Sequences of the probes for capturing and detecting mutated cfDNA with EGFR exon 19 deletion, 20 T790M, and 21 L858R are shown in Table 3 below.

Figure 24:
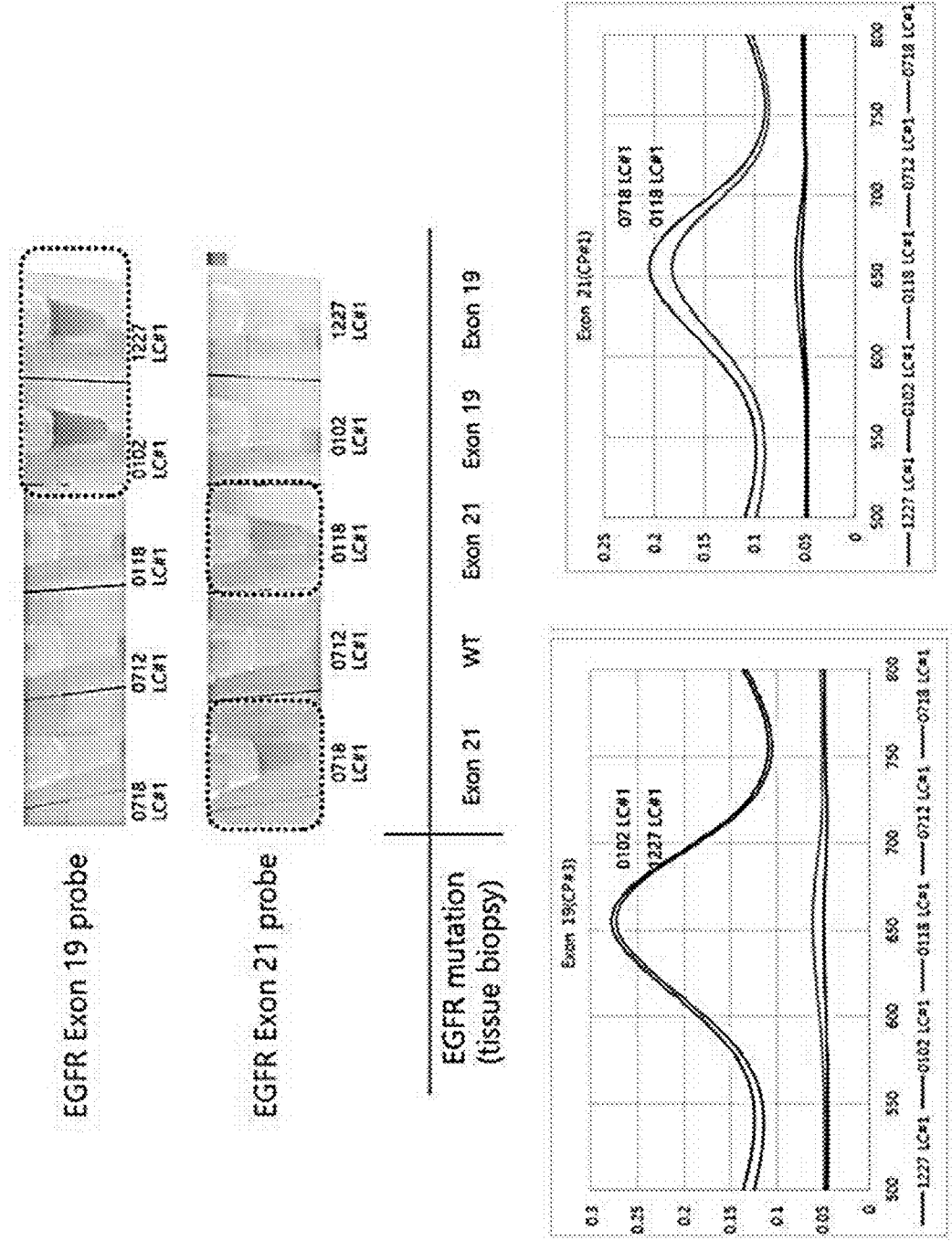
FIG. 24 illustrates results obtained by identifying that in a case where cfDNAs isolated from the plasma of lung cancer patients with EGFR gene mutation are reacted with a probe specifically binding to EGFR exon 19 deletion (Del) or EGFR exon 21 L858R, the same color change and UV absorbance as the tissue's genotype are exhibited.
Figure 25:
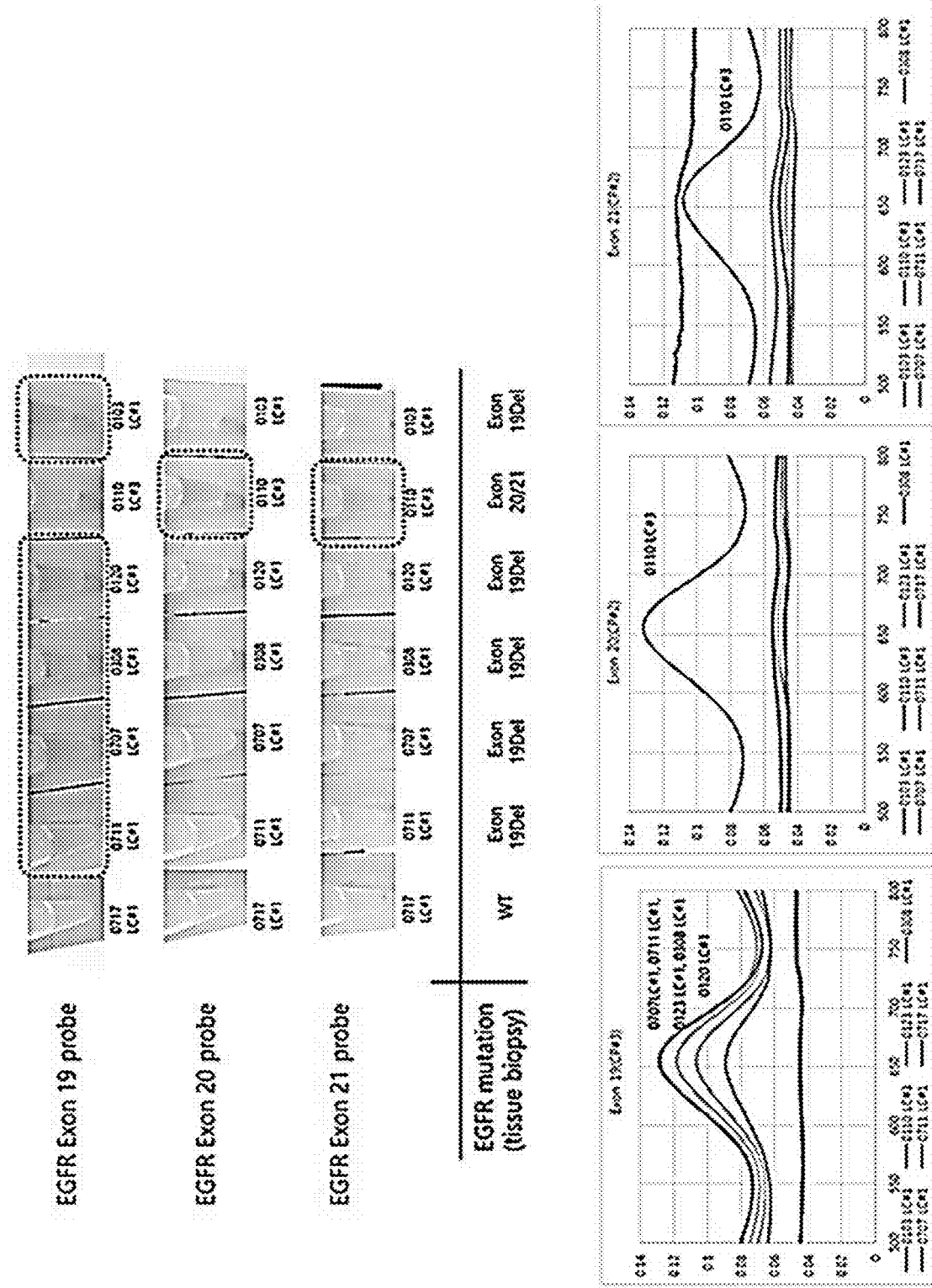
FIG. 25 illustrates results obtained by identifying that in a case where cfDNAs isolated from the plasma of lung cancer patients with EGFR exon 19 deletion (Del), EGFR exon 20 T790M, and EGFR exon 21 L858R gene mutations are reacted with a probe specific for EGFR exon 19Del, EGFR exon 20 T790M, or EGFR exon 21 L858R, the same color change and UV absorbance as the tissue's genotype are exhibited.

(FIGS. 24 and 25). It was identified that when cfDNA captured from the plasma of a lung cancer patient with EGFR exon 19 deletion, 20 T790M, or 21 L858R gene mutation was reacted, respectively, with a probe targeting EGFR exon 19 deletion, 20 T790M, or 21 L858R, and HRP/streptavidin-bound nanoparticles (NPs), when a probe targeting the same gene mutation as in the patient's tissue was used, color change and UV-Vis spectral change were exhibited (FIG. 24).

In addition, cfDNA captured from a lung cancer patient with another EGFR mutation was reacted with the same probes targeting EGFR 19, 20, and 21. As a result, it was identified that when a probe targeting the same gene mutation as in the patient's tissue was used, color change and UV-Vis spectral change were exhibited (FIG. 25).

Example 3.2. Identification of Mutations in KRAS and ALK-EML4 Genes Through Analysis of cfDNA Furthermore, similar to EGFR, in order to analyze mutations in KRAS and ALK-EML4 genes, cfDNA was isolated from a plasma or cerebrospinal fluid sample, and then the captured DNA was denatured at 95° C. for 1 minute. Biotin-bound CP and biotin-bound DP were added at 1 pM thereto, and reaction was allowed to occur at 37° C. for 1 hour. Then, polypyrrole nanoparticles tagged with HRP and streptavidin were added to the sample, and reaction was allowed to occur at 37° C. for 30 minutes.

As a result, it was possible to identify that cfDNA isolated from the plasma of a lung cancer patient with KRAS exon 2 gene mutation and ALK-EML4 fusion gene mutation

TABLE 3

| EGFR | Probe sequences |
| --- | --- |
| EGFR exon 19 deletion-probe 1 (Target specific) | CP1: GGAATTAAGAGAAGCAACATCTCC (SEQ ID NO: 9)<br>DP: AACCTCAGGCCCACCTTTT (SEQ ID NO: 10) |
| EGFR exon 19 deletion-probe 2 (Target non-specific) | CP2: AAAATTCCCGTCGCTATCAAG (SEQ ID NO: 11)<br>DP: AACCTCAGGCCCACCTTTT (SEQ ID NO: 12) |
| EGFR exon 19 deletion-probe 3 (Target non-specific) | CP3: GGACTCTGGATCCCAGAAGGTGAG (SEQ ID NO: 13)<br>DP: AACCTCAGGCCCACCTTTT (SEQ ID NO: 14) |
| EGFR exon 20 T790M-probe 1 (Target non-specific) | CP1: CCATGAGTACGTATTTTGAAACTC (SEQ ID NO: 15)<br>DP: GCAAGAGTTTGCCATGGGGATATG (SEQ ID NO: 16) |
| EGFR exon 20 T790M-probe 2 (Target specific) | CP2: CCACCGTGCAGCTCATCACGCAGCTCA (SEQ ID NO: 17)<br>DP: GCAAGAGTTTGCCATGGGGATATG (SEQ ID NO: 18) |
| EGFR exon 20 T790M-probe 3 (Target non-specific) | CP3: GAAGCCTACGTGATGGCCAGCGT (SEQ ID NO: 19)<br>DP: GCAAGAGTTTGCCATGGGGATATG (SEQ ID NO: 20) |
| EGFR exon 21 L858R-probe 1 (Target non-specific) | CP1: CCAGGAACGTACTGGTGAAAA (SEQ ID NO: 21)<br>DP: GGAAGAGAAAGAATACCATGCA (SEQ ID NO: 22) |
| EGFR exon 21 L858R-probe 2 (Target specific) | CP2: AAG ATC ACA GAT TTT GGG CGG G (SEQ ID NO: 23)<br>DP: GGAAGAGAAAGAATACCATGCA (SEQ ID NO: 24) |
| EGFR exon 21 L858R-probe 3 (Target non-specific) | CP3: GGC ATG AAC TAC TTG GAG GAC CGT (SEQ ID NO: 25)<br>DP: GGAAGAGAAAGAATACCATGCA (SEQ ID NO: 26) |

Figure 26:
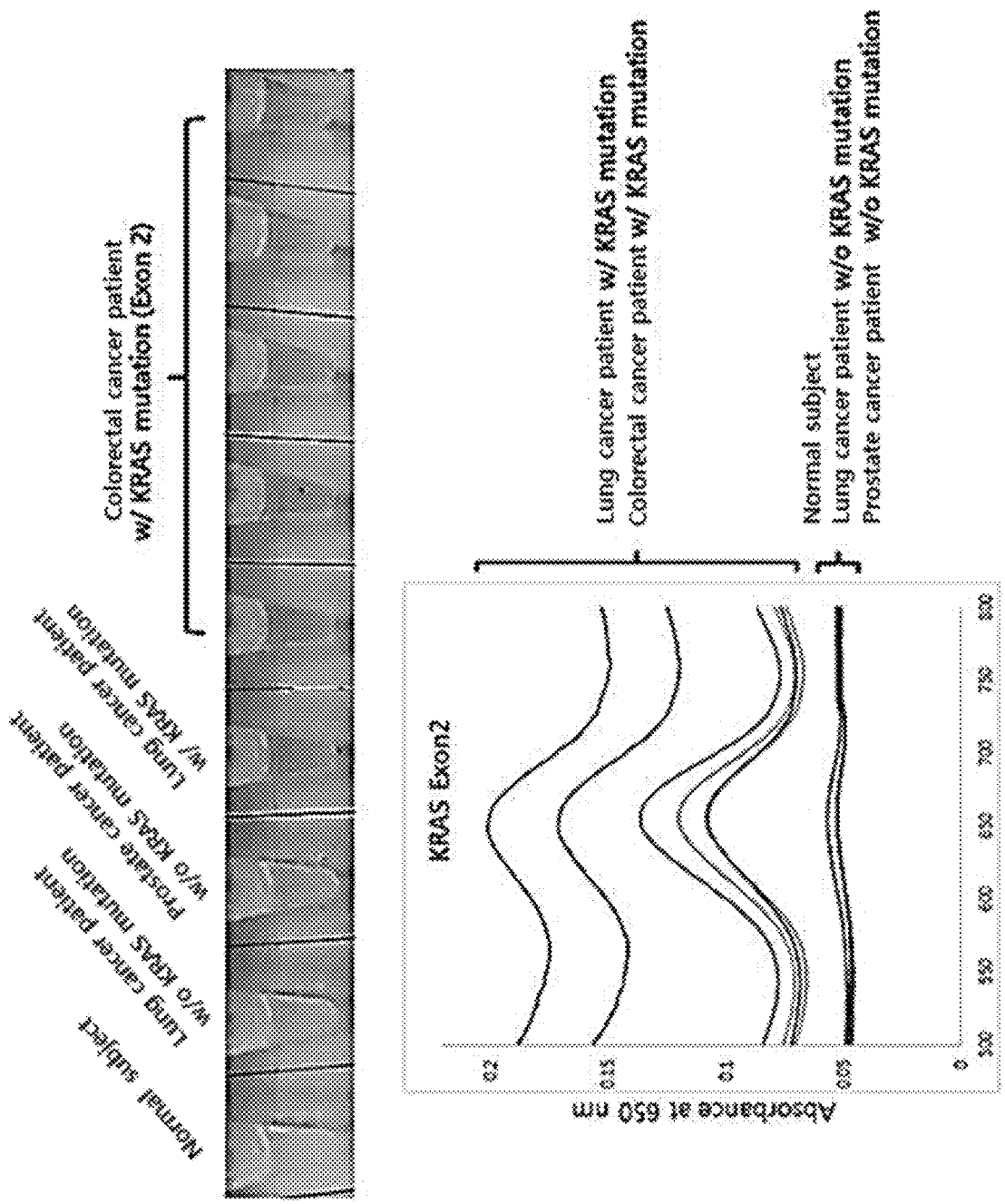
FIGS. 26 and 27 illustrate results obtained by identifying that in a case where cfDNAs isolated, using PEI/Ppy NWs, from the plasma of lung cancer patients with KRAS exon 2 gene mutation are reacted with a probe specific for KRAS exon 2, the same color change and UV absorbance as the tissue's genotype are exhibited.
Figure 27:
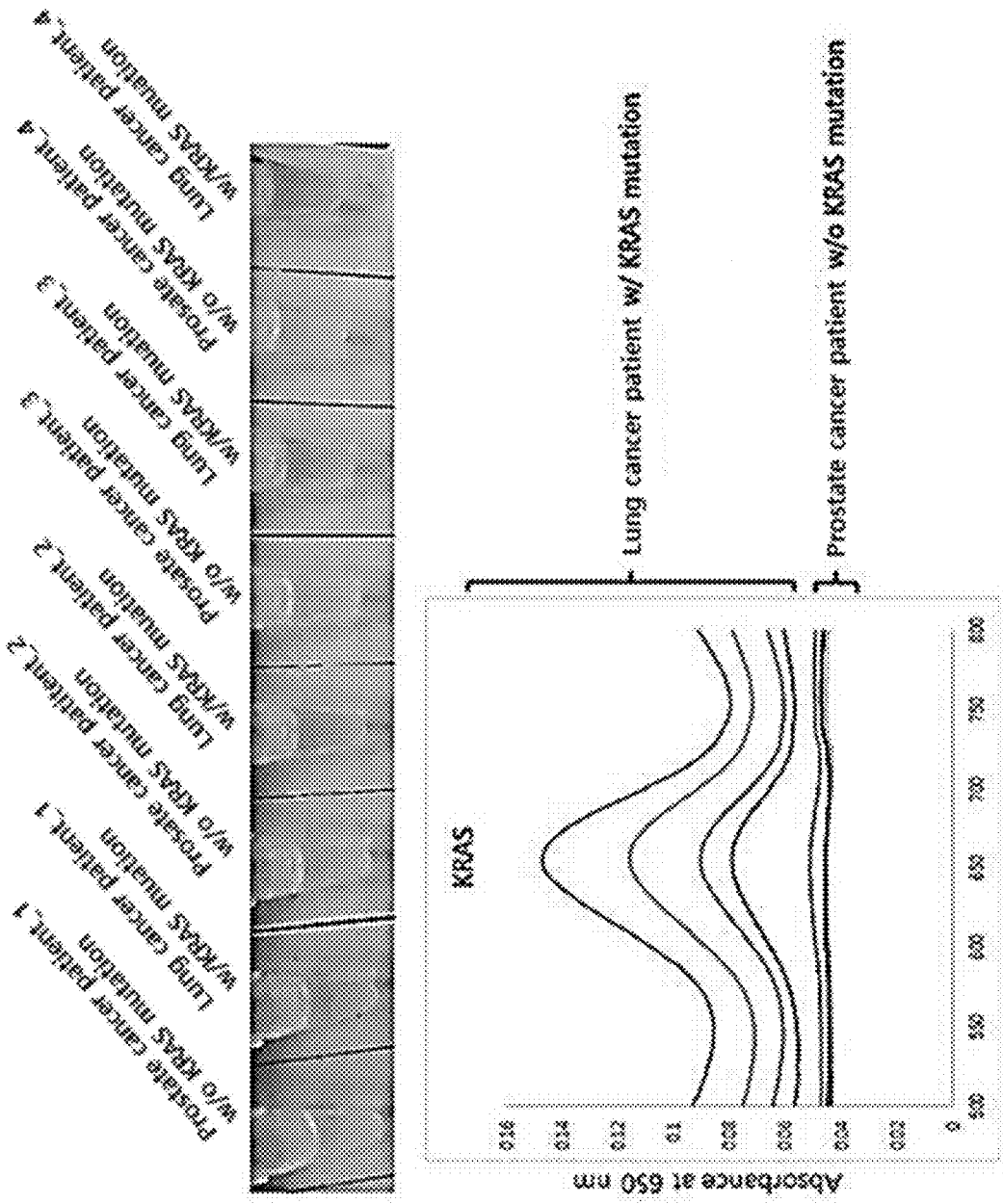
Figure 28:
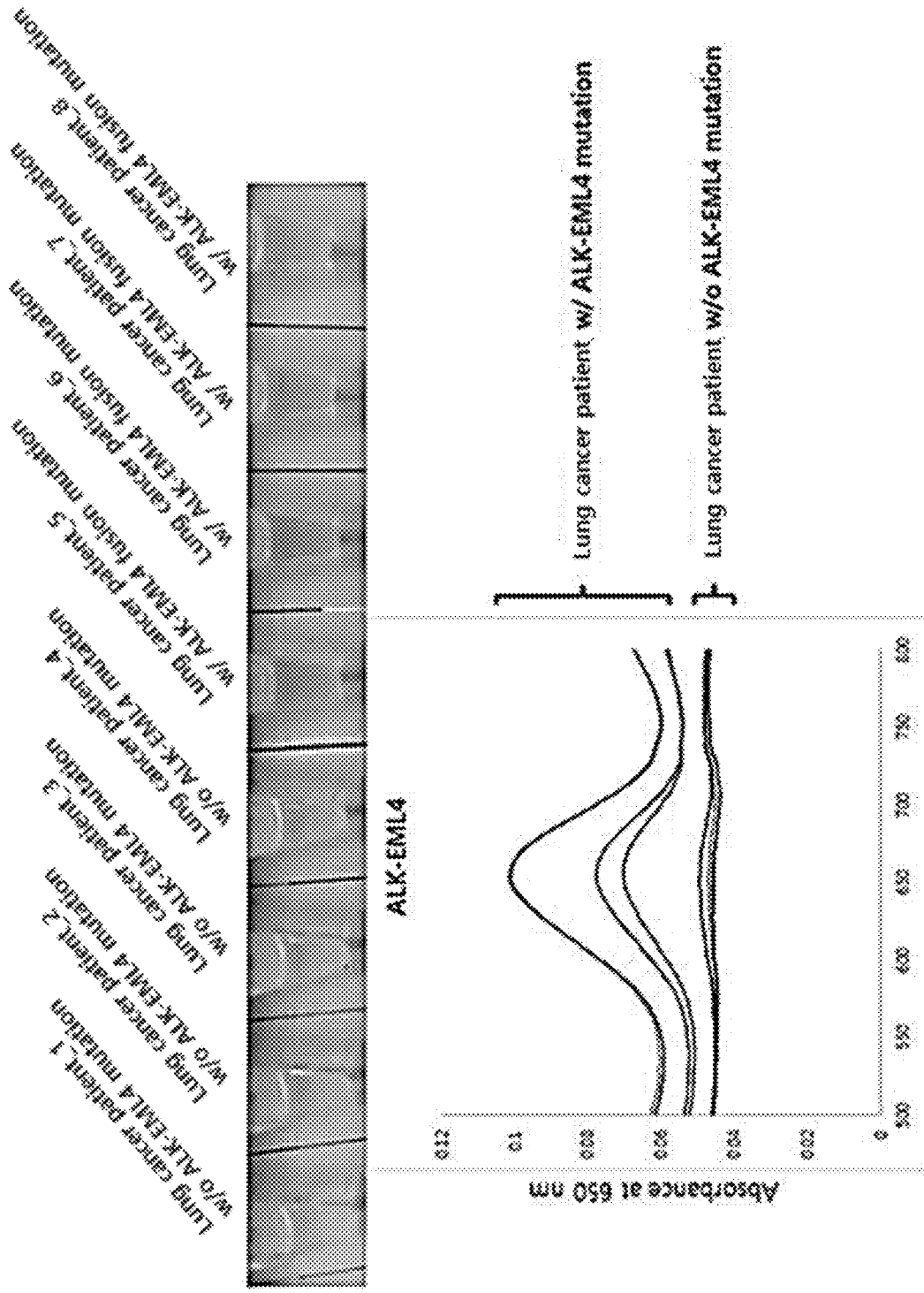
FIG. 28 illustrates results obtained by identifying that in a case where cfDNAs isolated from the plasma of lung cancer patients with ALK-EML4 fusion gene mutation are reacted with a probe specifically binding to ALK-EML4, the same color change and UV absorbance as the tissue's genotype are exhibited.

In this experiment, unless otherwise stated, EGFR exon 19 deletion-probe 1 (target specific), EGFR exon 20 T790M-probe 2 (target specific), and EGFR exon 21 L858R-probe 2 (target specific) were used as CP and DP. As a result, it was identified that the isolated EGFR mutated cfDNA was specifically detected depending on the detection probe responded to the probe for KRAS exon 2 and the probe for ALK-EML4, and thus showed color change and UV absorbance which matched the patient's tissue (FIGS. 26 to 28). Sequences of probes (CP and DP) for detecting cfDNA with KRAS exon 2 mutation (FIGS. 26 and 27) and ALK-EML4 variants 1 and 3 (FIG. 28) are shown in Table 4 below.

TABLE 4

| EGFR | Probe sequences |
|---|---|
| KRAS exon 2-probe | CP1: AAATGACTGAATATAAACTTG (SEQ ID NO: 27)<br>DP: GAGTGCCTTGACGATACAGCT (SEQ ID NO: 28) |
| ALK-EML4 variant 1-probe | CP2: TAGAGCCCACACCTGGGAAA (SEQ ID NO: 29)<br>DP: CGGAGCTTGCTCAGCTTGTA (SEQ ID NO: 30) |
| ALK-EML4 variant 3-probe | CP3: GCATAAAGATGTCATCATCAACCAAG (SEQ ID NO: 31)<br>DP: CGGAGCTTGCTCAGCTTGTA (SEQ ID NO: 32) |

Example 3.3. Identification of Nonspecific Reaction by Temperature Denaturation

Figure 29:
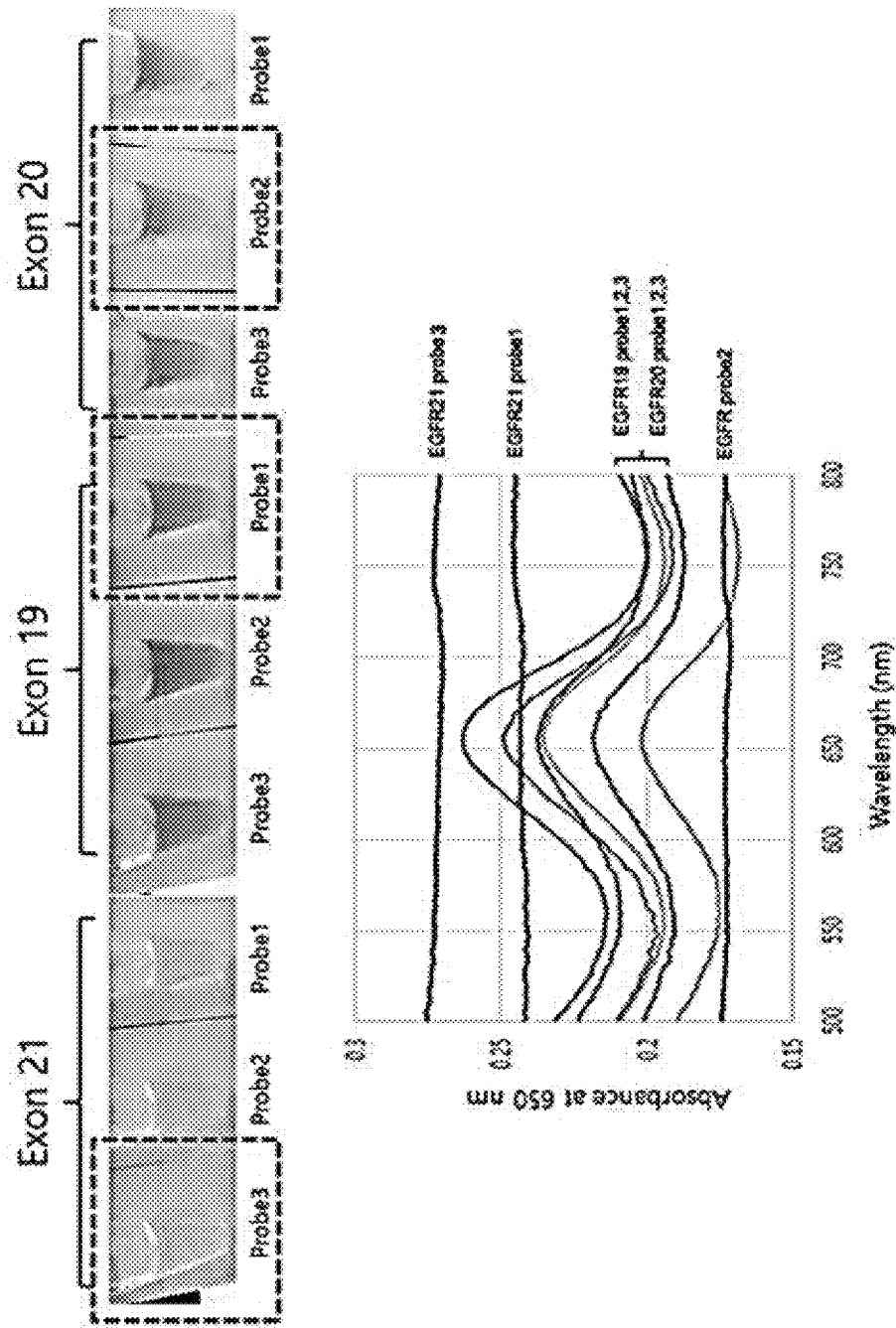
FIG. 29 illustrates that in a case where cfDNAs isolated from the plasma of lung cancer patients with EGFR exon 19 deletion and EGFR exon 20 T790M gene mutations are reacted with various probes specifically binding to EGFR exon 19 deletion or EGFR exon 20 T790M, color change and UV absorbance which match the tissue are exhibited. However, according to the results, it has been identified that no color change is observed for EGFR 21 L858R mutation regardless of the three types of probes used. As a result, it can be seen that reaction between a gene and a probe is not limited to a specific probe, and any probe can bind to a gene having a mutation as long as the probe specifically binds to the gene.

Each of the three types of probes (that is, including target-specific or target-nonspecific probes) in Table 3 was added to the plasma of lung cancer patients with EGFR exon 19 deletion and 20 T790M gene mutations, and mixing was performed. As a result, after DNA denaturation at 95° C. for 1 minute, all probes used (that is, regardless of whether the probe is target-specific or target-nonspecific) showed changes in color and UV absorbance only for the EGFR exon 19 deletion and 20 T790M, similar to the tissue, which made it possible to identify specific gene mutations (FIG. 29). However, for EGFR exon 21, changes in color and UV absorbance were not observed regardless of the type of probe. This suggests that unstable cfDNA responds to probes specific for mutations in EGFR exon 19 and EGFR exon 20, and this allows analysis of gene mutations.

Figure 30:
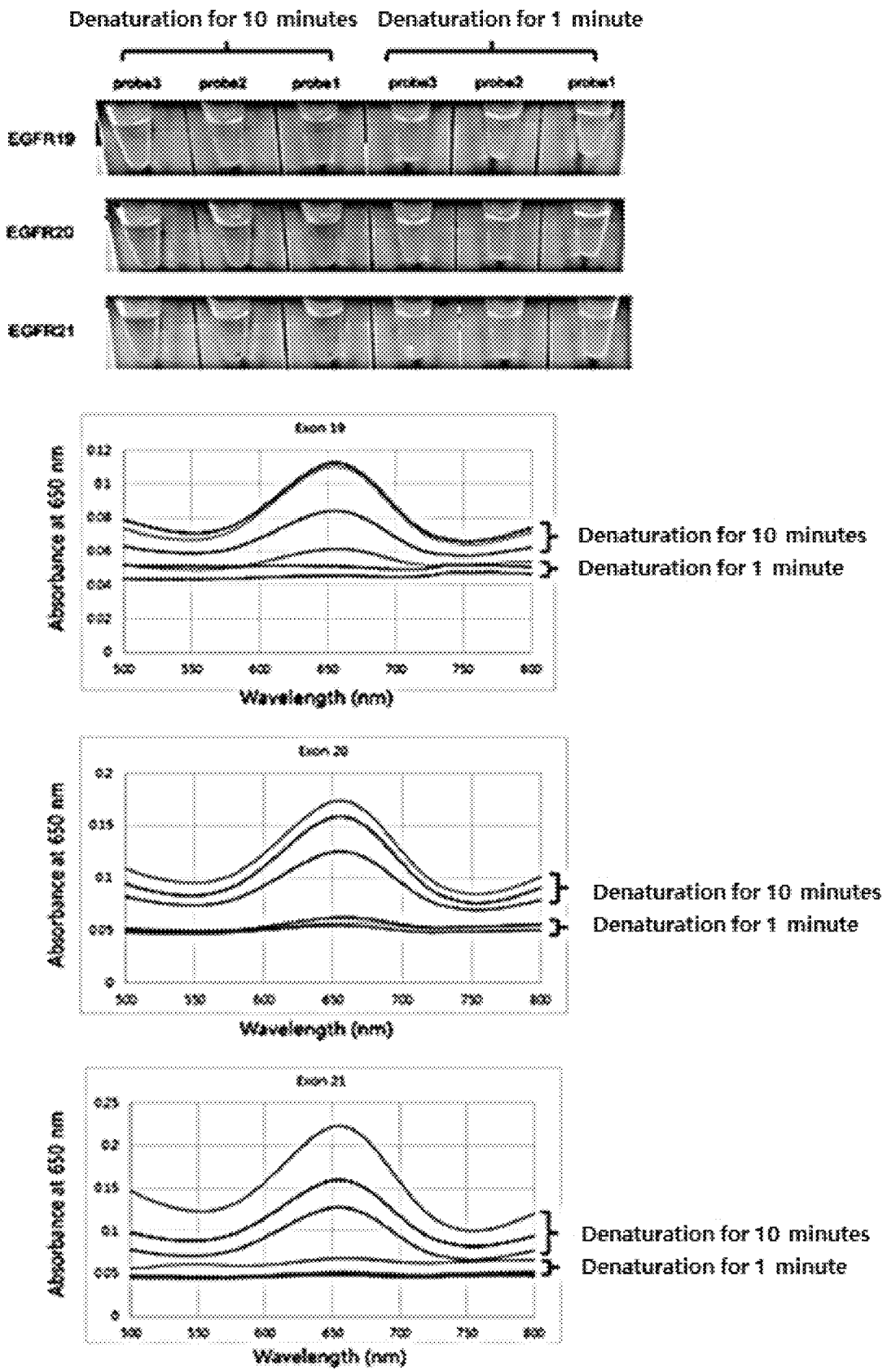
FIG. 30 illustrates results obtained by subjecting cfDNAs isolated from the plasma of lung cancer patients (wildtype, WT) with no EGFR gene mutation to denaturation at 95° C. for 1 minute and 10 minutes, respectively, and then to reaction with a probe for EGFR exon 19 deletion, EGFR exon 20 T790M, or EGFR exon 21 L858R. It has been identified that the cfDNAs extracted from the plasma of the EGFR WT patients show no reaction with any probe in a case of being denatured at 95° C. for 1 minute; and on the other hand, the cfDNAs react nonspecifically with all probes after being denatured at 95° C. for 10 minutes.

In addition, cfDNAs were obtained from the plasma of lung cancer patients with no mutations in EGFR gene. After denaturation at 95° C. for 1 minute and 10 minutes, respectively, binding between the probes specific for mutations in EGFR 19, 20, and 21, and the unstable cfDNA was checked. As a result, in case of denaturation at 95° C. for 1 minute, color change and UV absorbance change were not observed for the lung cancer patient with no mutations in EGFR gene. However, in case of denaturation at 95° C. for 10 minutes, color change and UV absorbance change through nonspecific hybridization were observable in all probes for EGFR exon 19, 20, and 21 (FIG. 30).

In addition, cfDNAs were captured, through nanowires, from the plasma of other lung cancer patients with EGFR 19 deletion and 20 T790M gene mutations, and normal subjects. Then, through denaturation at 95° C. for 0, 1, and 10 minutes, respectively, hybridization reactivity thereof with probes for EGFR 19, 20, and 21 was checked. As a result, as illustrated in FIGS. 31 to 33, in case of normal subjects with no mutations in EGFR gene, color change and UV absorbance change were not observed with the denaturation at 95° C. for 0 minutes (FIG. 31) and 1 minute (FIG. 32), respectively. However, through denaturation at 95° C. for 10 minutes (FIG. 33), color change and UV absorbance change through non-specific hybridization were observed in all probes for EGFR exon 19, 20, and 21. Therefore, it was identified that gene mutations in cfDNA can be analyzed without denaturation.

Figures 34, 35:
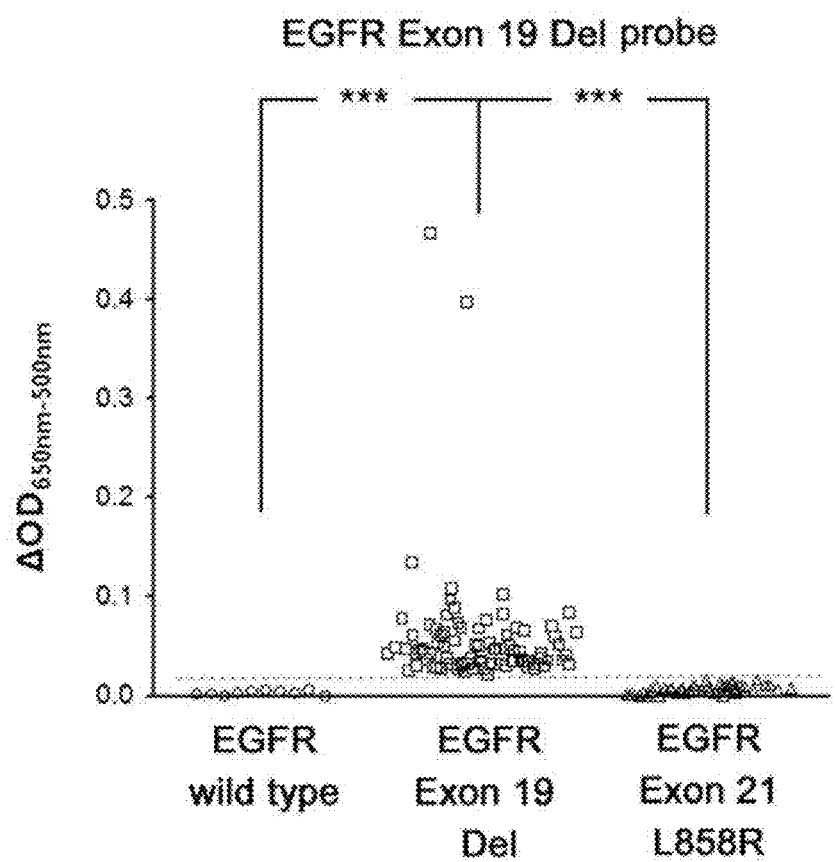
FIG. 34 illustrates a table obtained by making use of cfDNAs obtained from the plasma of 151 lung cancer patients and analyzing gene mutations in the lung cancer patients.
FIG. 35 illustrates a result obtained by obtaining cfDNAs from the plasma of lung cancer patients with no EGFR mutation (wild type), lung cancer patients with EGFR exon 19 deletion, and lung cancer patients with EGFR exon 21 L858R, mixing the cfDNAs with a probe specific for EGFR exon 19 Del, and then identifying gene mutations in the lung cancer patients through analysis of UV spectral absorbance (ΔOD, 500 nm to 650 nm) values.
Figure 36:
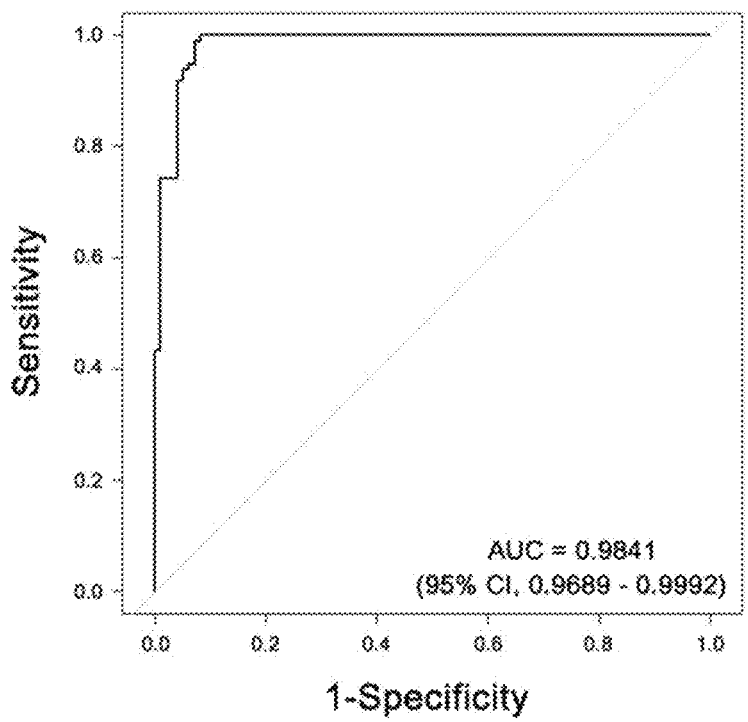
FIG. 36 illustrates a result obtained by obtaining cfDNAs from the plasma of lung cancer patients with EGFR exon 19 deletion, mixing the cfDNAs with a probe specific for EGFR exon 19 Del, and then analyzing specificity and sensitivity of gene mutations.

Example 4. Identification of Accuracy of Method for Detecting Unstable cfDNA Through Analysis of Samples of Lung Cancer Patients In an embodiment of the present invention, it was identified that the results obtained by analyzing specificity and sensitivity for gene mutations in cfDNAs obtained from the plasma of 151 lung cancer patients matched the results of gene mutations in the patients' cancer tissue (FIG. 34). A probe specific for EGFR exon 19 Del was added to cfDNAs of lung cancer patients (EGFR wild type) with no mutations in EGFR, lung cancer patients with EGFR exon 19 deletion (Del), and lung cancer patients with EGFR exon 21 L858R, and gene mutations generated were checked through analysis of absorbance values of UV spectrum (ΔOD, 500 nm to 650 nm). As a result, it was identified that the obtained results showed 98.4% match for the results of gene mutations in the patients' cancer tissue (FIGS. 35 and 36).

Figure 37:
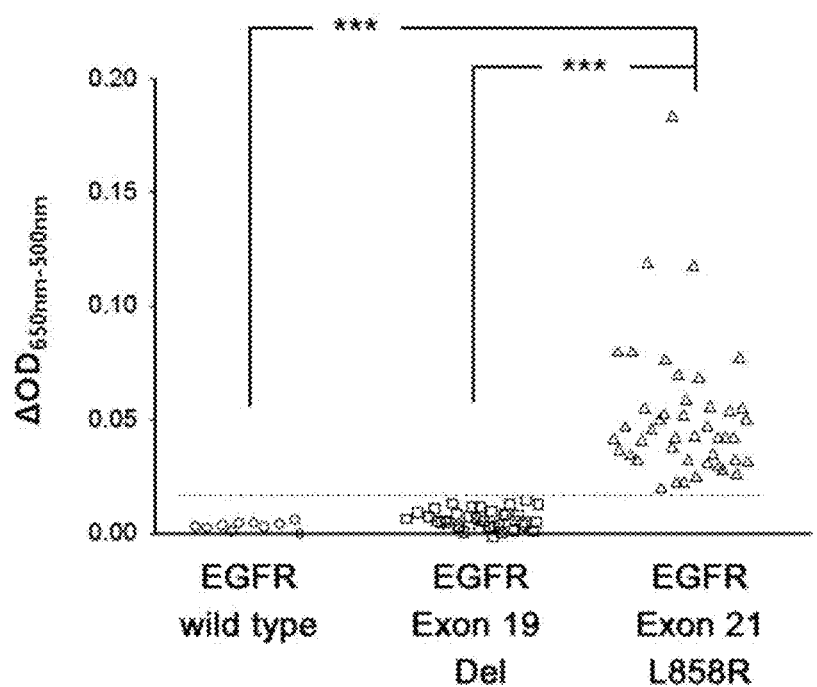
FIG. 37 illustrates a result obtained by obtaining cfDNAs from the plasma of lung cancer patients with no EGFR mutation (wild type), lung cancer patients with EGFR exon 19 deletion, and lung cancer patients with EGFR exon 21 L858R, adding a probe specific for EGFR exon 21 L858R thereto, and then identifying gene mutations in the patients through analysis of UV spectral absorbance (ΔOD, 500 nm to 650 nm) values.
Figure 38:
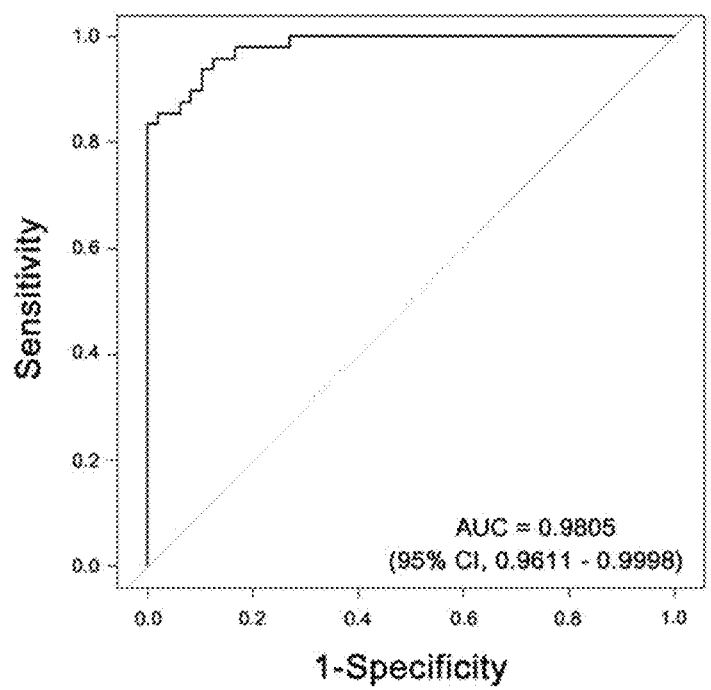
FIG. 38 illustrates a result obtained by obtaining cfDNAs from the plasma of lung cancer patients with EGFR exon 21 L858R, adding a probe specific for EGFR exon 21 L858R thereto, and then analyzing specificity and sensitivity of gene mutations in the patients.

In addition, a probe for EGFR exon 21 L858R was added to cfDNAs of lung cancer patients with no mutations in EGFR, lung cancer patients with EGFR exon 19 deletion (Del), and lung cancer patients with EGFR exon 21 L858R, and gene mutations generated were checked through analysis of absorbance values of UV spectrum (ΔOD, 500 nm to 650 nm). As a result, it was identified that the obtained results showed 98.0% match for the results of gene mutations in the patients' cancer tissue (FIGS. 37 and 38).

Example 5. Detection of cfDNA Using Positively Charged Nanoparticles

Figure 39:
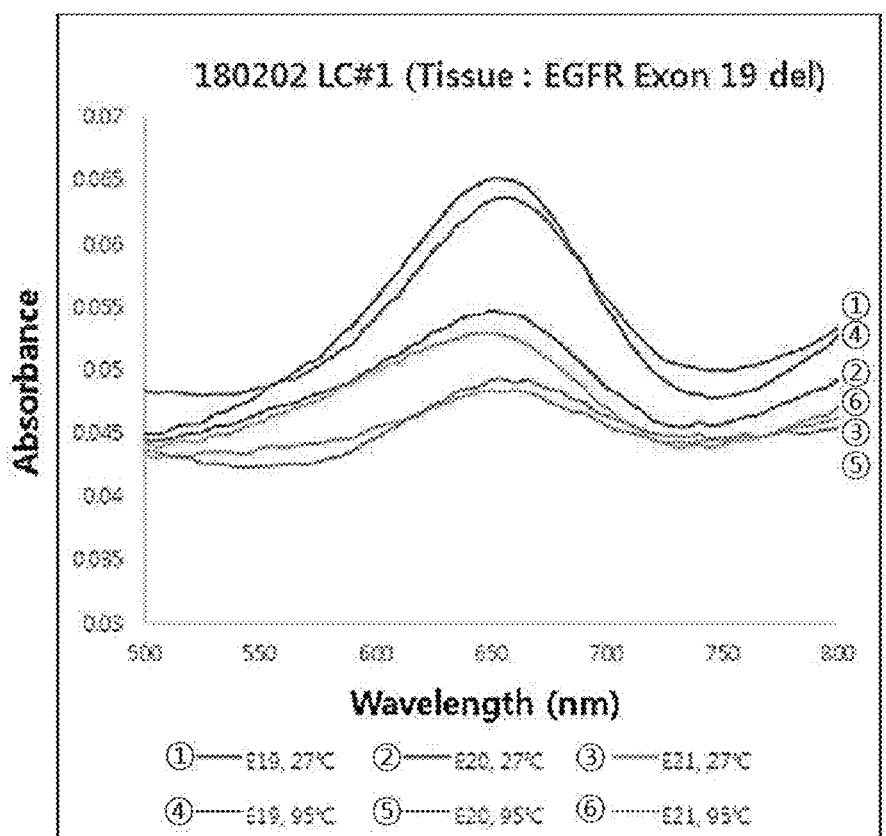
FIG. 39 illustrates a result obtained by subjecting cfDNAs isolated, using PEI/Ppy NPs, from the plasma of lung cancer patients with EGFR exon 19 deletion gene mutation to reaction with a probe specific for EGFR exon 19 Del (E19), EGFR exon 20 T790M (E20), or EGFR exon 21 L858R (E21), and as a result, identifying that UV absorbance which matches the tissue is observed.

Similar to the above-described EGFR experiment, in order to isolate cfDNA from a plasma sample of a lung cancer patient having EGFR 19 deletion (Del) gene mutation, PEI-bound nanoparticles (PEI-Ppy NPs, 5 μg/ml), produced in the production examples, were added to 200 μl of plasma of an EGFR-positive patient, and mixed at room temperature for 30 minutes. Thereafter, the captured DNA was either not denatured or denatured at 95° C. for 1 minute. Then, biotin-bound CP and DP to which biotin is bound were added at thereto 1 pM, and incubation was performed at 37° C. for 30 minutes. Thereafter, HRP/st-tagged NPs were added to the sample and reaction was allowed to occur at 37° C. for 15 minutes. It was identified that absorbance change in UV-Vis spectrum was observed only in the probe specific for EGFR 19, through oxidation reaction of TMB (FIG. 39).

Figure 40:
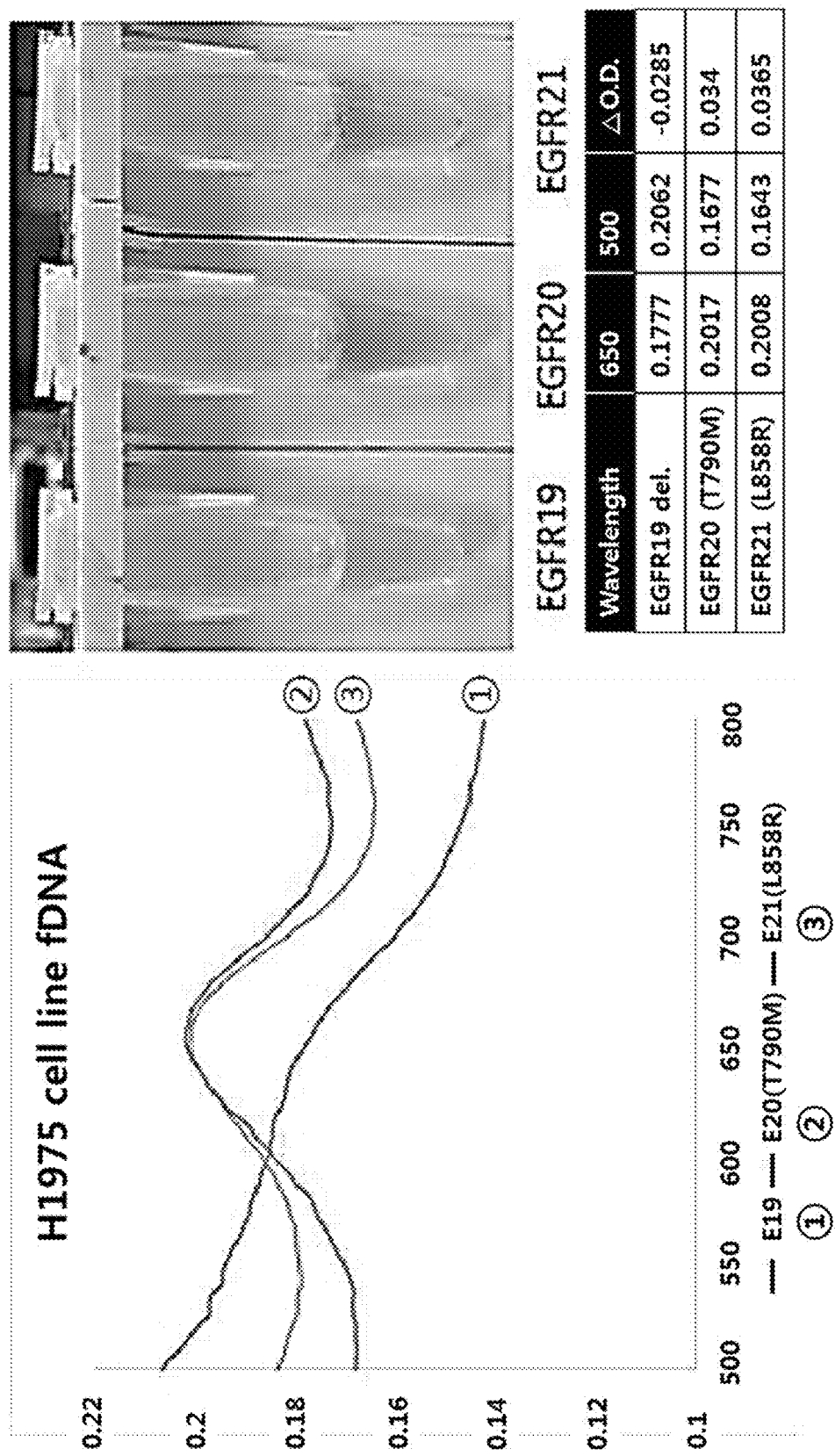
FIG. 40 illustrates results obtained by obtaining, using PLL/Ppy NWs modified with polylysine, fDNA of H1975 cell line with EGFR exon 20 T790M and EGFR exon 21 L858R gene mutations, subjecting the fDNA to reaction with a probe specific for EGFR exon 19 Del, EGFR exon 20 T790M, or EGFR exon 21 L858R, and then analyzing gene mutations.

Example 6. Identification of Mutations in EGFR Gene Through Analysis of cfDNA Present in Plasma Using H1975 cell line (with EGFR exon 20 T790M and 21 L858R gene mutations), fDNA was prepared by sonication. Thereafter, nanostructures (PLL/Ppy NWs) having a surface onto which polylysine is conjugated, produced by the method in the production example, were added thereto, and then a PCR-free colorimetric assay was performed (FIG. 40). fDNA of EGFR exon 20, 21 positive H1975 cell line was isolated using nanowires. Then, probes for EGFR exon 19, 20, and 21 were added thereto, and reaction was allowed to occur. Thereafter, HRP/st-tagged NPs were added thereto, and then color change was observed. As illustrated in FIG.

40, it was possible to identify clear color change and UV-Vis spectral change only in EGFR 20 and EGFR 21.

III. Detection of Unstable cfDNA Using Single Probe

Figure 41:
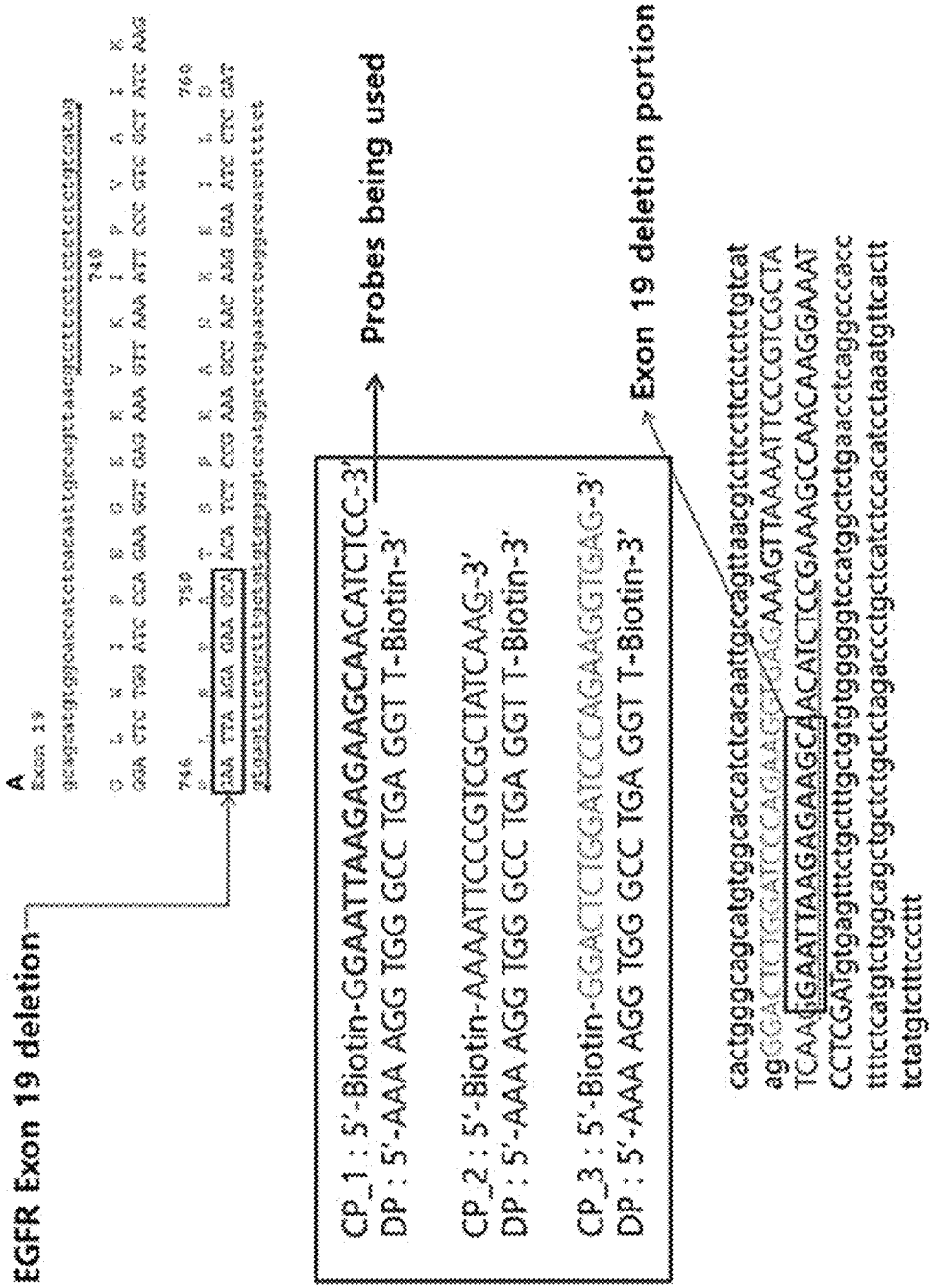
FIG. 41 illustrates sequences of CPs and DPs for EGFR exon 19 deletion. In this study, cfDNA gene mutations in lung cancer patients were analyzed using CP_1 and DP. Here, CP refers to a probe designed to specifically bind to a sequence which contains a mutated portion or is adjacent thereto, and DP refers to a probe designed to specifically bind to a portion spaced apart from a mutated sequence.
Figure 43:
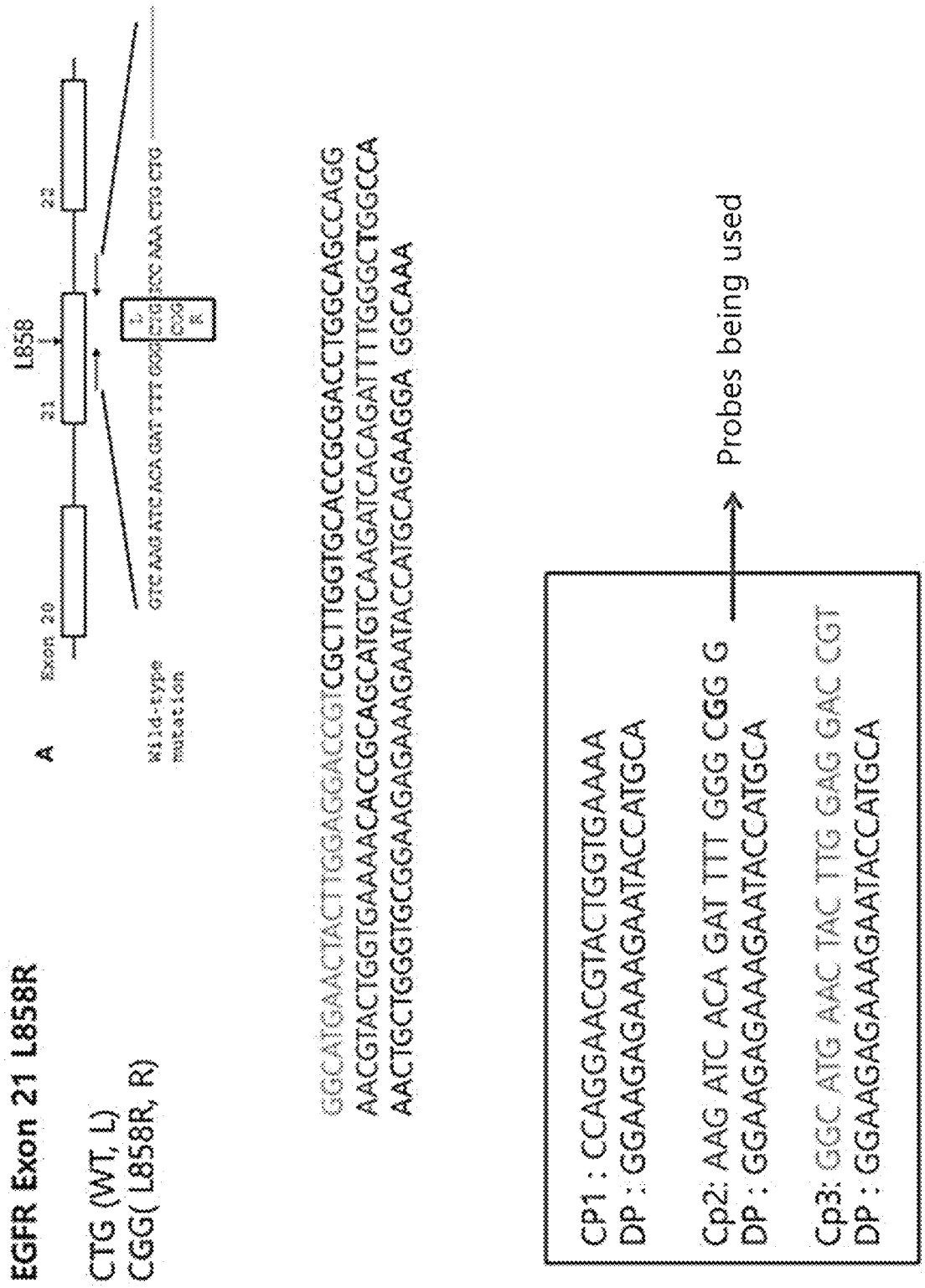
FIG. 43 illustrates sequences of CPs and DPs for EGFR exon 21 L858R. In this study, cfDNA gene mutations in lung cancer patients were analyzed using CP2 and DP.

Example 7. Detection of Unstable cfDNA Using Only Probe Capable of Binding to Damaged Portion Only cfDNAs were isolated from plasma samples of lung cancer patients. Then, in order to detect gene mutations, two types of probes, that is, CP and DP, were used in admixture. As illustrated in FIGS. 41 to 43, in order to detect EGFR exon 19 deletion, exon 20 T790M, and exon 21 L858R gene mutations, CP_1 (EGFR exon 19 deletion), CP2 (EGFR exon 20 T790M), and CP2 (EGFR exon 21 L858R), which are probes specific for cfDNA containing the above regions, were used in admixture with DP.

Figure 44:
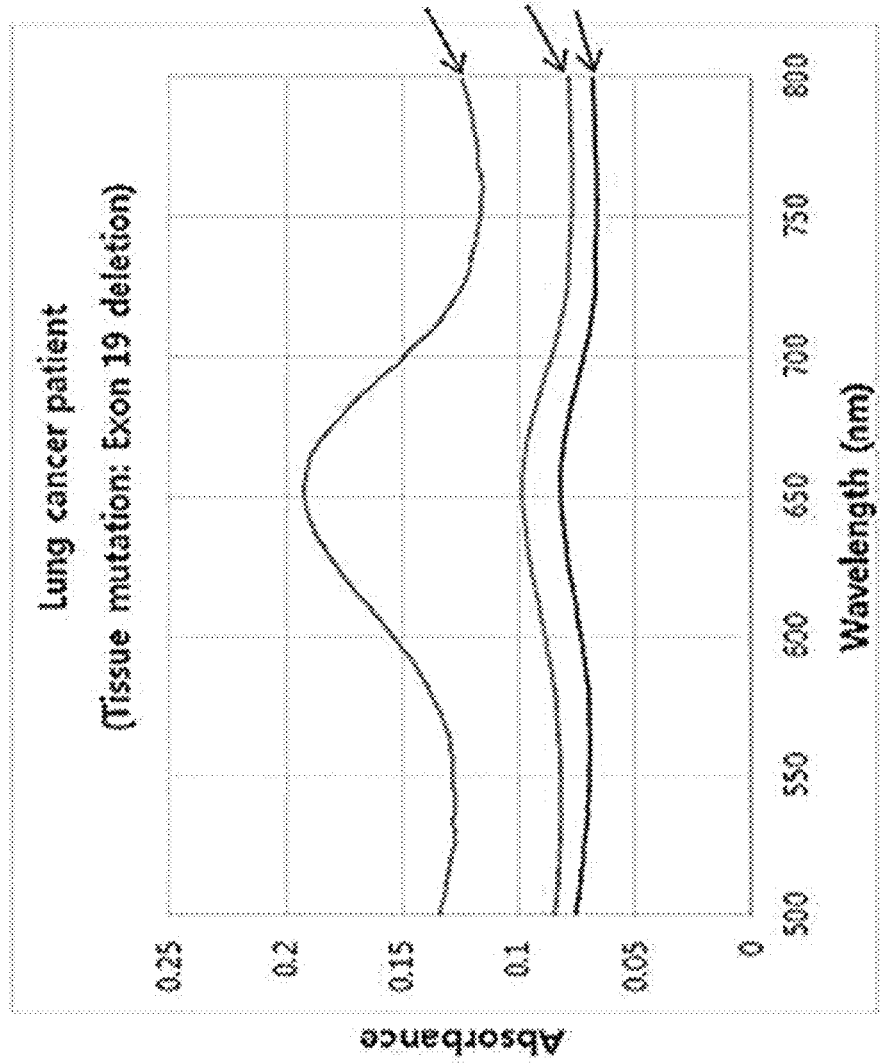
FIG. 44 illustrates a result obtained by obtaining cfDNAs from the plasma of lung cancer patients with EGFR exon 19 deletion gene mutation, and then analyzing gene mutations using the EGFR exon 19 CP_1, the exon 20 CP2, and the exon 21 CP2 in FIGS. 41 to 43 without DPs.

However, as illustrated in FIG. 44, it was possible to identify the same EGFR exon 19 deletion gene mutation result as the result (EGFR exon 19 deletion) in the patient's cancer tissue, even when CP alone was added without DP.

Figure 45:
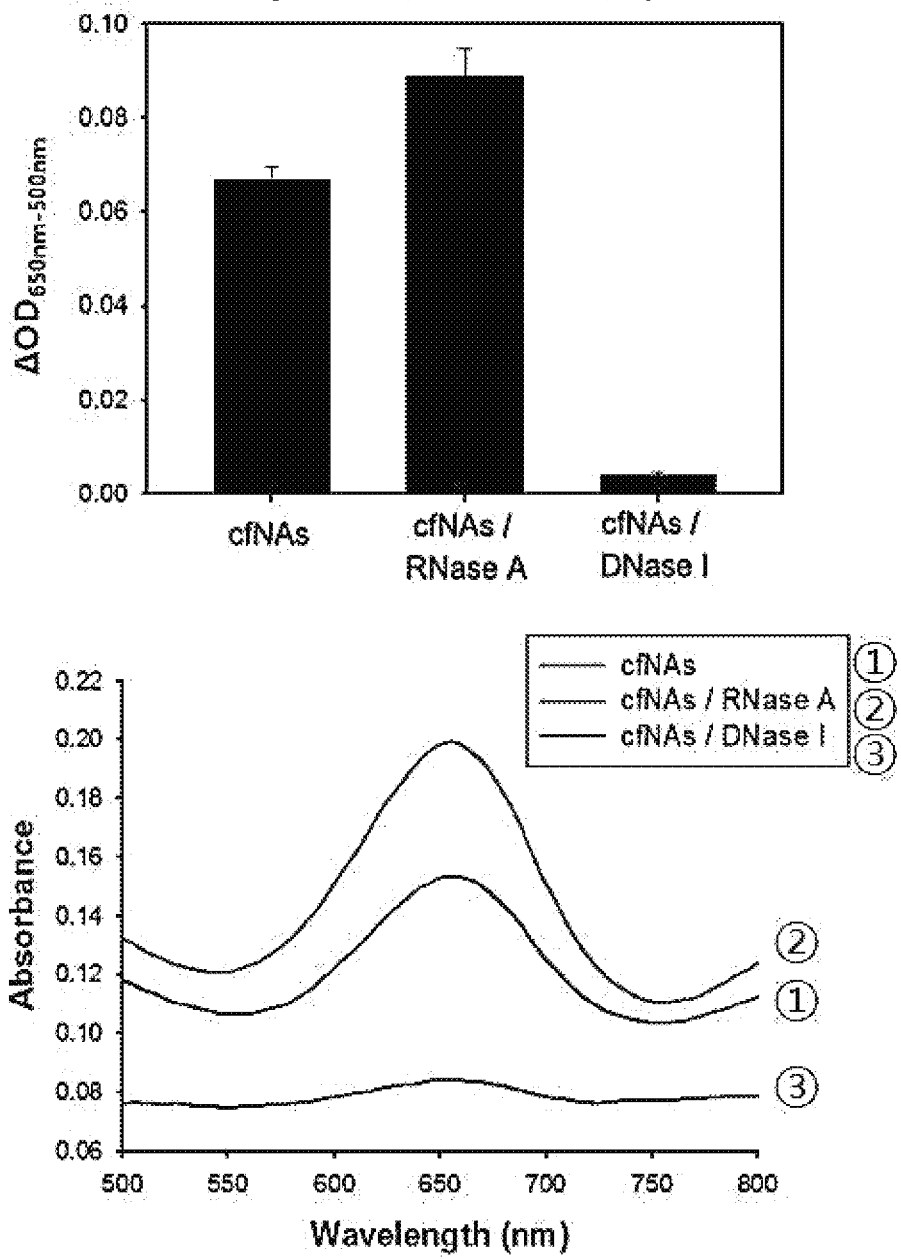
FIG. 45 illustrates results obtained by subjecting the plasma of lung cancer patients with EGFR exon 19 deletion to treatment with RNase and DNase, obtaining cfDNAs through PEI/Ppy nanowires, and detecting unstable cfDNAs using a probe specific for EGFR exon 19 deletion.

IV. Identification of Detectability for Unstable cfDNA Depending on Sample Treatment Method Example 8. Identification of Detectability for Unstable cfDNA Depending on Treatment with DNase or RNase Plasma samples of lung cancer patients were first treated with a DNase or RNase, and then cfDNAs were isolated therefrom using nanostructures to identify gene mutations. As illustrated in FIG. 45, after the plasma of lung cancer patients with EGFR exon 19 deletion gene mutation was pretreated using RNase A, cfDNAs were obtained therefrom with nanowires, and then reacted with a probe for EGFR exon 19 del. As a result, the same UV-vis peak for EGFR exon 19 deletion gene mutation as the result in the patients' cancer tissue was identified like a control (control cfDNA). However, it was possible to identify that after pretreatment with DNase I, no UV absorbance was observed due to the possibility that cfDNA has been degraded (FIG. 45).

Figure 46:
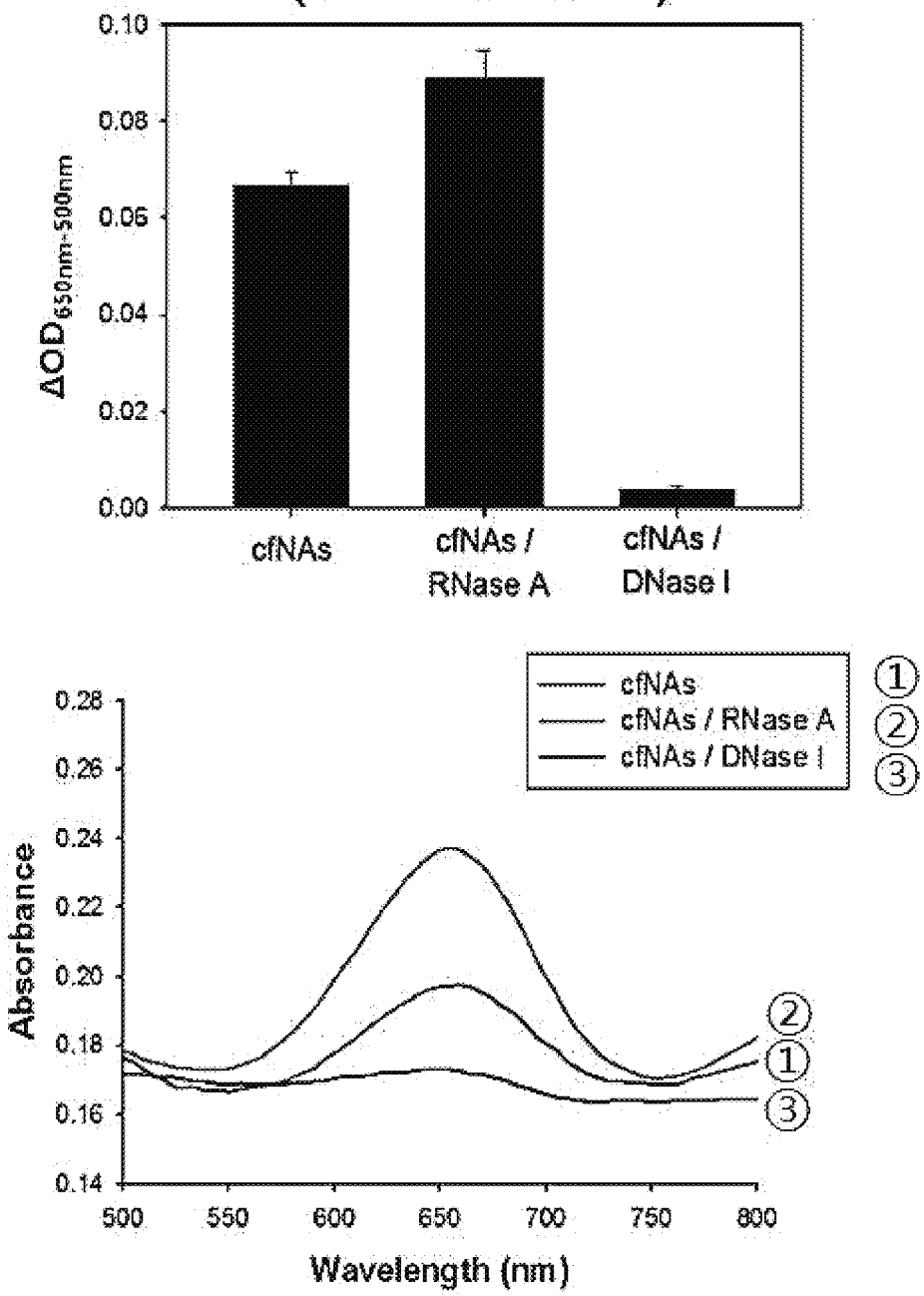
FIG. 46 illustrates results obtained by subjecting the plasma of lung cancer patients with EGFR exon 20 T790M to treatment with RNase and DNase, obtaining cfDNAs through PEI/Ppy nanowires, and detecting unstable cfDNAs using a probe specific for EGFR exon 20 T790M.

Similarly, as illustrated in FIG. 46, after the plasma of lung cancer patients with EGFR exon 20 T790M gene mutation was pretreated with RNase A, cfDNAs were obtained therefrom with nanowires, and then reacted with a probe for EGFR exon 20 T790M. As a result, the same UV absorbance for EGFR exon 20 T790M gene mutation as the result in the patients' cancer tissue was identified. However, it was possible to identify that no UV absorbance was observed after treatment with DNase I (FIG. 46); and this was due to the possibility that cfDNA had been degraded by the addition of DNase I to the patients' plasma.

V. Identification of Detectability for cfDNA Depending on Markers

Figure 47:
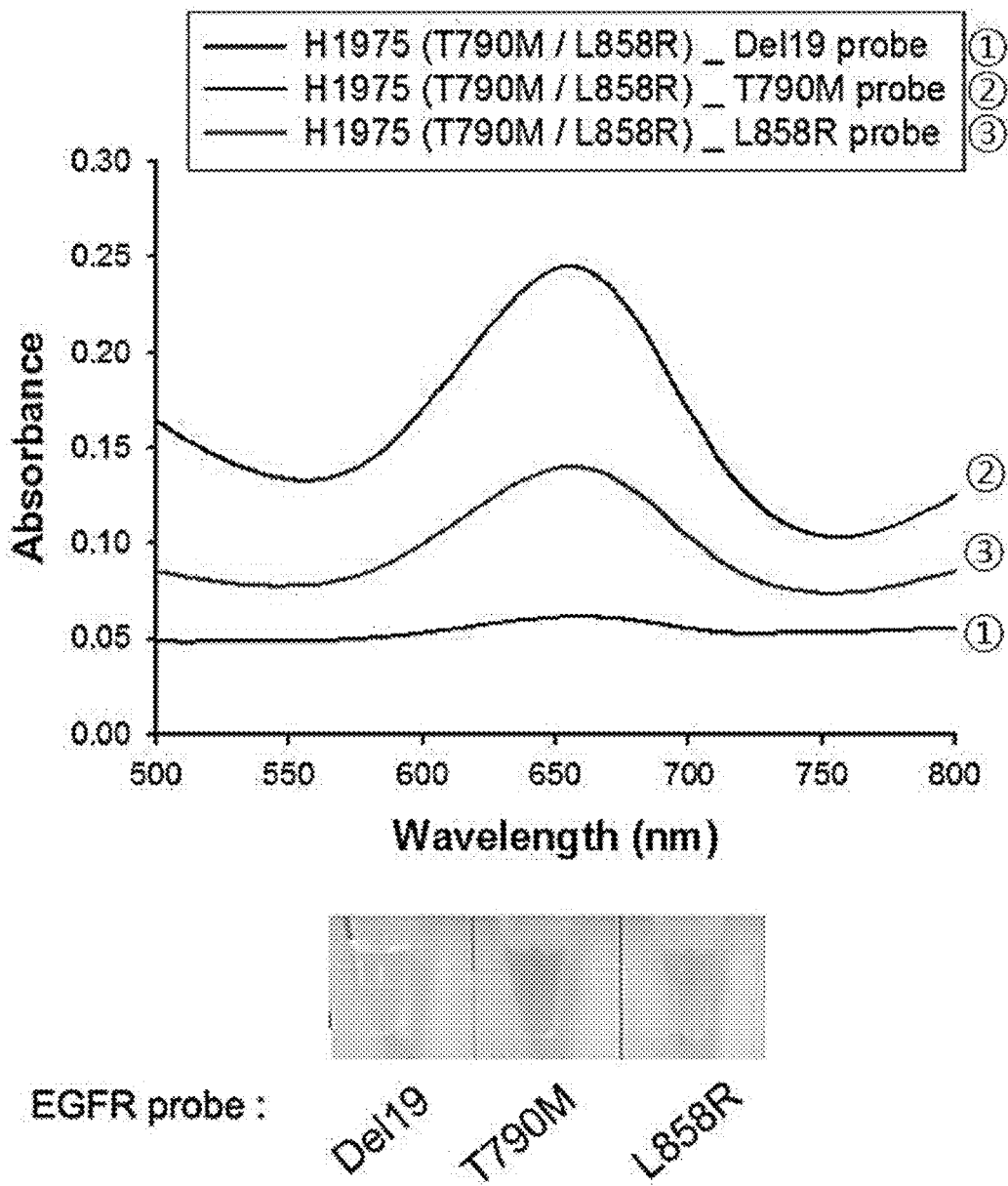
FIG. 47 illustrates results obtained by subjecting cfDNAs obtained from the plasma of lung cancer patients with EGFR exon 19 deletion and EGFR exon 20 T790M gene mutations to reaction with probes specific for EGFR exon 19 deletion (Del19), EGFR exon 20 T790M, and EGFR exon 21 L858R, and then adding HRP/streptavidin nanoparticles (containing a large amount of HRP) thereto to identify detection of the cfDNAs with color change and UV absorbance.

Example 9. Identification of Detectability for cfDNA Using HRP/Streptavidin Complexes As illustrated in FIG. 47, cfDNAs were extracted from the plasma of lung cancer patients with EGFR exon 19 deletion and exon 20 T790M gene mutations, reacted with probes for EGFR exon 19 Del, 20 T790M, and 21 L858R, and HRP/st-tagged NPs, and then the same EGFR exon 19 deletion and exon 20 T790M gene mutation results as the results in the patients' cancer tissue were identified with UV absorbance and color change.

Figure 48:
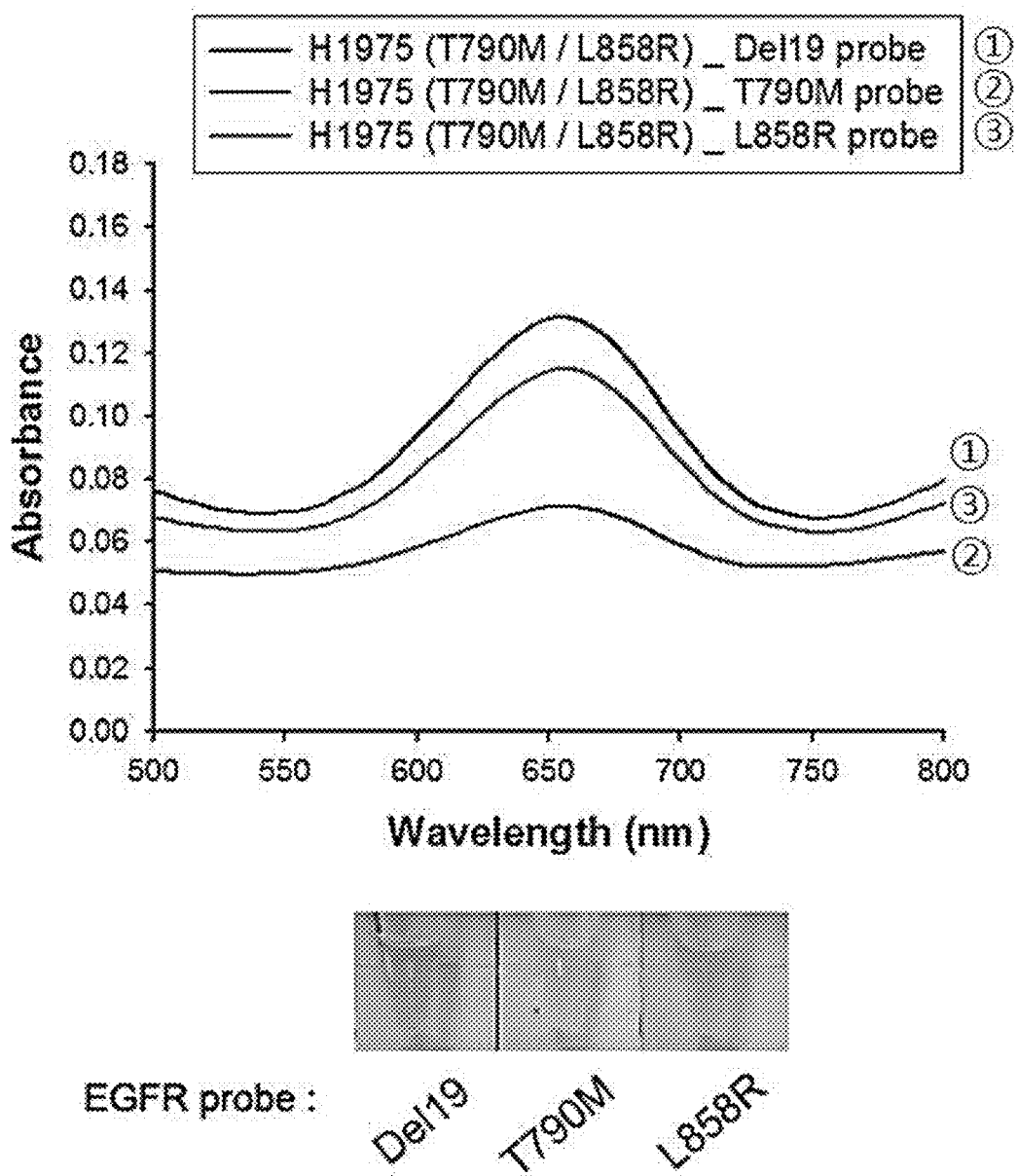
FIG. 48 illustrates results obtained by subjecting cfDNAs obtained from the plasma of the same lung cancer patients with EGFR exon 19 deletion and EGFR exon 20 T790M gene mutations as in FIG. 47 to reaction with probes specific for EGFR exon 19 deletion (Del19), EGFR exon 20 T790M, and EGFR exon 21 L858R, and then adding HRP/streptavidin complexes (complexes obtained by binding between HRP and streptavidin at 1:1) thereto to identify detection of the cfDNAs with color change and UV absorbance. From the results, it has been identified that noise is produced in a case of the HRP/streptavidin complexes, as compared with the HRP/streptavidin nanoparticles.

However, as illustrated in FIG. 48, when cfDNAs were extracted from the plasma of the same patients, and then reacted with the probes for EGFR exon 19 Del, 20 T790M, 21 L858R, and HRP-streptavidin complexes (in which HRP and streptavidin are bound to each other at 1:1) in place of the HRP/st-tagged NPs, gene mutation results completely different from the results in the patients' cancer tissue were observed. It was found that when the HRP/streptavidin complexes were used in place of the HRP/streptavidin-tagged nanoparticles (NPs), inaccurate gene mutation results were observed due to increased nonspecific binding.

Figure 49:
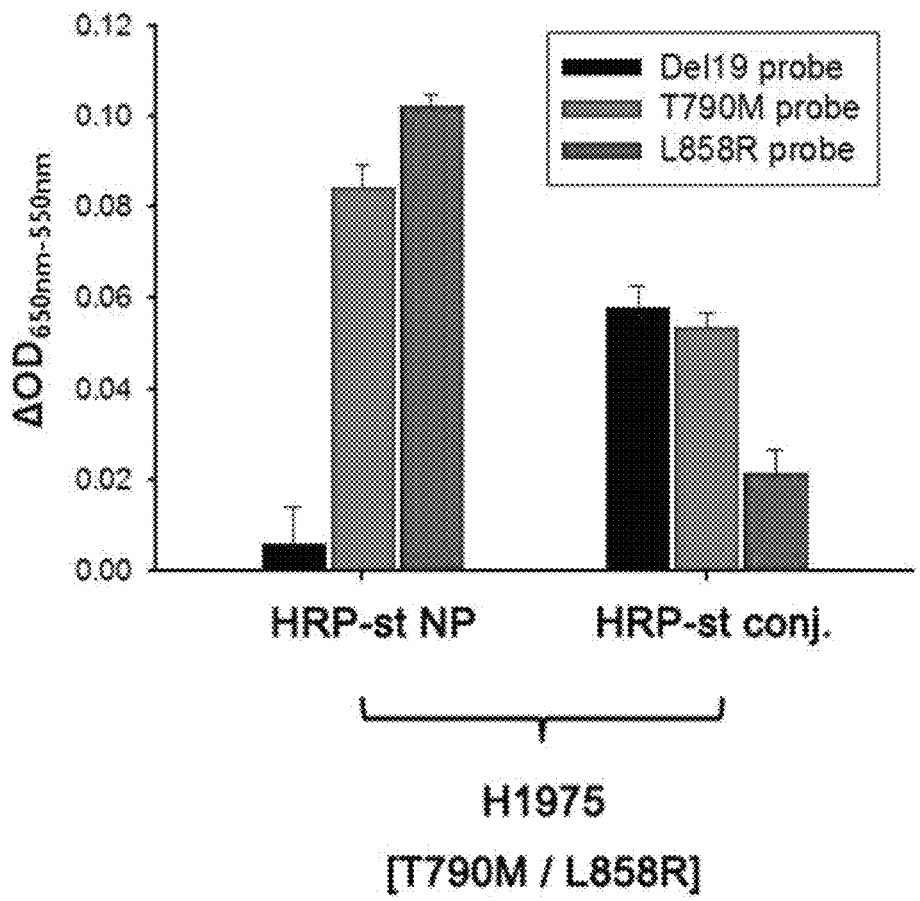
FIG. 49 illustrates a graph obtained by identifying and comparing matches with the cancer tissue's genotype, through analysis of both results obtained by extracting cfDNAs from the plasma of 5 lung cancer patients with EGFR exon 19 deletion and exon 20 T790M gene mutations, and then subjecting the cfDNAs to reaction with probes specific for EGFR exon 19 Del, EGFR exon 20 T790M, and EGFR exon 21 L858R, and HRP/streptavidin-tagged nanoparticles (HRP/st-tagged NPs), and to reaction with probes specific for EGFR exon 19 Del, EGFR exon 20 T790M, and EGFR exon 21 L858R, and HRP/streptavidin complexes (in which HRP and streptavidin are bound to each other at 1:1).

As illustrated in FIG. 49, analysis was performed for the results obtained by extracting cfDNAs from the plasma of 5 lung cancer patients with EGFR exon 19 deletion and exon 20 T790M gene mutations, and then subjecting the cfDNAs to reaction with probes for EGFR exon 19 Del, 20 T790M, and 21 L858R, and HRP/st-tagged NPs, and with probes for EGFR exon 19 Del, 20 T790M, and 21 L858R, and HRP/streptavidin complexes (in which HRP and streptavidin are bound to each other at 1:1) in place of the HRP/st-tagged NPs. As a result, it was identified that the cfDNAs obtained through nanowires showed UV absorbance that matched the cancer tissue due to increased reaction specificity caused by binding of the probes and the HRP/st-tagged NPs thereto. In addition, it was identified that the HRP/st-tagged NPs played an important role in determining gene mutations even in the plasma of the 5 lung cancer patients with EGFR exon 20 T790M and 21 L858R gene mutations.

Figure 50:
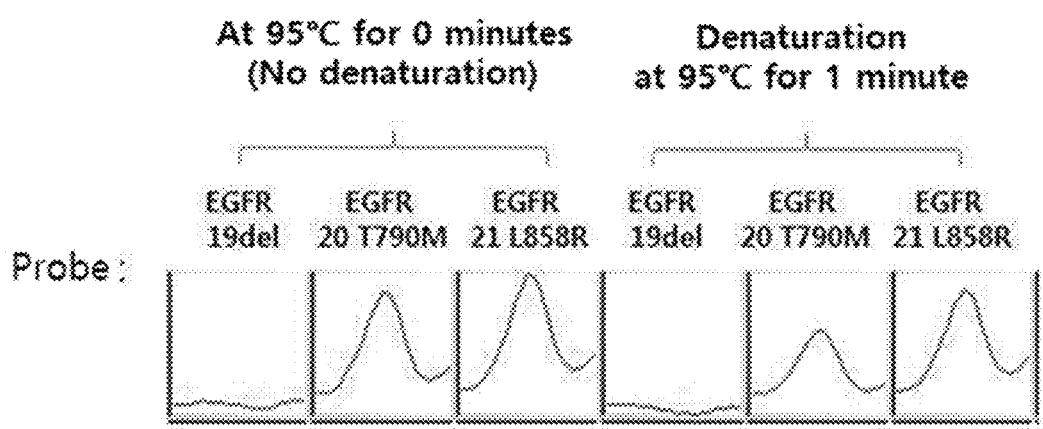
FIG. 50 illustrates a result obtained by subjecting cfDNAs obtained from the pleural fluid of lung cancer patients with EGFR exon 20 T790M and 21 L858R gene mutations to reaction with probes for EGFR exon 19 deletion (19 Del), EGFR exon 20 T790M, and EGFR exon 21 L858R, to which an HRP/st-tagged NP has been already bound, and then identifying detection of gene mutations with UV absorbance.

VI. Detection of cfDNA Using Complexes in which Probe and Marker are Bound to Each Other Example 10. Detection of Gene Mutations Using Probes to which HRP/St-Tagged NP is Bound As illustrated in FIG. 50, instead of subjecting cfDNAs to sequential reaction with probes and HRP/st-tagged NPs, respectively, HRP/st-tagged NPs were first bound to probes specific for EGFR exon 19 Del, 20 T790M, and 21 L858R, to produce binding products in the form of probe-HRP marker, and cfDNAs were subjected to reaction with such binding products; and as a result, it was identified that the same genotype as the cancer tissue was detected even in the pleural fluid of lung cancer patients with EGFR exon 20 T790M and 21 L858R gene mutations.

VII. Detection of cfDNA Depending on Mixing Sequence

Figure 52:
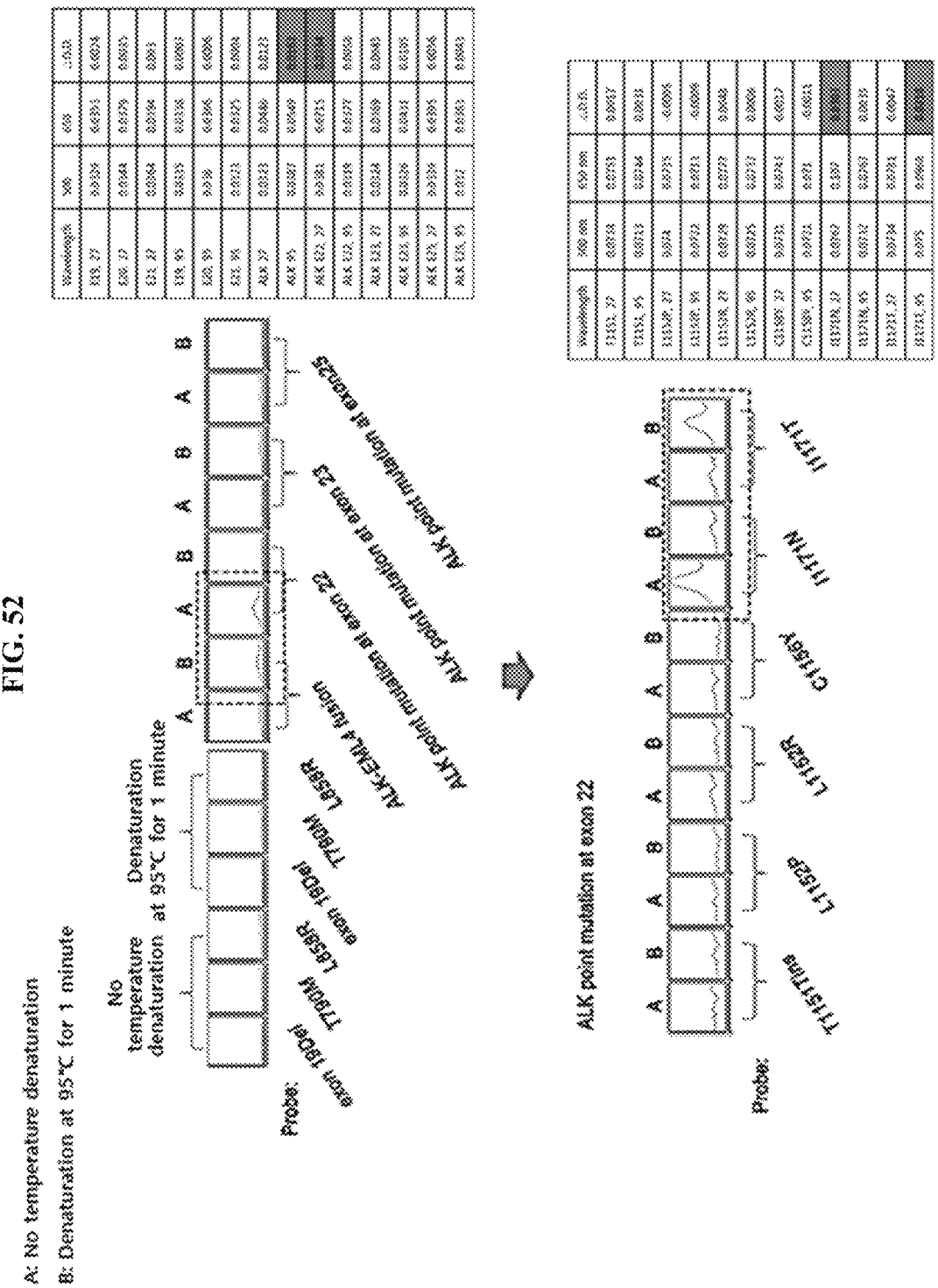
FIG. 52 illustrates results obtained by mixing cfDNAs obtained from the plasma of lung cancer patients with ALK-EML4 fusion and ALK point mutation (I1171N/T) gene mutations, all at once, with probes specific for ALK-EML4 fusion and ALK point mutations (T1151, L1152P, L1152R, C1156Y, I1171N/T), and HRP/st-tagged NPs, for detection of gene mutations in the cfDNAs, and as a result, identifying that ALK-EML4 fusion and ALK point mutation (I1171N/T) genotypes are detected as in the cancer tissue.
Figure 53:
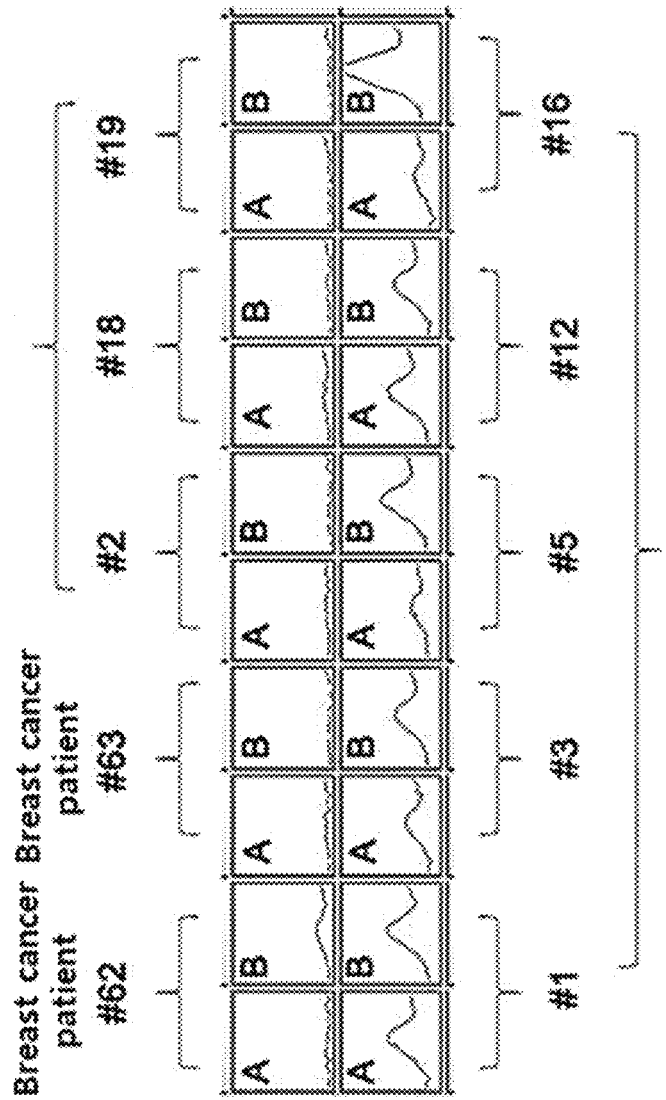
FIG. 53 illustrates results obtained by mixing cfDNAs obtained from the plasma of thyroid cancer patients with BRAF V600E gene mutation, all at once, with a probe specific for BRAF V600E and HRP/st-tagged NPs, for detection of gene mutations in the cfDNAs, and as a result, identifying that the same BRAF V600E gene mutation as the patients' genotype is detected.

Example 11. Identification of Detection of Unstable cfDNA Through Simultaneous Mixing of Probe and Marker As illustrated in FIG. 51, instead of subjecting cfDNAs to sequential reaction with CP and DP probes and HRP/st-tagged NPs, respectively, cfDNAs were mixed, all at once, with the probes and the HRP/st-tagged NPs and reaction was allowed to occur; and as a result, it was identified that the same genotype as the cancer tissue was detected even in the plasma of lung cancer patients with EGFR exon 20 T790M and 21 L858R gene mutations. In addition, as illustrated in FIG. 52, cfDNAs were mixed, all at once, with CP and DP probes and HRP/st-tagged NPs and reaction was allowed to occur; and as a result, it was identified that the same genotype as the cancer tissue was detected even in the plasma of lung cancer patients with ALK-EML4 fusion and ALK point mutation (I1171N/T) gene mutations.

VIII. Detection of Unstable cfDNA Depending on Sample Denaturation Conditions

Example 12. Detection of cfDNA after Sample Denaturation Depending on Temperature Conditions Experiments were conducted to identify whether unstable cfDNA and stable cfDNA can be distinguished from each other depending on sample denaturation conditions. Specifically, using a probe capable of detecting EGFR 19 deletion, the plasma collected from normal subjects and lung cancer patients (0208-343, 20190311_LC #1, result from tissue: E19del) was subjected to various denaturation conditions, and then it was examined whether unstable cfDNA and stable cfDNA can be distinguished from each other.

For the probe, ggaattaaga gaagcaacat ctcc (SEQ ID NO: 9), which is a probe capable of detecting EGFR exon 19 deletion, was used. Here, a biotin-bound PEI/Ppy nanowires were used, and nanoparticles in which probe was used. HRP/streptavidin were aggregated were used as markers.

Figure 8:
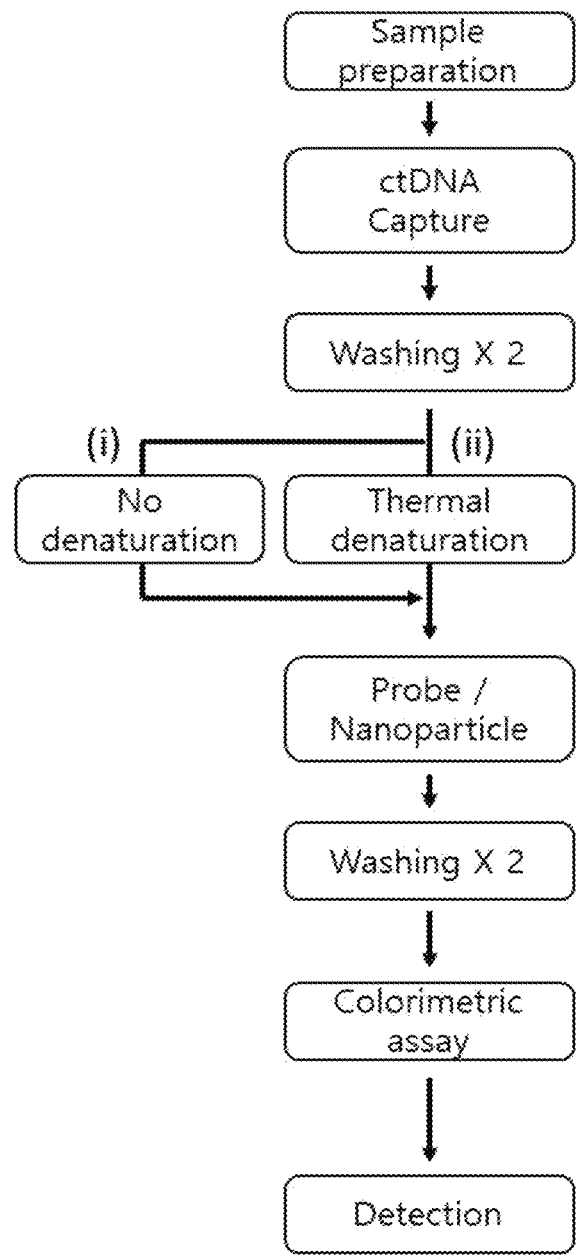
FIG. 8 illustrates, in a time-sequential flow, a method for detecting unstable cfDNA in a sample such as blood, cerebrospinal fluid, or pleural fluid.
Figure 9:
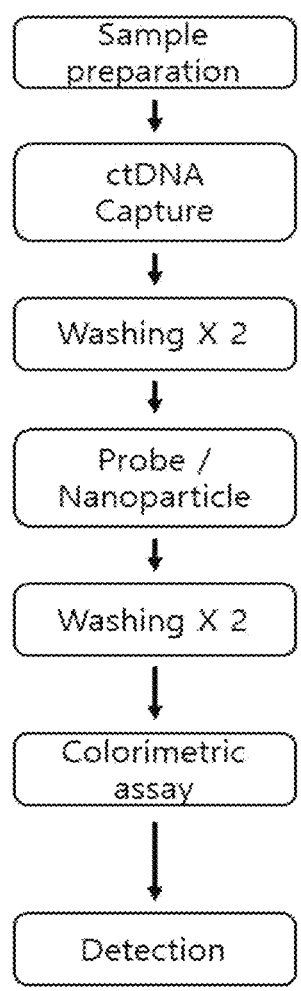
FIG. 9 illustrates, in a time-sequential flow, a method for detecting unstable cfDNA in a sample such as urine.
Figure 10:
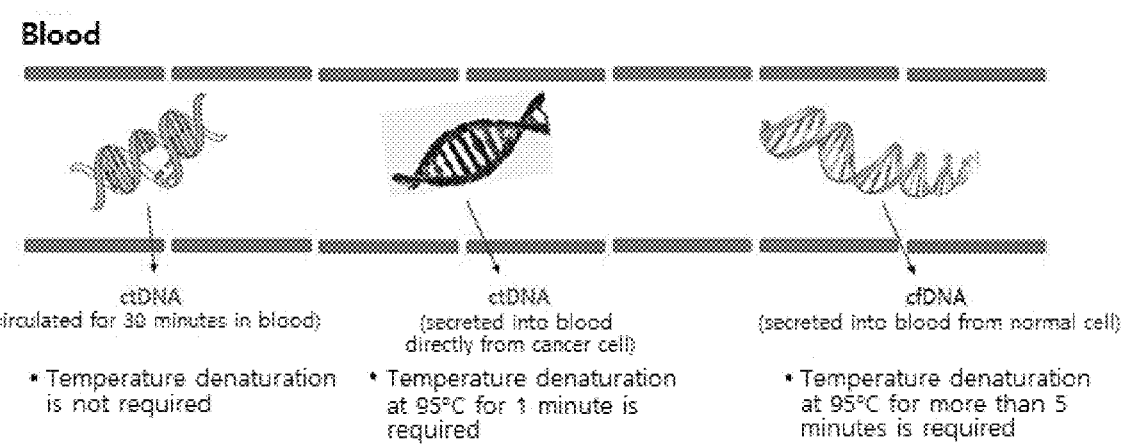
FIG. 10 schematically illustrates differences in denaturation condition depending on states of cfDNA acquired from the blood.
Figure 11:
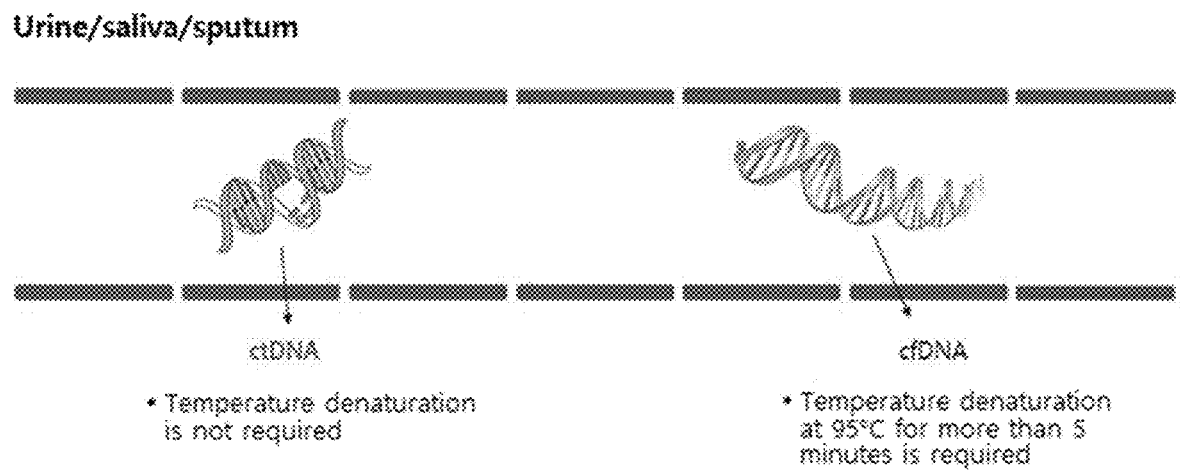
FIG. 11 schematically illustrates differences in denaturation condition depending on states of cfDNA acquired from the urine, the saliva, and the sputum.

Specifically, before isolation of cfDNA with nanowires, the sample was treated under various conditions as follows. The sample was heated at 30° C. for 15 minutes and 0 minutes, respectively. In addition, the sample was heated at 60° C. for 5 minutes and 0 minutes, respectively. In addition, the sample was heated at 95° C. for 1 minute and 0 minutes, respectively. The other steps were performed in a method as schematized in FIG. 8.

Figure 54:
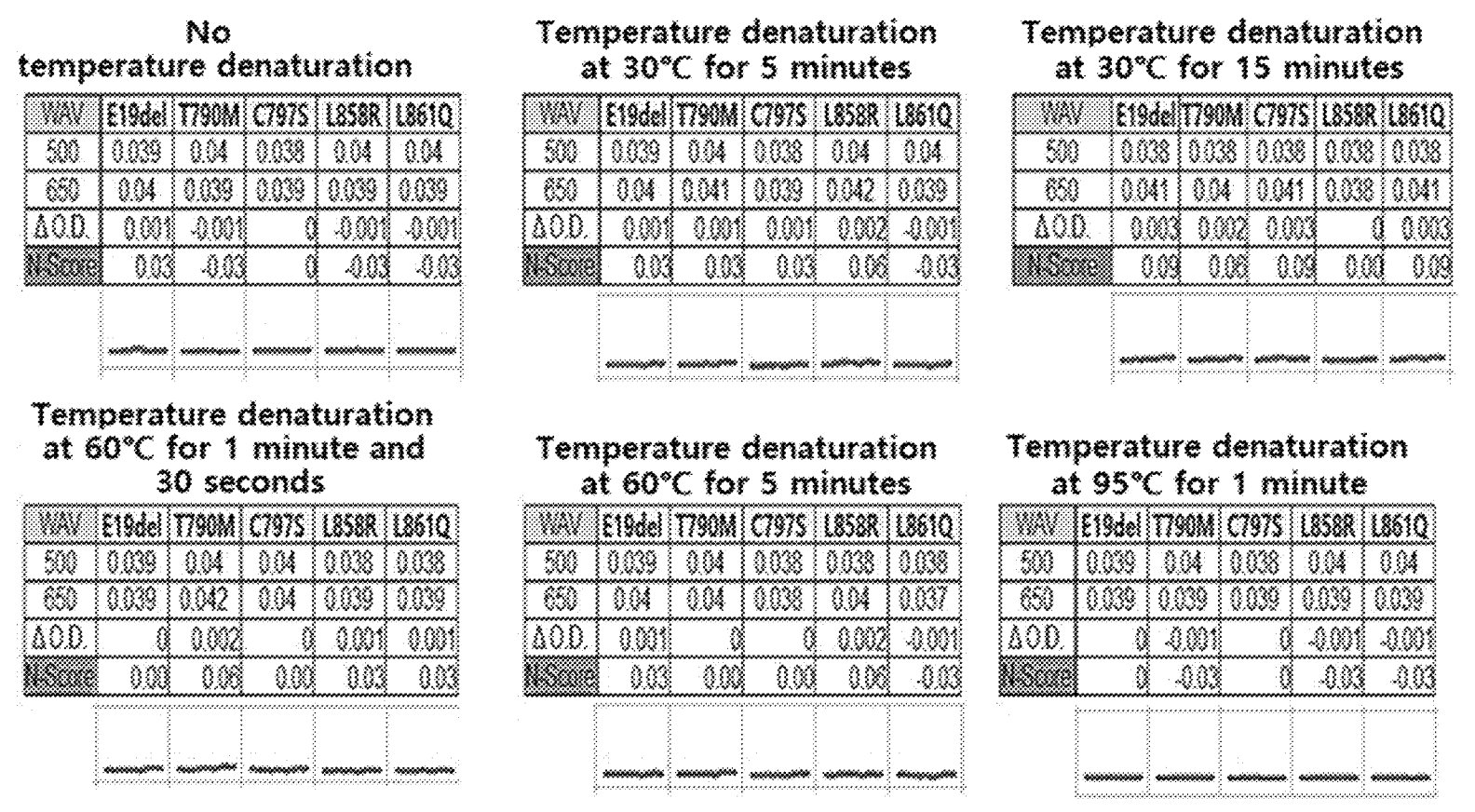

As a result, in normal subjects with no EGFR 19 deletion mutation, unstable cfDNA was not detected under any of the denaturing conditions (FIG. 54). However, in E19del patients, it was identified that unstable cfDNA was detected under all different denaturation conditions (FIG. 55). From these results, through the presence or absence of unstable cfDNA, it was possible to provide information that a lung cancer patient had E19del mutation.

Example 13. Detection of Cell Line-Derived Unstable cfDNA Depending on Temperature Conditions As in samples obtained from the human body, experiments were conducted to identify mutation positions present in cell lines. Specifically, fDNA having a size similar to that of cfDNA was obtained from each of HCC2279 (Exon19Del), HCC827 (Exon 19Del), H1975 (T790M, L858R), and A549 (EGFR wildtype). Specifically, the fDNA was obtained by the method in Example 2.

Figure 56:
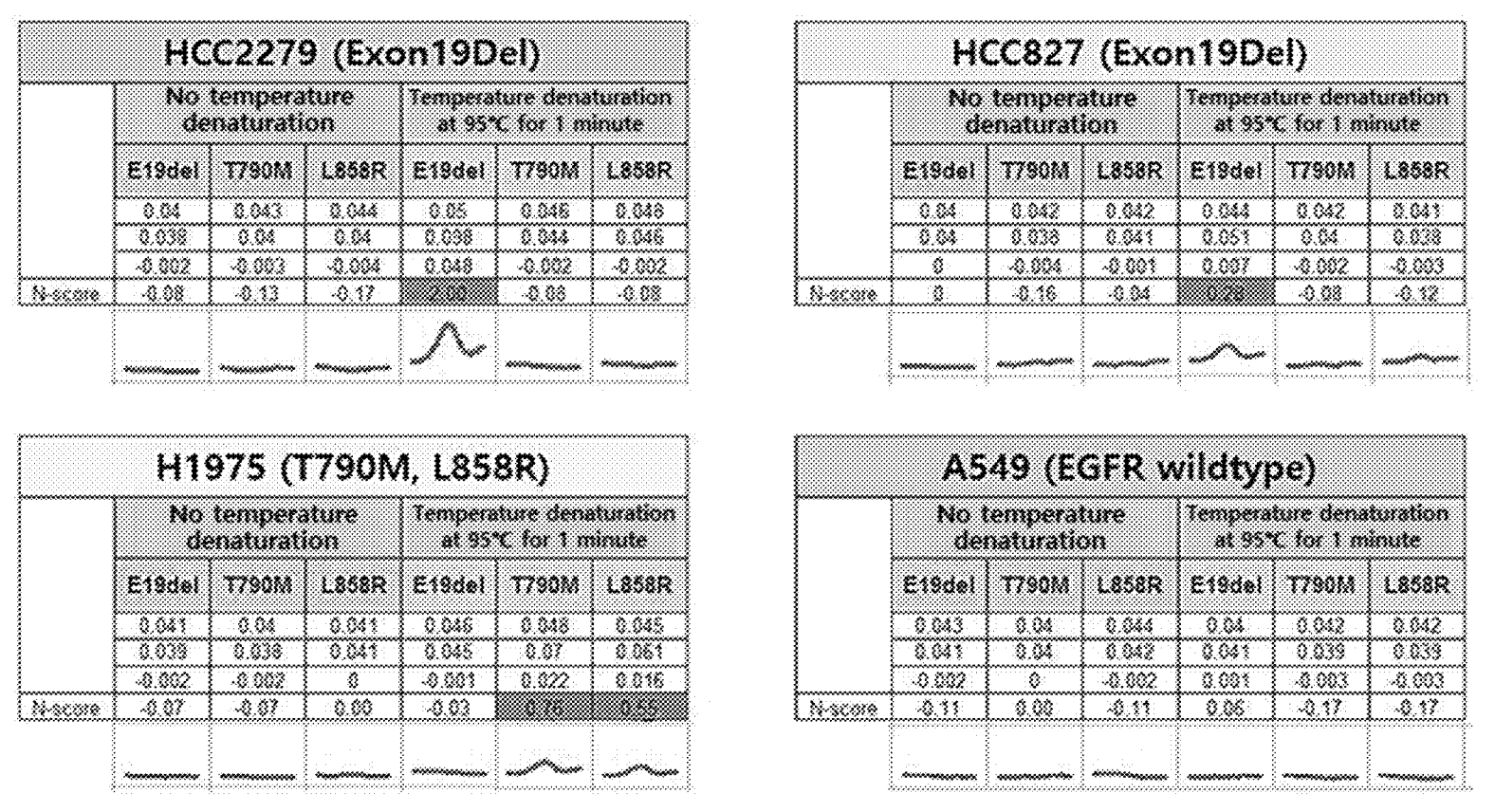

As a result, it was identified that under denaturation conditions of being heated at 95° C. for 1 minute and 0 minutes, respectively, only unstable cfDNA bound specifically to the probes and was detected in a state of being bound to the marker (FIG. 56). From these results, it was verified that it was possible to identify the presence or absence of unstable cfDNA could be also identified in samples obtained from cell lines.

Example 14. Detection of Unstable cfDNA Depending on Treatment with DNase

In order to identify whether unstable cfDNA and stable cfDNA differ depending on not only temperature conditions but also a DNA degrading enzyme, unstable cfDNA and stable cfDNA were subjected to treatment with a DNase, and then reactivity thereof with probes was checked. Here, the sample did not undergo denaturation using high temperature.

Figure 57:
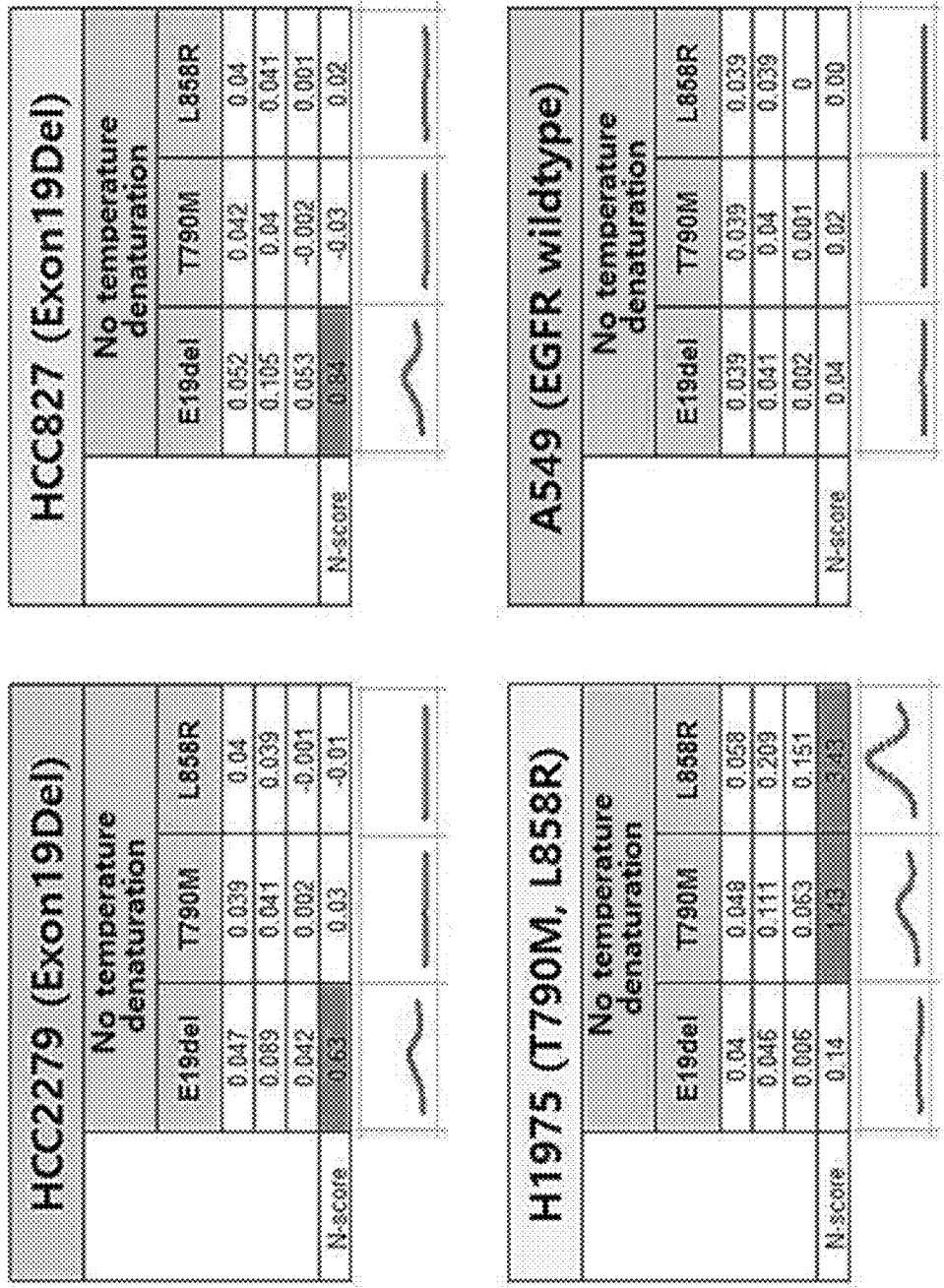
FIG. 57 illustrates results obtained by subjecting fDNAs obtained from mutant cell lines to treatment with DNase at 37° C. for 30 minutes, and then detecting unstable cfDNAs for treatment conditions.
Figure 58:
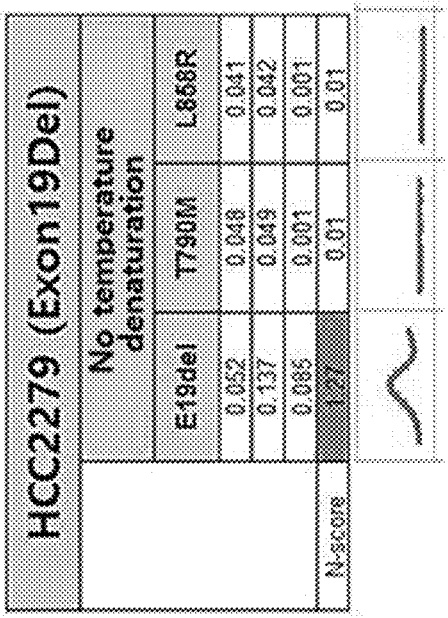
FIG. 58 illustrates results obtained by subjecting fDNAs obtained from mutant cell lines to treatment with DNase at 37° C. for 60 minutes, and then detecting unstable cfDNAs for treatment conditions.

Specifically, fDNA obtained, using PEI/Ppy nanowires, from each of HCC2279 (Exon19Del), HCC827 (Exon19Del), H1975 (T790M, L858R), and A549 (EGFR wildtype) was suspended in PBS, and then treated with 1 μl of a DNase. As a result of treatment at 37° C. for 30 minutes, it was identified that the unstable cfDNA and the stable cfDNA differed in terms of reactivity with the probes (FIG. 57). In addition, it was identified that the same effect was exhibited even when the treatment with DNase was performed at 37° C. for 60 minutes (FIG. 58). Based on these results, it was possible to identify that stable cfDNA was not easily degraded by the DNase enzyme.

Figure 59:
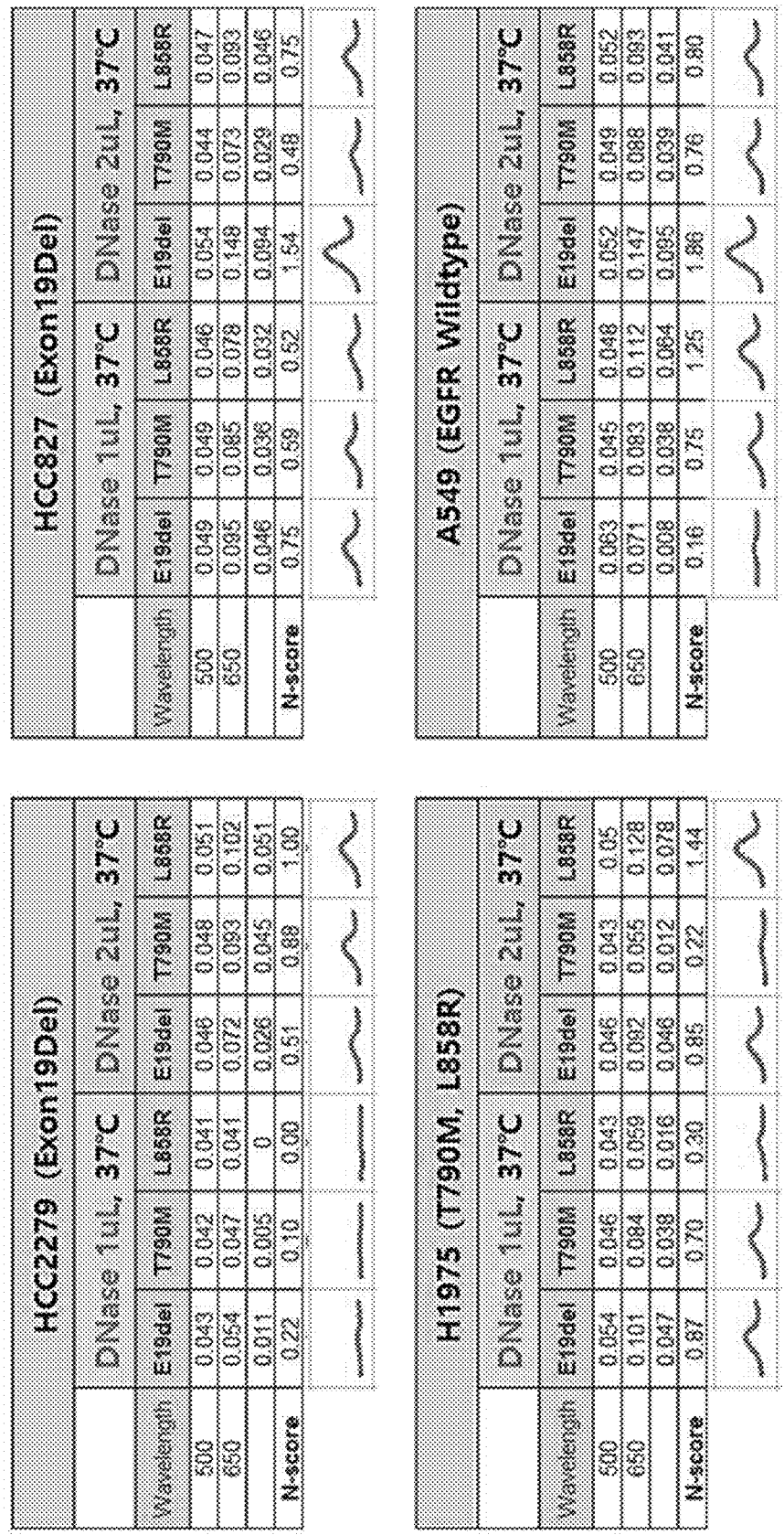
FIG. 59 illustrates results obtained by subjecting fDNAs obtained from mutant cell lines to treatment with DNase at 37° C. for 120 minutes, and then detecting unstable cfDNAs for treatment conditions.

However, as a result of treatment with 1 μl or 2 μl of DNase at 37° C. for 120 minutes, it was identified that stable cfDNA also responded to probes when the time for treatment with DNase was prolonged or an increased amount of DNase was used (FIG. 59). From these results, it was possible to identify differences in stability between unstable cfDNA and stable cfDNA.

Figure 60:
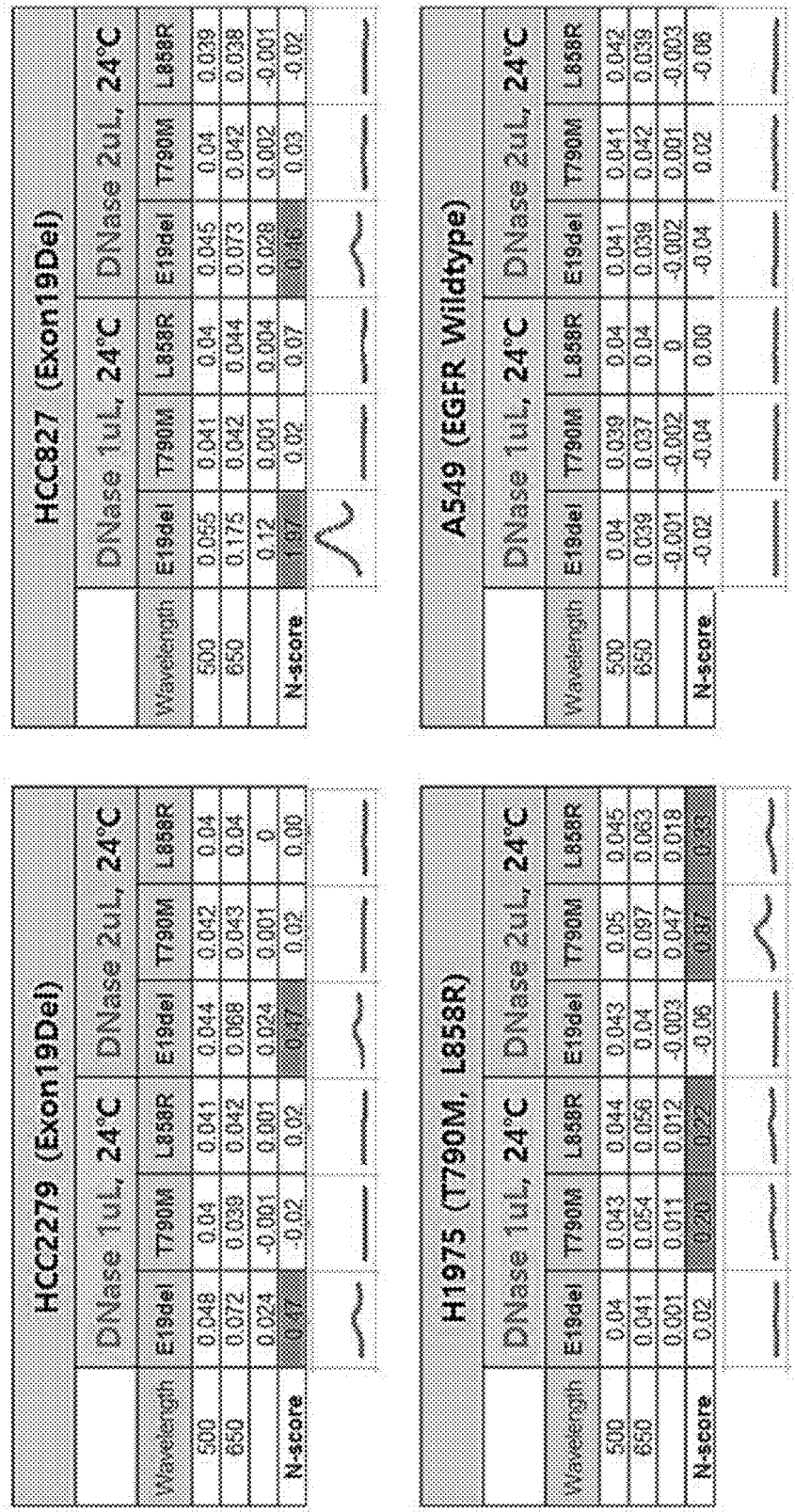
FIG. 60 illustrates results obtained by subjecting unstable cfDNAs and stable cfDNAs to treatment with 1 µl or 2 µl of DNase at 24° C. for 120 minutes, in order to identify differences between the unstable cfDNAs and the stable cfDNAs depending on activity of DNase.

In addition, in order to identify differences between the unstable cfDNA and the stable cfDNA depending on activity of DNase, the results obtained by treatment with 1 μl or 2 μl of DNase at 24° C. for 120 minutes are illustrated in FIG. 60. As a result, although activity of the enzyme decreased at 24° C., it was identified that the unstable cfDNA and the stable cfDNA differed in terms of reactivity with the probes (FIG. 60).

Figure 61:
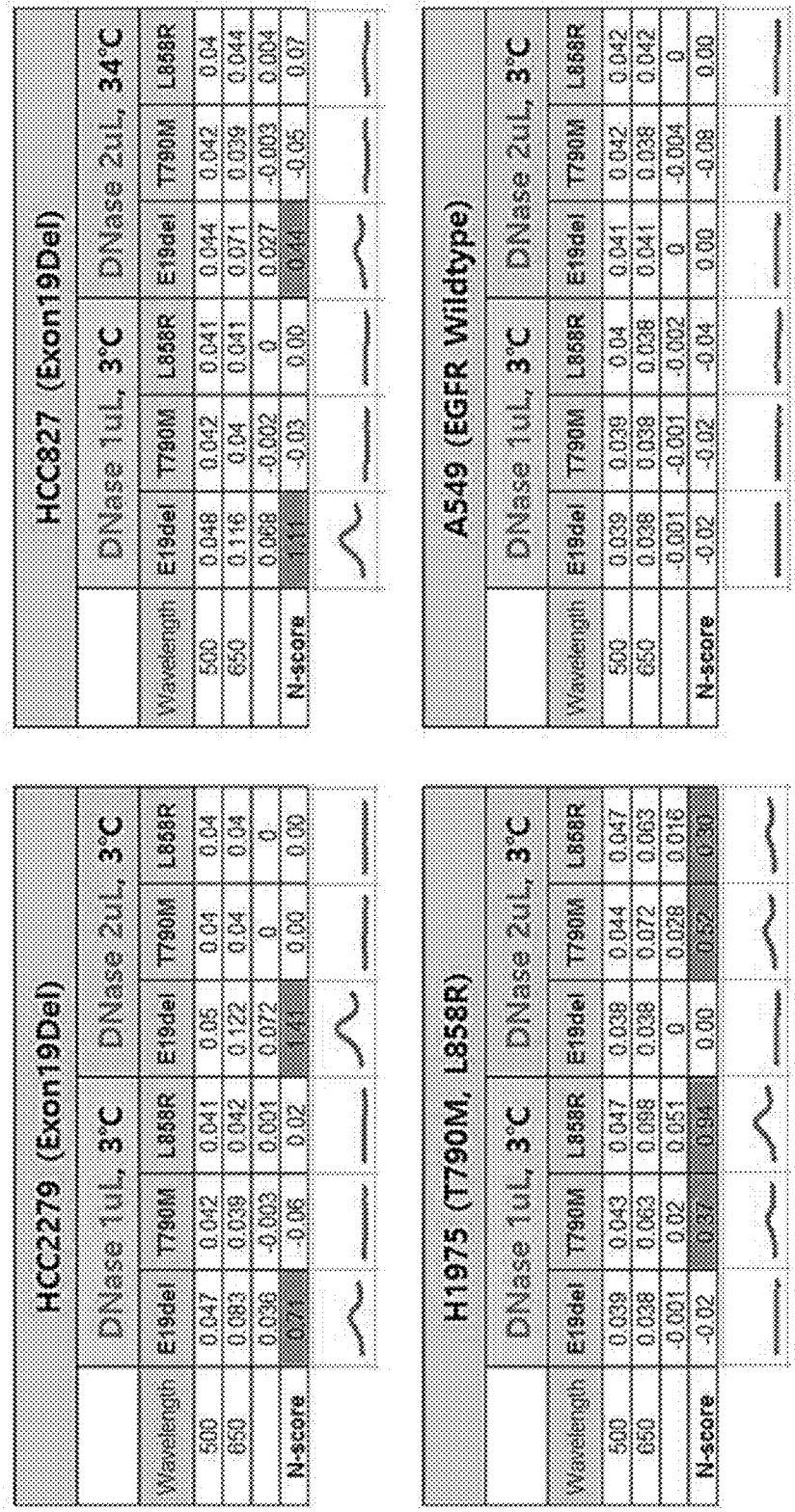
FIG. 61 illustrates results obtained by subjecting unstable cfDNAs and stable cfDNAs to treatment with 1 µl or 2 µl of DNase at 3° C. for 120 minutes, in order to identify differences between the unstable cfDNAs and the stable cfDNAs depending on activity of DNase.

In addition, in order to identify differences between the unstable cfDNA and the stable cfDNA depending on activity of DNase, the results obtained by treatment with 1 μl or 2 μl of DNase at 3° C. for 120 minutes are illustrated in FIG. 58. As a result, although activity of the enzyme decreased at 3° C., it was identified that the unstable cfDNA and the stable cfDNA differed in terms of reactivity with the probes (FIG. 61).

---

The invention claimed is:

1. A method for detecting cell-free DNA (cfDNA) having an unstable double-helix structure from a sample without amplification, the method comprising:
   a) mixing a sample containing cfDNA with a positively charged substance;
   b) isolating the positively charged substance to which the cfDNA is bound;
   c) subjecting the isolate of step (b) to a condition wherein the cfDNA having an unstable double-helix structure is denatured and cfDNA having a stable double-helix structure is not denatured;
   d) mixing the mixture comprising the isolate of step (b) with a probe and a marker;
   e) removing the probe and the marker which are not bound to the cfDNA; and
   f) detecting the marker,
   wherein cfDNA having an unstable double-helix structure is thermodynamically unstable as compared with cfDNA having a stable double-helix structure, and has a damaged nucleic acid sequence that is not present in normal cells,
   wherein the probe selectively binds to denatured cfDNA having an unstable double-helix structure, but does not bind to cfDNA having a stable double-helix structure that, under the condition that cfDNA having an unstable double-helix structure is denatured, but cfDNA having a stable double-helix structure is not denatured; and
   wherein nucleotides of the damaged nucleic acid sequence of the cfDNA having an unstable double-helix structure fail to form a complementary binding and the probe specifically binds to a region comprising the damaged nucleic acid sequence.

2. The method of claim 1, wherein the cfDNA having an unstable double-helix structure is characterized by:
   i) having a Tm value lower than cfDNA having a stable double-helix structure; or
   ii) being denatured under a condition where cfDNA having a stable double-helix structure is not denatured.

3. The method of claim 1, wherein the cfDNA having an unstable double-helix structure is capable of binding to a 15-mer to 30-mer probe capable of complementarily binding to the cfDNA, under any one condition of the following conditions:
   i) a condition of being allowed to stand for 1 to 120 minutes at room temperature;
   ii) a condition of being heated at 90° C. to 95° C. for 1 second to 3 minutes;
   iii) a condition of being heated at 75° C. to 90° C. for 1 second to 5 minutes;
   iv) a condition of being heated at 60° C. to 75° C. for 30 seconds to 30 minutes;
   v) a condition of being heated at 25° C. to 40° C. for 10 to 120 minutes;
   vi) a condition of being treated with a protease for 1 to 30 minutes; and
   vii) a condition of being treated with a DNase for 1 to 30 minutes.

4. The method of claim 1, wherein the cfDNA having an unstable double-helix structure is circulating tumor DNA.

5. The method of claim 1, wherein the damaged nucleic acid sequence that is not present in normal cells contains any one structural abnormality selected from the group consisting of deletion, duplication, inversion, translocation, mismatch, and single nucleotide variation (SNV).

6. The method of claim 1, wherein the condition of step c) is any one condition of the following conditions:
   i) a condition of being allowed to stand at room temperature for 1 to 10 minutes;
   ii) a condition of being heated at 90° C. to 95° C. for 1 second to 1 minute;
   iii) a condition of being heated at 75° C. to 90° C. for 10 seconds to 3 minutes;
   iv) a condition of being heated at 60° C. to 75° C. for 1 to 30 minutes;
   v) a condition of being heated at 25° C. to 40° C. for 5 to 60 minutes;
   vi) a condition of being treated with a protease for 1 to 10 minutes; and
   vii) a condition of being treated with a DNase for 1 to 10 minutes.

7. The method of claim 1, wherein the probe is composed of 15-mer to 30-mer nucleotides.

8. The method of claim 7, wherein the probe is in the form to which biotin can bind.

9. The method of claim 1, wherein the marker comprises horse-radish peroxidase (HRP) or a fluorescent protein.

10. The method of claim 9, wherein the marker further comprises any one selected from the group consisting of avidin, streptavidin, and a combination thereof.

11. The method of claim 1, wherein the marker is a nanoparticle that comprises a conductive polymer; hyaluronic acid; avidin or streptavidin; and horse-radish peroxidase (HRP) or a fluorescent protein.

12. The method of claim 1, wherein the positively charged substance is a positively charged nanowire.

13. The method of claim 12, wherein the nanowire further comprises biotin.

14. The method of claim 12, wherein the nanowire comprises a conductive polymer.

15. The method of claim 14, wherein the conductive polymer is any one selected from the group consisting of poly(acetylene), poly(pyrrole), poly(thiophene), poly(paraphenylene), poly(3,4-ethylenedioxythiophene), poly(phenylene sulfide), poly(para-phenylene vinylene), and polyaniline.

16. The method of claim 1, wherein the sample is any one selected from the group consisting of urine, cerebrospinal fluid, plasma, blood, pleural fluid, ascites, saliva, sputum, and body fluid.

17. The method of claim 1, wherein the damaged nucleic acid sequence is a mutated sequence of at least one gene selected from the group consisting of EGFR, KRAS, BRAF, TP53, PIK3CA, ROS1, RET, c-Met, PTEN, RB1, AR, BRCA, KIT, FGFR, IDH, ESR1, HER2, ALK-EML4, and TMPRSS2-ERG.

18. The method of claim 1, wherein in the step e), the marker is detected by color change, UV absorbance change, fluorescence response change, or electrochemical change.

19. A method for detecting cfDNA having an unstable double-helix structure from a sample without amplification, the method comprising:
   a) mixing a sample containing cfDNA with a positively charged substance;
   b) isolating the positively charged substance to which the cfDNA is bound;
   c) subjecting the isolate of step (b) to a condition wherein the cfDNA having an unstable double-helix structure is denatured and cfDNA having a stable double-helix structure is not denatured;
   d) mixing the mixture comprising the isolate of step (b) with a probe and a marker;
   e) removing the probe and the marker which are not bound to the cfDNA;
   f) detecting the marker; and
   g) determining that there is cancer or an infectious disease associated with a gene corresponding to the cfDNA having the unstable double-helix structure, when the marker is detected, and
   wherein cfDNA having an unstable double-helix structure is thermodynamically unstable as compared with cfDNA having a stable double-helix structure, and has a damaged nucleic acid sequence that is not present in normal cells,
   wherein the probe selectively binds to denatured cfDNA having an unstable double-helix structure, but does not bind to cfDNA having a stable double-helix structure that, under the condition that cfDNA having an unstable double-helix structure is denatured, but cfDNA having a stable double-helix structure is not denatured; and
   wherein nucleotides of the damaged nucleic acid sequence of the cfDNA having an unstable double-helix structure fail to form a complementary binding and the probe specifically binds to a region comprising the damaged nucleic acid sequence.

* * * * *

SEQUENCE LISTING

```
<160> NUMBER OF SEQ ID NOS: 48

<210> SEQ ID NO 1
<211> LENGTH: 24
<212> TYPE: DNA
<213> ORGANISM: Artificial Sequence
<220> FEATURE:
<223> OTHER INFORMATION: HPV 16-CP

<400> SEQUENCE: 1
gaggaggagg atgaaataga tggt                                          24
```

<210> SEQ ID NO 2
<211> LENGTH: 21
<212> TYPE: DNA
<213> ORGANISM: Artificial Sequence
<220> FEATURE:
<223> OTHER INFORMATION: HPV 16-DP

<400> SEQUENCE: 2
ttggaagacc tgttaatggg c                                             21

<210> SEQ ID NO 3
<211> LENGTH: 22
<212> TYPE: DNA
<213> ORGANISM: Artificial Sequence
<220> FEATURE:
<223> OTHER INFORMATION: HPV 18-CP

<400> SEQUENCE: 3
cacattgtgg cacaatcttt ta                                            22

<210> SEQ ID NO 4
<211> LENGTH: 20
<212> TYPE: DNA
<213> ORGANISM: Artificial Sequence
<220> FEATURE:
<223> OTHER INFORMATION: HPV 18-DP

<400> SEQUENCE: 4
gccatatcgc tttcatctgt                                               20

<210> SEQ ID NO 5
<211> LENGTH: 24
<212> TYPE: DNA
<213> ORGANISM: Artificial Sequence
<220> FEATURE:
<223> OTHER INFORMATION: EGFR 19-CP

<400> SEQUENCE: 5
ggaattaaga gaagcaacat ctcc                                          24

<210> SEQ ID NO 6
<211> LENGTH: 19
<212> TYPE: DNA
<213> ORGANISM: Artificial Sequence
<220> FEATURE:
<223> OTHER INFORMATION: EGFR 19-DP

<400> SEQUENCE: 6
aacctcaggc ccacctttt                                                19

<210> SEQ ID NO 7
<211> LENGTH: 21
<212> TYPE: DNA
<213> ORGANISM: Artificial Sequence
<220> FEATURE:
<223> OTHER INFORMATION: EGFR 21-CP

<400> SEQUENCE: 7
ccaggaacgt actggtgaaa a                                             21

<210> SEQ ID NO 8
<211> LENGTH: 22
<212> TYPE: DNA
<213> ORGANISM: Artificial Sequence
<220> FEATURE:

<223> OTHER INFORMATION: EGFR 21-DP

<400> SEQUENCE: 8
ggaagagaaa gaataccatg ca                                              22

<210> SEQ ID NO 9
<211> LENGTH: 24
<212> TYPE: DNA
<213> ORGANISM: Artificial Sequence
<220> FEATURE:
<223> OTHER INFORMATION: EGFR Exon 19-probe1 CP1

<400> SEQUENCE: 9
ggaattaaga gaagcaacat ctcc                                            24

<210> SEQ ID NO 10
<211> LENGTH: 18
<212> TYPE: DNA
<213> ORGANISM: Artificial Sequence
<220> FEATURE:
<223> OTHER INFORMATION: EGFR Exon 19-probe1 DP

<400> SEQUENCE: 10
aacctcaggc ccacctttt                                                  18

<210> SEQ ID NO 11
<211> LENGTH: 21
<212> TYPE: DNA
<213> ORGANISM: Artificial Sequence
<220> FEATURE:
<223> OTHER INFORMATION: EGFR Exon 19-probe2 CP2

<400> SEQUENCE: 11
aaaattcccg tcgctatcaa g                                               21

<210> SEQ ID NO 12
<211> LENGTH: 19
<212> TYPE: DNA
<213> ORGANISM: Artificial Sequence
<220> FEATURE:
<223> OTHER INFORMATION: EGFR Exon 19-probe2 DP

<400> SEQUENCE: 12
aacctcaggc ccaccttttt                                                 19

<210> SEQ ID NO 13
<211> LENGTH: 24
<212> TYPE: DNA
<213> ORGANISM: Artificial Sequence
<220> FEATURE:
<223> OTHER INFORMATION: EGFR Exon 19-probe3 CP3

<400> SEQUENCE: 13
ggactctgga tcccagaagg tgag                                            24

<210> SEQ ID NO 14
<211> LENGTH: 19
<212> TYPE: DNA
<213> ORGANISM: Artificial Sequence
<220> FEATURE:
<223> OTHER INFORMATION: EGFR Exon 19-probe3 DP

<400> SEQUENCE: 14
aacctcaggc ccaccttttt                                                 19

```
<210> SEQ ID NO 15
<211> LENGTH: 24
<212> TYPE: DNA
<213> ORGANISM: Artificial Sequence
<220> FEATURE:
<223> OTHER INFORMATION: EGFR Exon 20-probe1 CP1

<400> SEQUENCE: 15
ccatgagtac gtattttgaa actc                                          24

<210> SEQ ID NO 16
<211> LENGTH: 24
<212> TYPE: DNA
<213> ORGANISM: Artificial Sequence
<220> FEATURE:
<223> OTHER INFORMATION: EGFR Exon 20-probe1 DP

<400> SEQUENCE: 16
gcaagagttt gccatgggga tatg                                          24

<210> SEQ ID NO 17
<211> LENGTH: 27
<212> TYPE: DNA
<213> ORGANISM: Artificial Sequence
<220> FEATURE:
<223> OTHER INFORMATION: EGFR Exon 20-probe2 CP2

<400> SEQUENCE: 17
ccaccgtgca gctcatcacg cagctca                                       27

<210> SEQ ID NO 18
<211> LENGTH: 24
<212> TYPE: DNA
<213> ORGANISM: Artificial Sequence
<220> FEATURE:
<223> OTHER INFORMATION: EGFR Exon 20-probe2 DP

<400> SEQUENCE: 18
gcaagagttt gccatgggga tatg                                          24

<210> SEQ ID NO 19
<211> LENGTH: 23
<212> TYPE: DNA
<213> ORGANISM: Artificial Sequence
<220> FEATURE:
<223> OTHER INFORMATION: EGFR Exon 20-probe3 CP3

<400> SEQUENCE: 19
gaagcctacg tgatggccag cgt                                           23

<210> SEQ ID NO 20
<211> LENGTH: 24
<212> TYPE: DNA
<213> ORGANISM: Artificial Sequence
<220> FEATURE:
<223> OTHER INFORMATION: EGFR Exon 20-probe3 DP

<400> SEQUENCE: 20
gcaagagttt gccatgggga tatg                                          24

<210> SEQ ID NO 21
<211> LENGTH: 21
<212> TYPE: DNA
<213> ORGANISM: Artificial Sequence
<220> FEATURE:
<223> OTHER INFORMATION: EGFR Exon 21-probe1 CP1
```

-continued

```
<400> SEQUENCE: 21
ccaggaacgt actggtgaaa a                                              21

<210> SEQ ID NO 22
<211> LENGTH: 22
<212> TYPE: DNA
<213> ORGANISM: Artificial Sequence
<220> FEATURE:
<223> OTHER INFORMATION: EGFR Exon 21-probe1 DP

<400> SEQUENCE: 22
ggaagagaaa gaataccatg ca                                             22

<210> SEQ ID NO 23
<211> LENGTH: 22
<212> TYPE: DNA
<213> ORGANISM: Artificial Sequence
<220> FEATURE:
<223> OTHER INFORMATION: EGFR Exon 21-probe2 CP2

<400> SEQUENCE: 23
aagatcacag attttgggcg gg                                             22

<210> SEQ ID NO 24
<211> LENGTH: 22
<212> TYPE: DNA
<213> ORGANISM: Artificial Sequence
<220> FEATURE:
<223> OTHER INFORMATION: EGFR Exon 21-probe2 DP

<400> SEQUENCE: 24
ggaagagaaa gaataccatg ca                                             22

<210> SEQ ID NO 25
<211> LENGTH: 24
<212> TYPE: DNA
<213> ORGANISM: Artificial Sequence
<220> FEATURE:
<223> OTHER INFORMATION: EGFR Exon 21-probe3 CP3

<400> SEQUENCE: 25
ggcatgaact acttggagga ccgt                                           24

<210> SEQ ID NO 26
<211> LENGTH: 22
<212> TYPE: DNA
<213> ORGANISM: Artificial Sequence
<220> FEATURE:
<223> OTHER INFORMATION: EGFR Exon 21-probe3 DP

<400> SEQUENCE: 26
ggaagagaaa gaataccatg ca                                             22

<210> SEQ ID NO 27
<211> LENGTH: 21
<212> TYPE: DNA
<213> ORGANISM: Artificial Sequence
<220> FEATURE:
<223> OTHER INFORMATION: KRAS exon2-probe CP1

<400> SEQUENCE: 27
aaatgactga atataaactt g                                              21

<210> SEQ ID NO 28
<211> LENGTH: 21
```

```
<212> TYPE: DNA
<213> ORGANISM: Artificial Sequence
<220> FEATURE:
<223> OTHER INFORMATION: KRAS exon2-probe DP

<400> SEQUENCE: 28
gagtgccttg acgatacagc t                                            21

<210> SEQ ID NO 29
<211> LENGTH: 20
<212> TYPE: DNA
<213> ORGANISM: Artificial Sequence
<220> FEATURE:
<223> OTHER INFORMATION: ALK-EML4 variant 1-probe CP2

<400> SEQUENCE: 29
tagagcccac acctgggaaa                                              20

<210> SEQ ID NO 30
<211> LENGTH: 20
<212> TYPE: DNA
<213> ORGANISM: Artificial Sequence
<220> FEATURE:
<223> OTHER INFORMATION: ALK-EML4 variant 1-probe DP

<400> SEQUENCE: 30
cggagcttgc tcagcttgta                                              20

<210> SEQ ID NO 31
<211> LENGTH: 26
<212> TYPE: DNA
<213> ORGANISM: Artificial Sequence
<220> FEATURE:
<223> OTHER INFORMATION: ALK-EML4 variant 3-probe CP3

<400> SEQUENCE: 31
gcataaagat gtcatcatca accaag                                       26

<210> SEQ ID NO 32
<211> LENGTH: 20
<212> TYPE: DNA
<213> ORGANISM: Artificial Sequence
<220> FEATURE:
<223> OTHER INFORMATION: ALK-EML4 variant 3-probe DP

<400> SEQUENCE: 32
cggagcttgc tcagcttgta                                              20

<210> SEQ ID NO 33
<211> LENGTH: 32
<212> TYPE: DNA
<213> ORGANISM: Artificial Sequence
<220> FEATURE:
<223> OTHER INFORMATION: BRCA1 Exon 7 of normal cell

<400> SEQUENCE: 33
caaagtatgg gctacagaaa ccgtgccaaa ag                                32

<210> SEQ ID NO 34
<211> LENGTH: 32
<212> TYPE: DNA
<213> ORGANISM: Artificial Sequence
<220> FEATURE:
<223> OTHER INFORMATION: BRCA1 Exon 7 of cancer cell

<400> SEQUENCE: 34
```
caaagtatgg gcttcagaaa ccgtgccaaa ag                    32

<210> SEQ ID NO 35
<211> LENGTH: 32
<212> TYPE: DNA
<213> ORGANISM: Artificial Sequence
<220> FEATURE:
<223> OTHER INFORMATION: BRCA1 Exon 10 of normal cell

<400> SEQUENCE: 35
tgggaaaacc tatcggaaga aggcaagcct cc                    32

<210> SEQ ID NO 36
<211> LENGTH: 32
<212> TYPE: DNA
<213> ORGANISM: Artificial Sequence
<220> FEATURE:
<223> OTHER INFORMATION: BRCA1 Exon 10 of cancerl cell

<400> SEQUENCE: 36
tgggaaaacc tatcggtaga aggcaagcct cc                    32

<210> SEQ ID NO 37
<211> LENGTH: 30
<212> TYPE: DNA
<213> ORGANISM: Artificial Sequence
<220> FEATURE:
<223> OTHER INFORMATION: BRCA1 Exon 11 of normal cell

<400> SEQUENCE: 37
ggggccaaga aattagagtc ctcagaagag                       30

<210> SEQ ID NO 38
<211> LENGTH: 31
<212> TYPE: DNA
<213> ORGANISM: Artificial Sequence
<220> FEATURE:
<223> OTHER INFORMATION: BRCA1 Exon 11 of cancer cell

<400> SEQUENCE: 38
ggggccaaga aaattagagt cctcagaaga g                     31

<210> SEQ ID NO 39
<211> LENGTH: 33
<212> TYPE: DNA
<213> ORGANISM: Artificial Sequence
<220> FEATURE:
<223> OTHER INFORMATION: BRCA1 Exon 15 of normal cell

<400> SEQUENCE: 39
atatacagga tatgcgaatt aagaagaaac aaa                   33

<210> SEQ ID NO 40
<211> LENGTH: 33
<212> TYPE: DNA
<213> ORGANISM: Artificial Sequence
<220> FEATURE:
<223> OTHER INFORMATION: BRCA1 Exon 15 of cancer cell

<400> SEQUENCE: 40
atatacagga tatgtgaatt aagaagaaac aaa                   33

<210> SEQ ID NO 41
<211> LENGTH: 32
<212> TYPE: DNA
<213> ORGANISM: Artificial Sequence

```
<220> FEATURE:
<223> OTHER INFORMATION: TP53 of normal cell

<400> SEQUENCE: 41
taggaggccg agctctgttg cttcgaactc ca                                32

<210> SEQ ID NO 42
<211> LENGTH: 31
<212> TYPE: DNA
<213> ORGANISM: Artificial Sequence
<220> FEATURE:
<223> OTHER INFORMATION: TP53 of cancer cell

<400> SEQUENCE: 42
taggaggccg agctctttgc ttcgaactcc a                                 31

<210> SEQ ID NO 43
<211> LENGTH: 31
<212> TYPE: DNA
<213> ORGANISM: Artificial Sequence
<220> FEATURE:
<223> OTHER INFORMATION: MSH2 of normal cell

<400> SEQUENCE: 43
tgaggaggtt tcgacatggc ggtgcagccg a                                 31

<210> SEQ ID NO 44
<211> LENGTH: 31
<212> TYPE: DNA
<213> ORGANISM: Artificial Sequence
<220> FEATURE:
<223> OTHER INFORMATION: MSH2 of cancer cell

<400> SEQUENCE: 44
tgaggaggtt tcgacctggc ggtgcagccg a                                 31

<210> SEQ ID NO 45
<211> LENGTH: 32
<212> TYPE: DNA
<213> ORGANISM: Artificial Sequence
<220> FEATURE:
<223> OTHER INFORMATION: EGFR of normal cell

<400> SEQUENCE: 45
aaaaagatca aagtgctggg ctccggtgcg tt                                32

<210> SEQ ID NO 46
<211> LENGTH: 32
<212> TYPE: DNA
<213> ORGANISM: Artificial Sequence
<220> FEATURE:
<223> OTHER INFORMATION: EGFR of cancer cell

<400> SEQUENCE: 46
aaaaagatca aagtgctgag ctccggtgcg tt                                32

<210> SEQ ID NO 47
<211> LENGTH: 33
<212> TYPE: DNA
<213> ORGANISM: Artificial Sequence
<220> FEATURE:
<223> OTHER INFORMATION: FGFR3 of normal cell

<400> SEQUENCE: 47
atcctctctc tgaaatcact gagcaggaga aag                               33
```

```
<210> SEQ ID NO 48
<211> LENGTH: 33
<212> TYPE: DNA
<213> ORGANISM: Artificial Sequence
<220> FEATURE:
<223> OTHER INFORMATION: FGFR3 of cancer cell

<400> SEQUENCE: 48
atcctctctc tgaaatcact gcgcaggaga aag                                  33
```